(12) United States Patent
Pichler et al.

(10) Patent No.: US 12,548,688 B2
(45) Date of Patent: Feb. 10, 2026

(54) SYSTEM AND METHOD FOR PARALLEL IMPLEMENTATION OF MULTI-QUBIT QUANTUM GATES

(71) Applicants: President and Fellows of Harvard College, Cambridge, MA (US); Massachusetts Institute of Technology, Cambridge, MA (US)

(72) Inventors: Hannes Pichler, Pasadena, CA (US); Harry Jay Levine, Cambridge, MA (US); Mikhail D. Lukin, Cambridge, MA (US); Ahmed Omran, Cambridge, MA (US); Alexander Keesling Contreras, Cambridge, MA (US); Giulia Semeghini, Cambridge, MA (US); Vladan Vuletic, Cambridge, MA (US); Markus Greiner, Cambridge, MA (US); Tout Wang, Cambridge, MA (US); Sepehr Ebadi, Cambridge, MA (US)

(73) Assignees: President and Fellows of Harvard College, Cambridge, MA (US); Massachusetts Institute of Technology, Cambridge, MA (US)

(*) Notice: Subject to any disclaimer, the term of this patent is extended or adjusted under 35 U.S.C. 154(b) by 978 days.

(21) Appl. No.: 17/573,270

(22) Filed: Jan. 11, 2022

(65) Prior Publication Data

US 2024/0289665 A1 Aug. 29, 2024

Related U.S. Application Data

(63) Continuation of application No. PCT/US2020/041709, filed on Jul. 10, 2020.
(Continued)

(51) Int. Cl.
*G21K 1/00* (2006.01)
*G06N 10/20* (2022.01)
*G06N 10/40* (2022.01)

(52) U.S. Cl.
CPC ............ *G21K 1/006* (2013.01); *G06N 10/20* (2022.01); *G06N 10/40* (2022.01)

(58) Field of Classification Search
CPC ......... G21K 1/006; G06N 10/20; G06N 10/40
See application file for complete search history.

(56) References Cited

U.S. PATENT DOCUMENTS

| 3,872,470 A | 3/1975 | Hoerz et al. |
| 4,479,199 A | 10/1984 | Friedlander et al. |

(Continued)

FOREIGN PATENT DOCUMENTS

| CN | 106980178 A | 7/2017 |
| CN | 108415206 A | 8/2018 |

(Continued)

OTHER PUBLICATIONS

Adachi et al., "Application of Quantum Annealing to Training of Deep Neural Networks," arXiv.org: 18 pages (2015).
(Continued)

*Primary Examiner* — David E Smith
*Assistant Examiner* — Christopher J Gassen
(74) *Attorney, Agent, or Firm* — Wolf, Greenfield & Sacks, P.C.

(57) ABSTRACT

A device includes a grouping of N qubits, where N is equal to two or more, and a coherent light source configured to, given selected values for a set of parameters of at least a first and a second laser pulse, the parameters selected from a relative phase shift, a laser frequency, a laser intensity, and a pulse duration: apply at least the first and second laser pulses to all qubits within the grouping of N qubits, thereby
(Continued)

coupling a non-interacting quantum state |1⟩ to an interacting excited state |r⟩, such that each qubit that begins in quantum state |1⟩ returns to the state |1⟩ upon completion of the at least first and second laser pulses, and such that qubits in the grouping are mutually blockaded.

26 Claims, 48 Drawing Sheets

Related U.S. Application Data

(60) Provisional application No. 62/873,009, filed on Jul. 11, 2019.

(56) References Cited

U.S. PATENT DOCUMENTS

| | | |
|---|---|---|
| 5,684,621 A | 11/1997 | Downing |
| 6,988,058 B1 | 1/2006 | Sherwin et al. |
| 10,962,810 B2 | 3/2021 | Ma et al. |
| 11,380,455 B2 | 7/2022 | Keesling Contreras et al. |
| 11,710,579 B2 | 7/2023 | Keesling Contreras et al. |
| 11,985,451 B2 | 5/2024 | Kim et al. |
| 12,051,520 B2 | 7/2024 | Keesling Contreras et al. |
| 12,165,004 B2 | 12/2024 | Pichler et al. |
| 2002/0089718 A1 | 7/2002 | Penninckx et al. |
| 2004/0000666 A1 | 1/2004 | Lidar et al. |
| 2004/0017833 A1 | 1/2004 | Cundiff et al. |
| 2004/0126114 A1 | 7/2004 | Liu et al. |
| 2006/0225165 A1 | 10/2006 | Maassen van den Brink et al. |
| 2007/0113012 A1 | 5/2007 | Cable et al. |
| 2008/0116449 A1 | 5/2008 | Macready et al. |
| 2008/0185576 A1 | 8/2008 | Hollenberg et al. |
| 2008/0237579 A1 | 10/2008 | Barker et al. |
| 2008/0313430 A1 | 12/2008 | Bunyk |
| 2009/0204877 A1 | 8/2009 | Betts |
| 2009/0299947 A1 | 12/2009 | Amin et al. |
| 2011/0238607 A1 | 9/2011 | Coury et al. |
| 2014/0025926 A1 | 1/2014 | Yao et al. |
| 2014/0200689 A1 | 7/2014 | Utsunomiya et al. |
| 2014/0253987 A1 | 9/2014 | Christmas |
| 2015/0317558 A1 | 11/2015 | Adachi et al. |
| 2016/0064108 A1 | 3/2016 | Saffman et al. |
| 2016/0125311 A1 | 5/2016 | Fuechsle et al. |
| 2016/0328253 A1 | 11/2016 | Majumdar |
| 2017/0300817 A1 | 10/2017 | King et al. |
| 2018/0217629 A1 | 8/2018 | Macfaden |
| 2018/0218279 A1 | 8/2018 | Lechner et al. |
| 2018/0260731 A1 | 9/2018 | Zeng et al. |
| 2019/0266508 A1 | 8/2019 | Bunyk et al. |
| 2020/0185120 A1 | 6/2020 | Keesling Contreras et al. |
| 2021/0279631 A1 | 9/2021 | Pichler et al. |
| 2021/0365827 A1 | 11/2021 | Monroe et al. |
| 2021/0383189 A1 | 12/2021 | Cong et al. |
| 2022/0060668 A1 | 2/2022 | Kim et al. |
| 2022/0138608 A1 | 5/2022 | Ramette et al. |
| 2022/0197102 A1 | 6/2022 | Christen et al. |
| 2022/0293293 A1 | 9/2022 | Contreras et al. |
| 2022/0391743 A1 | 12/2022 | Wild et al. |
| 2023/0326623 A1 | 10/2023 | Keesling Contreras et al. |
| 2023/0400492 A1 | 12/2023 | Xu et al. |
| 2024/0029911 A1 | 1/2024 | Lukin et al. |
| 2024/0185113 A1 | 6/2024 | Cong et al. |
| 2024/0289665 A1 | 8/2024 | Pichler et al. |
| 2024/0346352 A1 | 10/2024 | Bluvstein et al. |
| 2024/0347995 A1 | 10/2024 | Levine et al. |

FOREIGN PATENT DOCUMENTS

| | | |
|---|---|---|
| EP | 1171968 B1 | 11/2002 |
| EP | 3113084 A1 | 1/2017 |
| EP | 3438726 A1 | 2/2019 |
| GB | 0205011 A | 10/1923 |
| JP | 2007/233041 A | 9/2007 |
| JP | 2008/134450 A | 6/2008 |
| JP | 2008/158325 A | 7/2008 |
| JP | 2014-197733 A | 10/2014 |
| JP | 2017/078832 A | 4/2017 |
| WO | WO-2014/051886 A1 | 4/2014 |
| WO | WO-2017/078735 A1 | 5/2017 |
| WO | WO-2019/014589 A1 | 1/2019 |
| WO | WO-2020/072981 A1 | 4/2020 |
| WO | WO-2020/172588 A1 | 8/2020 |
| WO | WO-2020/236574 A1 | 11/2020 |
| WO | WO-2021/007560 A1 | 1/2021 |
| WO | WO-2021/141918 A1 | 7/2021 |
| WO | WO-2022/132388 A2 | 6/2022 |
| WO | WO-2022/132389 A2 | 6/2022 |
| WO | WO-2022/174072 A1 | 8/2022 |
| WO | WO-2022/132388 A3 | 9/2022 |
| WO | WO-2022/132389 A3 | 9/2022 |
| WO | WO-2023/287503 A2 | 1/2023 |
| WO | WO-2023/287503 A3 | 1/2023 |
| WO | WO-2023/287503 A9 | 1/2023 |
| WO | WO-2023/080936 A2 | 5/2023 |
| WO | WO-2023/080936 A3 | 7/2023 |
| WO | WO-2023/132865 | 7/2023 |
| WO | WO-2023/132865 A2 | 7/2023 |
| WO | WO-2024/155291 A2 | 7/2024 |
| WO | WO-2024/242728 A2 | 11/2024 |

OTHER PUBLICATIONS

Barredo et al., "An atom-by-atom assembler of defect-free arbitrary 2d atomic arrays," arXiv:1607.03042, Jul. 11, 2016, pp. 1-7.
Barredo et al., "An atom-by-atom assembler of defect-free arbitrary two-dimensional atomic arrays," Science, 354(6315): 1021-1023 (2016).
Barredo et al., "Synthetic three-dimensional atomic structures assembled atom by atom," Nature, 561: 79-82 (2018).
Baur et al., "Single-Photon Switch Based on Rydberg Blockade," Phys. Rev. Lett., 112: 073901 (2014).
Brion et al., "Quantum Computing with Collective Ensembles of Multilevel Systems," Phys. Rev. Lett., 99: 260501 (2007).
Browaeys et al., "Many-body physics with individually controlled Rydberg atoms," Nature Physics, 16: 132-142 (2020).
Bruzewicz et al., "Trapped-Ion Quantum Computing: Progress and Challenges," Applied Physics Reviews, 6(2): 021314 (2019).
Debnath et al., "Demonstration of a small programmable quantum computer with atomic qubits," Nature, 536(7614): 63-66 (2016).
Ebert et al., "Coherence and Rydberg Blockade of Atomic Ensemble Qubits," Phys. Rev. Lett., 115: 093601 (2015).
Endres et al., "Atom-by-atom assembly of defect-free one-dimensional cold atom arrays," Science, 354 (6315): 1024-1027 (2016).
Endres et al., "Cold Matter Assembled Atom-by-Atom," arXiv:1607.03044, Jul. 11, 2016, pp. 1-12.
Engstrom et al., "Calibration of spatial light modulators suffering from spatially varying phase response," Optics Express, 21(13): 16086-16103 (2013).
Extended European Search Report for EP Application No. EP 18831504 mailed Mar. 30, 2021.
Farhi et al., "Classification with Quantum Neural Networks on Near Term Processors," arXiv:1802.06002, 1-21 (2018).
Fienup., "Phase retrieval algorithms: a comparison," Applied Optics 21(15): 2758-2769 (1982).
Fowler et al., "Surface codes: Towards practical large-scale quantum computation," Phys. Rev. A, 86: 032324 (2012).
Gerchberg et al., "A Practical Algorithm for the Determination of Phase from Image and Diffraction Plane Pictures," Optik, 35(2): 237-246 (1972).
Gorniaczyk et al., "Single-Photon Transistor Mediated by Interstate Rydberg Interactions," Phys. Rev. Lett., 113: 053601 (2014).
Gunter et al., "Interaction Enhanced Imaging of Individual Rydberg Atoms in Dense Gases," Phys. Rev. Lett., 108: 013002 (2012).
Gunter et al., "Observing the Dynamics of Dipole-Mediated Energy Transport by Interaction-Enhanced Imaging," Science, 342(6161): 954-956 (2013).

(56) References Cited

OTHER PUBLICATIONS

Haegeman et al., "Order Parameter for Symmetry-Protected Phases in One Dimension," Phys. Rev. Lett., 109(5): 050402-1-5 (2012).
Haldane, "Nonlinear Field Theory of Large-Spin Heisenberg Antiferromagnets: Semiclassically Quantized Solitons of the One-Dimensional Easy-Axis Neel State," Phys. Rev. Lett., 50(15): 1153-1156 (1983).
International Search Report and Written Opinion for International Application No. PCT/US18/42080 dated Oct. 22, 2018.
International Search Report and Written Opinion for International Application No. PCT/US2019/049115 dated Jan. 7, 2020.
International Search Report and Written Opinion for International Application No. PCT/US2019/054831 dated Feb. 6, 2020.
International Search Report and Written Opinion for International Application No. PCT/US2020/019309 dated Jul. 14, 2020.
International Search Report and Written Opinion for International Application No. PCT/US2020/033100 dated Sep. 2, 2020.
International Search Report and Written Opinion for International Application No. PCT/US2020/041709 dated Oct. 28, 2020.
International Search Report and Written Opinion for International Application No. PCT/US2021/012209 mailed May 3, 2021.
Isenhower et al., "Demonstration of a neutral atom controlled-NOT quantum gate," arXiv:0907.5552, Nov. 24, 2009, pp. 1-5.
Jahromi et al., "Topological spin liquids in the ruby lattice with anisotropic Kitaev interactions," Physical Review B, 94(12): (10 pages) (2016).
Jahromi et al., "Topological $Z_2$ RVB quantum spin liquid on the ruby lattice," Physical Review B, 101(11): (10 pages) (2020).
Johnson et al., "Rabi Oscillations between Ground and Rydberg States with Dipole-Dipole Atomic Interactions," Physical Review Letters, 110(11): 113003-1-4 (2008).
Kaufman et al., "Hong-Ou-Mandel atom interferometry in tunnel-coupled optical tweezers," arXiv:1312.7182, Jun. 17, 2014, pp. 1-17.
Labuhn et al., "Tunable two-demensional arrays of single Rydberg atoms for realizing quantum Ising models," Nature, 534(7609): 667-670 (2016).
Leonardo et al., "Computer generation of optimal holograms for optical trap arrays," Optics Express, 15(4): 1913-1922 (2007).
Lester et al., "Rapid production of uniformly-filled arrays of neutral atoms," arXiv:1506.04419, Jun. 14, 2015, pp. 1-5.
Lu et al., "Aluminum nitride integrated photonics platform for the ultraviolet to visible spectrum," Optics Express, 26(9): 11147 (2018).
Ma et al., "Generation of three-dimensional optical structures by dynamic holograms displayed on a twisted nematic liquid crystal display," Applied Physics B Lasers and Optics, 110(4): 531-537 (2013).
Matsumoto et al., "High-quality generation of a multispot pattern using a spatial light modulator with adaptive feedback," Optics Letters, 37(15): 3135-3137 (2012).
Mazurenko, "Optical Imaging of Rydberg Atoms," Thesis (S.B.)—Massachusetts Institute of Technology, Dept. of Physics (2012).
Mehta et al., "Towards fast and scalable trapped-ion quantum logic with integrated photonics," Proc. SPIE 10933, Advances in Photonics of Quantum Computing, Memory, and Communication XII, 109330B (2019).
Murmann et al., "Two Fermions in a Double Well: Exploring a Fundamental Building Block of the Hubbard Model," arXiv:1410.8784, Feb. 17, 2015, pp. 1-12.
Nogrette et al., "Single-Atom Trapping in Holographic 2D Arrays of Microtraps with Arbitrary Geometries," Physical Review X, 4: Article 021034 pp. 1-9 (2014).
Perez-Garcia et al., "PEPS as unique ground states of local Hamiltonians," Quant. Inf. Comp., 8: 0650 (2008).
Persson et al., "An algorithm for improved control of trap intensities in holographic optical tweezers," Proceedings of SPIE, 8458: 8 pages (2012).

Persson et al., "Minimizing intensity fluctuations in dynamic holographic optical tweezers by restricted phase change," Optics Express, 18(11): 11250-11263 (2010).
Persson et al., "Real-time generation of fully optimized holograms for optical trapping applications," Proceedings of SPIE, 8097: 10 pages (2011).
Persson et al., "Reducing the effect of pixel crosstalk in phase only spatial light modulators," Optics Express, 20(20): 22334-22343 (2012).
Persson., "Thesis for the Degree of Doctor of Philosophy: Advances in Holographic Optical Trapping," Department of Physics University o Gothenburg: 82 pages (2013).
Pichler et al., "Computational complexity of the Rydberg blockade in two dimensions," arXiv:1809.04954 (2018).
Poland et al., "Development of a doubly weighted Gerchberg-Saxton algorithm for use in multibeam imaging applications," Optics Letters, 39(8): 2431-2434 (2014).
Pollmann et al., "Detection of symmetry-protected topological phases in one dimension," Phys. Rev. B, 86(12): 125441-1-13 (2012).
Prongue et al., "Optimized kinoform structures for highly efficient fan-out elements," Applied Optics, 31(26): 5706-5711 (1992).
Saffman et al., "Quantum information with Rydberg atoms," Rev. Mod. Phys., 82(3): 2313-2363 (2010).
Saffman et al., "Scaling the neutral-atom Rydberg gate quantum computer by collective encoding in holmium atoms," Phys. Rev. A, 78: 012336 (2008).
Shi, "Deutsch, Toffoli, and CNOT Gates via Rydberg Blockade of Neutral Atoms," arxiv.org, Cornell University Library, 201 Olin Library Cornell University Ithaca, NY (2018).
Shi, "Fast, Accurate, and Realizable Two-Qubit Entangling Gates by Quantum Interference in Detuned Rabi Cycles of Rydberg Atoms," arxiv.org, Cornell University Library, 201 Olin Library Cornell University Ithaca, NY (2019).
Sorace-Agaskar et al., "Multi-layer integrated photonics from the ultraviolet to the infrared," Proc. SPIE 10510, Frontiers in Biological Detection: From Nanosensors to Systems X, 105100D (2018).
Tamura et al., "Highly uniform holographic microtrap arrays for single atom trapping using a feedback optimization of in-trap fluorescence measurements," Optics Express, 24(8): 8132-8141 (2016).
Thimons et al., "Investigating the Gerchberg-Saxton Phase Retrieval Algorithm," SIAM: 11 pages (2018).
Torlai et al., "Integrating Neural Networks with a Quantum Simulator for State Reconstruction," Cornell University Library, (15 pages) (2019).
Urban et al., "Observation of Rydberg blockade between two atoms," Nature Physics, 5: 110-114 (2009).
Verresen et al., "One-dimensional symmetry protected topological phases and their transitions," Phys. Rev. B, 96(16): 165124-1-23 (2017).
Verstraete et al., "Criticality, the Area Law, and the Computational Power of Projected Entangled Pair States," Phys. Rev. Lett., 96: 220601 (2006).
Vidal, "Class of Quantum Many-Body States That Can Be Efficiently Simulated," Phys. Rev. Lett., 101(11): 110501-1-4 (2008).
Wang et al., "Coherent Addressing of Individual Neutral Atoms in a 3D Optical Lattice," Physical Review Letters, 115(4): 043003-1-5 (2015).
Yavuz et al., "Fast Ground State Manipulation of Neutral Atoms in Microscopic Optical Traps," Physical Review Letters, 96(6): 063001-1-4 (2006).
Ying, "Entangled Many-Body States as Resources of Quantum Information Processing," Center for Quantum Technologies National University of Singapore (2013).
Zimmermann et al., "High-resolution imaging of ultracold fermions in microscopically tailored optical potentials," arXiv:1011.1004, Apr. 8, 2011, pp. 1-15.
Aliferis et al., "Computation by measurements: A unifying picture," Arxiv: 13 pages (2004).
Anonymous., "Magneto-optical trap," Wikipedia, retrieved online <https://web.archive.org/web/20210125084412/https://en.wikipedia.org/wiki/Magneto-optical_trap>: 7 pages (2022).

(56) References Cited

OTHER PUBLICATIONS

Cong et al., "Quantum convolutional neural networks" Nature Physics, vol. 15, p. 1273-1278 (2019).
Extended European Search Report for EP Application No. 19854402.5 dated May 9, 2022.
Extended European Search Report for EP Application No. 19868908.5 dated Jun. 13, 2022.
Grant et al., "Hierarchical quantum classifiers" Arxiv, p. 1-16 (2018).
International Search Report and Written Opinion for International Application No. PCT/US2022/016173 dated May 24, 2022.
Killoran et al., "Continuous-variable quantum neural networks" Arxiv, p. 1-21 (2018).
Kim and Swingle., "Robust entanglement renormalization on a noisy quantum computer" Arxiv, p. 1-17 (2017).
Morgado et al., "Quantum simulation and computing with Rydberg-interacting qubits," Arxiv, Cornell University Library: 36 pages (2020).
Tanasittikosol et al., "Microwave dressing of Rydberg dark states," Arxiv, Cornell University Library: 12 pages (2011).
Verdon et al., "A Universal Training Algorithm for Quantum Deep Learning" Arxiv, p. 1-83, (2018).
Wu et al., "Erasure conversion for fault-tolerant quantum computing in alkaline earth Rydberg atom arrays," arXiv.org: 16 pages (2022).
Auger et al., "Blueprint for fault-tolerant quantum computation with Rydberg atoms." Physical Review A 96(5): 052320 (2017).
Chao et al., "Fault-tolerant quantum computation with few qubits." npj Quantum Information 4.1 (2018): 42.
Cong et al., "Hardware-efficient, fault-tolerant quantum computation with Rydberg atoms", Physical Review X 12(2): 021049 (2022).
International Search Report and Written Opinion for International Application No. PCT/US2022/031297 dated Feb. 21, 2023.
Low et al., "Practical trapped-ion protocols for universal qudit-based quantum computing", Physical Review Research 2(3): 033128 (2020).
Satzinger et al. "Realizing topologically ordered states on a quantum processor," 27 pages, (2021).
Yoder et al., "Universal fault-tolerant gates on concatenated stabilizer codes", Physical Review X 6(3): 031039 (2016).
Jaksch et al., "The cold atom Hubbard toolbox," Arxiv, (30 pages) (2004).
Negretti et al., "Quantum computing implementation with neutral particles," Arxiv, (19 pages) (2011).
Du et al., "Superconducting circuit probe for analog quantum simulators", *Physical Review A* 92(1): 012330 (2015).
International Search Report and Written Opinion for Application No. PCT/US2022/039189 dated Aug. 4, 2023.
International Search Report and Written Opinion for International Application No. PCT/US22/37325 dated Jun. 16, 2023.
Keating et al., "Adiabatic quantum computation with Rydberg-dressed atoms", Physical Review A 87, 052314, May 2013.
Levine, "Quantum Information Processing and Quantum Simulation with Programmable Rydberg Atom Arrays" The Department of Physics at Harvard University, PHD Thesis (2021).
Meschede, "Quantum engineering with neutral atoms one by one", *Conference on Lasers and Electro-Optics/Pacific Rim*. Optica Publishing Group, 2007.
Wang et al., "Quantum state manipulation of single-Cesium-atom qubit in a micro-optical trap", *Frontiers of Physics* 9: 634-639 (2014).
Willner et al., "Optics and photonics: Key enabling technologies", *Proceedings of the IEEE* 100.Special Centennial Issue: 1604-1643 (2012).
Beugnon et al., "Two-dimensional transport and transfer of a single atomic qubit in optical tweezers" Nature Physics, vol. 3, p. 1-4 (2007).
Couvert et al., "Optimal transport of ultracold atoms in the non-adiabatic regime" Europhysics Letters, 83: 5 pages (2008).
Dordevic et al., "Entanglement transport and a nanophotonic interface for atoms in optical tweezers" arXiv: 16 pages (2021).
Fowler et al., "Surface code quantum communication" arXiv, pp. 1-4 (2010).
Fowler et al., "Surface Codes: Towards practical large-scale quantum computation" Physical Review, vol. 86 (3), p. 1-54 (2012).
Graham et al., "Demonstration of multi-qubit entanglement and algorithms on a programmable neutral atom quantum computer" arXiv, p. 1-25 (2022).
Hashizume et al., "Deterministic Fast Scrambling with Neutral Atom Arrays" Physical Review Letters, vol. 126: 14 pages (2021).
International Search Report and Written Opinion for Application No. PCT/US2021/060136 dated Aug. 11, 2022.
International Search Report and Written Opinion of Application No. PCT/US2021/060138 dated Aug. 19, 2022.
Kaufman et al., "Quantum thermalization through entanglement in an isolated many-body system" arXiv: 19 pages (2016).
Labuhn et al., "Realizing quantum Ising models in tunable two-dimensional arrays of single Rydberg atoms" arXiv: 1-12 (2016).
Lengwenus et al., "Coherent Transport of Atomic Quantum in a Scalable Shift Register" Physical Review Letters, 105: 4 pages (2010).
Rehn et al., "A fractionalised "Z2" classical Heisenberg spin liquid" arXiv: 5 pages (2016).
Reichle et al., "Transport Dynamics of single ions in segmented microstructed Paul trap arrays" Forschritte der Physik Progress of Physics, 54 (8-10): 666-685 (2006).
Savary et al., "Quantum Spin Liquids" arXiv: 60 pages (2016).
Yang et al., "Coherence Preservation of a Single Neutral Atom Qubit Transferred between Magic-Intensity Optical Traps" Physical Review Letter, 117: 6 pages (2016).
International Search Report and Written Opinion for International Application No. PCT/US23/26737 dated Sep. 30, 2024.
Jaksch et al., "Fast quantum gates for neutral atoms." arXiv (2000): 2208.
Keating et al., "Robust quantum logic in neutral atoms via adiabatic Rydberg dressing." Physical Review A 91 (2015): 012337.
Nickerson et al., "Freely scalable quantum technologies using cells of 5-to-50 qubits with very lossy and noisy photonic links." Physical Review X 4.4 (2014): 041041.
Ramette et al., "Fault-tolerant connection of error-corrected qubits with noisy links." npj Quantum Information 10.1 (2024): 58.
Weimer et al. "A Rydberg quantum simulator." Nature Physics 6.5 (2010): 382-388.
Levine, "Quantum Information Processing and Quantum Simulation with Programmable Rydberg Atom Arrays" The Department of Physics at Harvard University, PHD Thesis, published Jan. 12, 2022.
Monroe et al., "Remapping the quantum frontier." Physics World 21.08 (2008): 32.

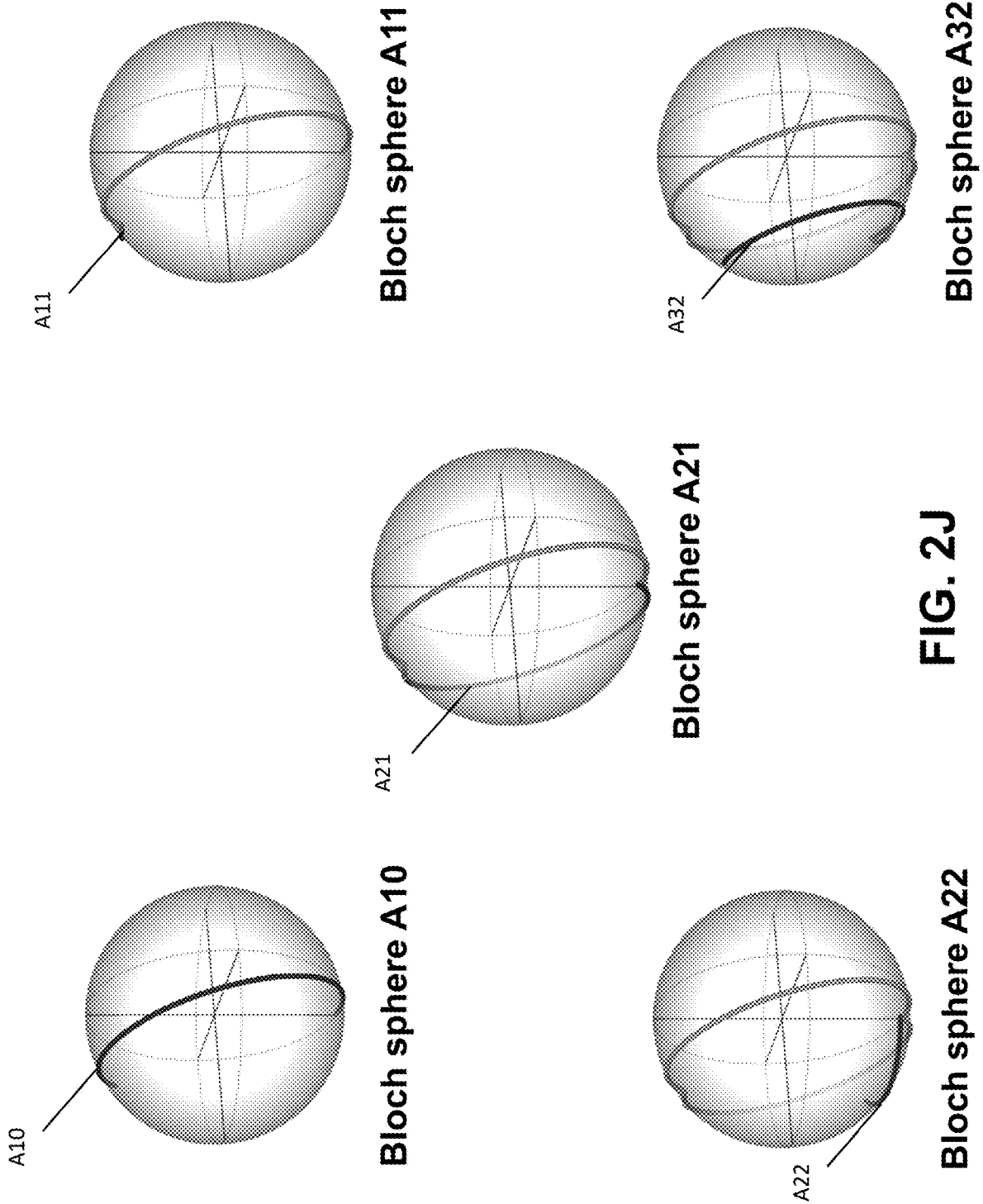

Bloch sphere A44

Bloch sphere A65

Bloch sphere A43

Bloch sphere A55

Bloch sphere A33

Bloch sphere A54

Bloch sphere B44

Bloch sphere B43

Bloch sphere B33

Bloch sphere B65

Bloch sphere B55

Bloch sphere B54

FIG. 8B

SYSTEM AND METHOD FOR PARALLEL IMPLEMENTATION OF MULTI-QUBIT QUANTUM GATES

CROSS-REFERENCE TO RELATED APPLICATIONS

This application is a continuation of international application No. PCT/US2020/041709, filed Jul. 10, 2020, which claims the benefit of U.S. Provisional Application No. 62/873,009, filed Jul. 11, 2019, each of which is hereby incorporated by reference in its entirety.

STATEMENT REGARDING FEDERALLY SPONSORED RESEARCH OR DEVELOPMENT

This invention was made with government support under 1734011 and 1506284 and 1521560 awarded by National Science Foundation (NSF) and under N00014-15-1-2846 and N00014-18-1-2899 awarded by U.S. Office of Naval Research (NAVY/ONR). The government has certain rights in this invention.

BACKGROUND

Any unitary operation can be performed on a quantum computer equipped with a complete set of universal gates. A complete set of gates can be comprised of single qubit operations together with a two-qubit controlled-NOT (CNOT) gate. The CNOT gate has been demonstrated in several different physical systems including trapped neutral atoms, trapped ions, superconducting circuits, and linear optics.

Quantum information processing with neutral atoms offers many exciting opportunities. Neutral atoms can be trapped in flexible geometries and in large numbers using optical trapping techniques. Each individual atom can store a quantum bit of information in two hyperfine ground state levels $|0\rangle$ and $|1\rangle$. Such a storage has the advantage of high coherence times, enabled by excellent isolation from the environment, near-perfect qubit initialization via optical pumping, individual optical readout of each qubit, and a straightforward manipulation of single qubits. Finally, strong and long-range interactions between atoms can be switched on by coupling to highly excited Rydberg states to operate multi-qubit entangling gates to enable universal quantum computation.

Protocols for entangling atoms using Rydberg interactions have been explored theoretically and experimentally over the last decade, but despite major advances, progress in this field has been limited by relatively low fidelities associated with ground-Rydberg state coherent control.

As described above, qubits encoded in hyperfine states of neutral atoms can be entangled using controlled-phase (CZ) or CNOT gates mediated by Rydberg state interactions. The standard Rydberg blockade CZ pulse sequence consists of a $\pi$ pulse on the control qubit, a $2\pi$ pulse on the target qubit, and a $\pi$ pulse on the control qubit, with each pulse resonant between a ground hyperfine qubit state $|1\rangle$ and a Rydberg level $|r\rangle$. If the control qubit enters the gate in state $|1\rangle$, then it is Rydberg excited and will sit in the Rydberg level during the $2\pi$ pulse on the target qubit. Excitation and de-excitation of the target atom corresponds to a $2\pi$ rotation of an effective spin ½ which therefore imparts a $\pi$ phase shift to the wavefunction of the target atom. If the control atom blocks the target excitation, then the rotation does not occur and there is no phase shift of the target wavefunction. The result is a CZ controlled phase operation, in which the target atom's phase shift depends on the control atom's state. Together with arbitrary single-qubit gates, this entangling operation forms a universal quantum computing gate set. However, single-qubit addressing of multi-qubit quantum gates, as required to apply the local $\pi$ and $2\pi$ pulses on the control and target atoms, respectively, remains experimentally challenging.

Therefore, there is a continuing need for improved systems and methods for implementation of multi-qubit quantum gates.

SUMMARY

In an example embodiment, the present disclosure provides a method of operating a quantum gate on a grouping of qubits, the method comprising selecting values for a set of parameters of at least a first and a second laser pulse, the parameters selected from a relative phase shift, a laser frequency, a laser intensity, and a pulse duration, and applying the at least first and second laser pulses to all qubits within a grouping of N qubits, where N is equal to two or more, thereby coupling a non-interacting quantum state $|1\rangle$ to an interacting excited state $|r\rangle$, such that each qubit that begins in quantum state $|1\rangle$ returns to the state $|1\rangle$ upon completion of the at least first and second laser pulses, and such that qubits in the grouping are mutually blockaded.

In another example embodiment, the present disclosure provides a method of operating a quantum gate on a grouping of qubits, the method comprising selecting time-dependent values for a set of parameters of a laser pulse, the parameters selected from a laser phase, a laser frequency, a laser intensity, and a pulse duration, and applying the laser pulse to all qubits within a grouping of N qubits, where N is equal to three or more, thereby coupling a non-interacting quantum state $|1\rangle$ to an interacting excited state $|r\rangle$, such that each qubit that begins in quantum state $|1\rangle$ returns to the state $|1\rangle$ upon completion of the laser pulse, and such that qubits in the grouping are mutually blockaded.

In yet another example embodiment, the present disclosure provides a device comprising a grouping of N qubits, where N is equal to two or more, and a coherent light source configured to, given selected values for a set of parameters of at least a first and a second laser pulse, the parameters selected from a relative phase shift, a laser frequency, a laser intensity, and a pulse duration: apply at least the first and second laser pulses to all qubits within the grouping of N qubits, thereby coupling a non-interacting quantum state $|1\rangle$ to an interacting excited state $|r\rangle$, such that each qubit that begins in quantum state $|1\rangle$ returns to the state $|1\rangle$ upon completion of the at least first and second laser pulses, and such that qubits in the grouping are mutually blockaded.

In still another example embodiment, the present disclosure provides a device comprising a grouping of N qubits, where N is equal to three or more, and a coherent light source configured to, given selected time-dependent values for a set of parameters of a laser pulse, the parameters selected from a laser phase, a laser frequency, a laser intensity, and a pulse duration: apply the laser pulse to all qubits within a grouping of N qubits, thereby coupling a non-interacting quantum state $|1\rangle$ to an interacting excited state $|r\rangle$, such that each qubit that begins in quantum state $|1\rangle$ returns to the state $|1\rangle$ upon completion of the laser pulse, and such that qubits in the grouping are mutually blockaded.

The systems and methods described above have many advantages, such as obviating the need for high speed switching of lasers between different spatial locations, thereby enabling gate operations in large qubit arrays, as well as simultaneous operation of multiple gates on multiple separated atom groupings.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

FIGS. 2J-O contain Bloch sphere representations of a pulse sequence on the two-level systems shown in FIG. 2I employed in example embodiments of the system described herein.

FIGS. 8A-B are schematic diagrams representing measurement statistics for the CNOT and Toffoli truth tables employed in example embodiments of the system described herein.

DETAILED DESCRIPTION

As used herein, the term "qubit" can refer to either a theoretical unit of information in a quantum computer, or a physical implementation of a unit of a quantum circuit. In either case, the term refers to a two-level quantum mechanical system having two basis states, usually denoted as |0

⟩ and |1⟩. Whereas a classical "bit," a theoretical unit of information in a conventional computer, can exist in any one of the two states denoted "0" or "1", a "qubit" can exist in any state that is a linear combination (superposition) of its two basis states. One example of a physical implementation of a quantum gate operated on two or more qubits comprises atoms (or ions) that can be excited into a Rydberg state (i.e., a state with a very high value of the principal quantum number n).

According to some embodiments, the present disclosure describes methods and systems for operating a quantum gate on a grouping of N qubits, where N is equal to two or more qubits. The methods and systems described herein are applicable to a variety of qubits, including atomic qubits, ionic qubits, and molecular qubits. In one example embodiment, a method for realizing multiqubit entangling gates between individual neutral atoms trapped in optical tweezers is introduced. Qubits are encoded in long-lived hyperfine states |0⟩ and |1⟩ that can be coherently manipulated individually or globally to perform single-qubit gates. A two-qubit gate, the controlled-phase gate, is implemented with a protocol consisting of two global laser pulses which drive nearby atoms within the Rydberg blockade regime. As described further below, this gate is benchmarked by preparing Bell states of two atoms with a fidelity $\mathcal{F} \geq 95.0(2)\%$, averaged across five pairs of atoms. After accounting for state preparation and measurement (SPAM) errors, the extracted entanglement operation fidelity is $\mathcal{F}^c \geq 97.4(3)\%$, an operation fidelity that is competitive with other leading platforms capable of simultaneous manipulation of ten or more qubits. Additionally, an implementation of a three-qubit Toffoli gate is demonstrated further below, wherein two atoms simultaneously constrain a third atom through the Rydberg blockade, highlighting the potential use of Rydberg interactions for efficient multi-qubit operations.

Figure 1A:
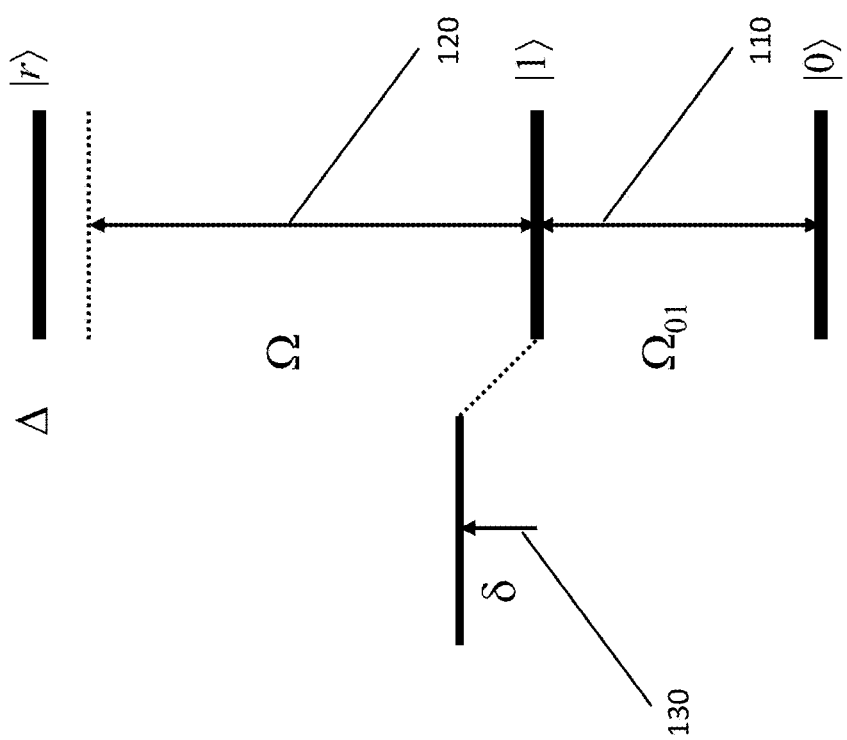
FIG. 1A is a schematic diagram representing relevant atomic levels employed in example embodiments of a system described herein.
Figure 1B:
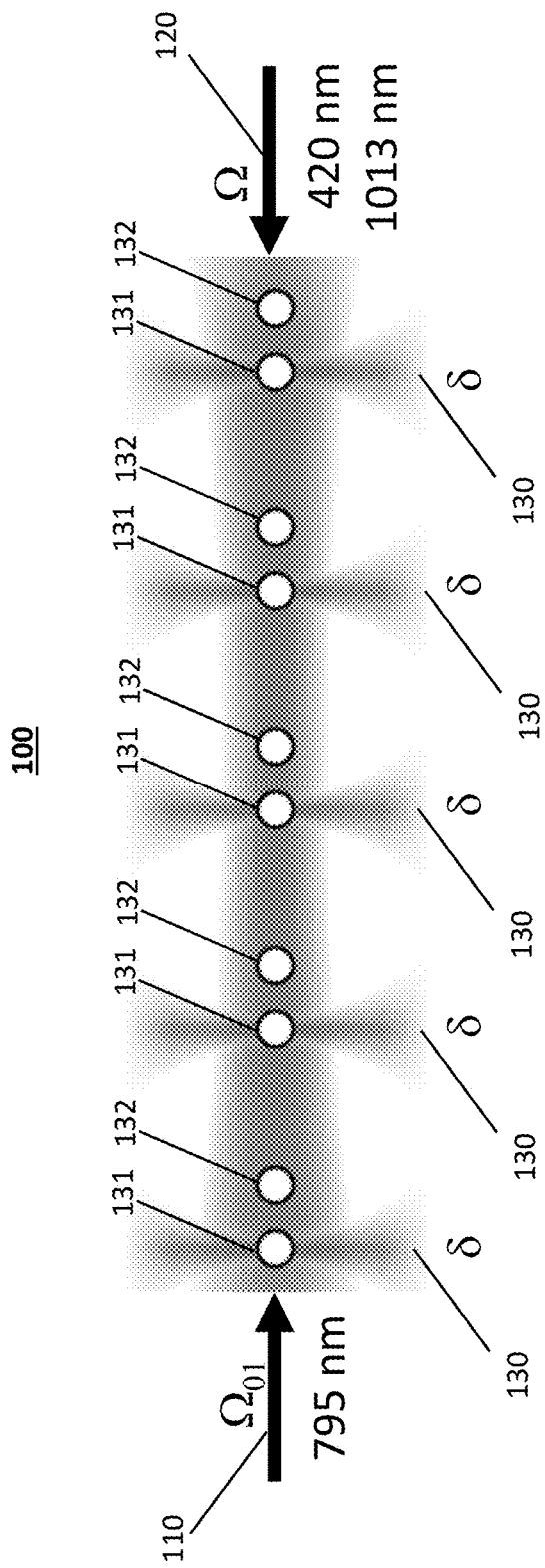
FIG. 1B is a schematic diagram representing atoms arranged in pairs employed in example embodiments of the system described herein.
Figure 1C:
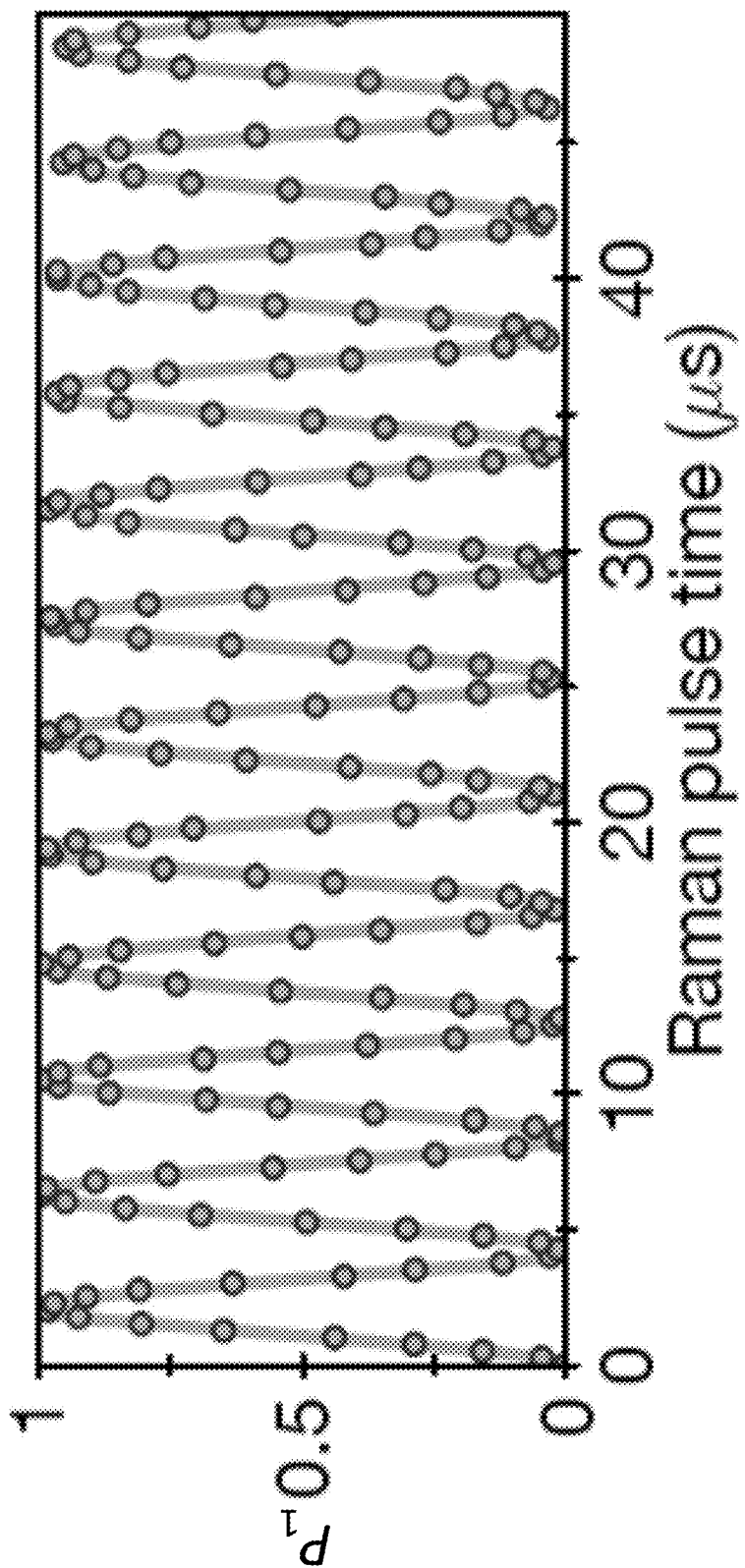
FIG. 1C is a plot of Rabi oscillations from |0⟩ to |1⟩ driven by Raman lasers employed in example embodiments of the system described herein.

In accordance with one or more embodiments, individual $^{87}$Rb atoms are trapped in optical tweezers and sorted by a real-time feedback procedure into groups of two or three, organized, for example, in a one-dimensional array. Qubits are encoded in the hyperfine ground states of these atoms, with $|0⟩ = |5S_{1/2}, F=1, m_F=0⟩$ and $|1⟩ = |5S_{1/2}, F=2, m_F=0⟩$. All qubits are initialized in |0⟩ through a Raman-assisted optical pumping procedure described further below. Single-qubit coherent control is achieved through a combination of a global laser field that homogeneously drives all qubits, as well as local addressing lasers that apply AC Stark shifts on individual qubits. As shown in FIGS. 1A-1B, the global drive field 110 in a device 100 is generated by a 795 nm Raman laser, tuned near the $5S_{1/2}$ to $5P_{1/2}$ transition, as described further below. This laser is intensity modulated to produce sidebands which drive the qubits through a two-photon Raman transition with an effective Rabi frequency $\Omega_{01} \approx 2\pi \times 250$ kHz shown in FIG. 1C. The local addressing beams 130 are generated by an acousto-optic deflector that splits a single 420 nm laser, tuned near the $5S_{1/2}$ to $6P_{3/2}$ transition, into several beams focused onto individual atoms 131, resulting in a light shift $\delta$ used for individual addressing. These two couplings, $5S_{1/2}$ to $5P_{1/2}$ and $5S_{1/2}$ to $6P_{3/2}$, are described herein as global $X(\theta)=\exp(-i\theta X/2)$ qubit rotations and local $Z(\theta)=\exp(-i\theta Z/2)$ rotations, respectively. After each sequence, the individual qubit states are measured by pushing atoms in |1⟩ out of the traps with a resonant laser pulse, followed by a site-resolved fluorescence image of the remaining atoms, as described further below.

Figure 1D:
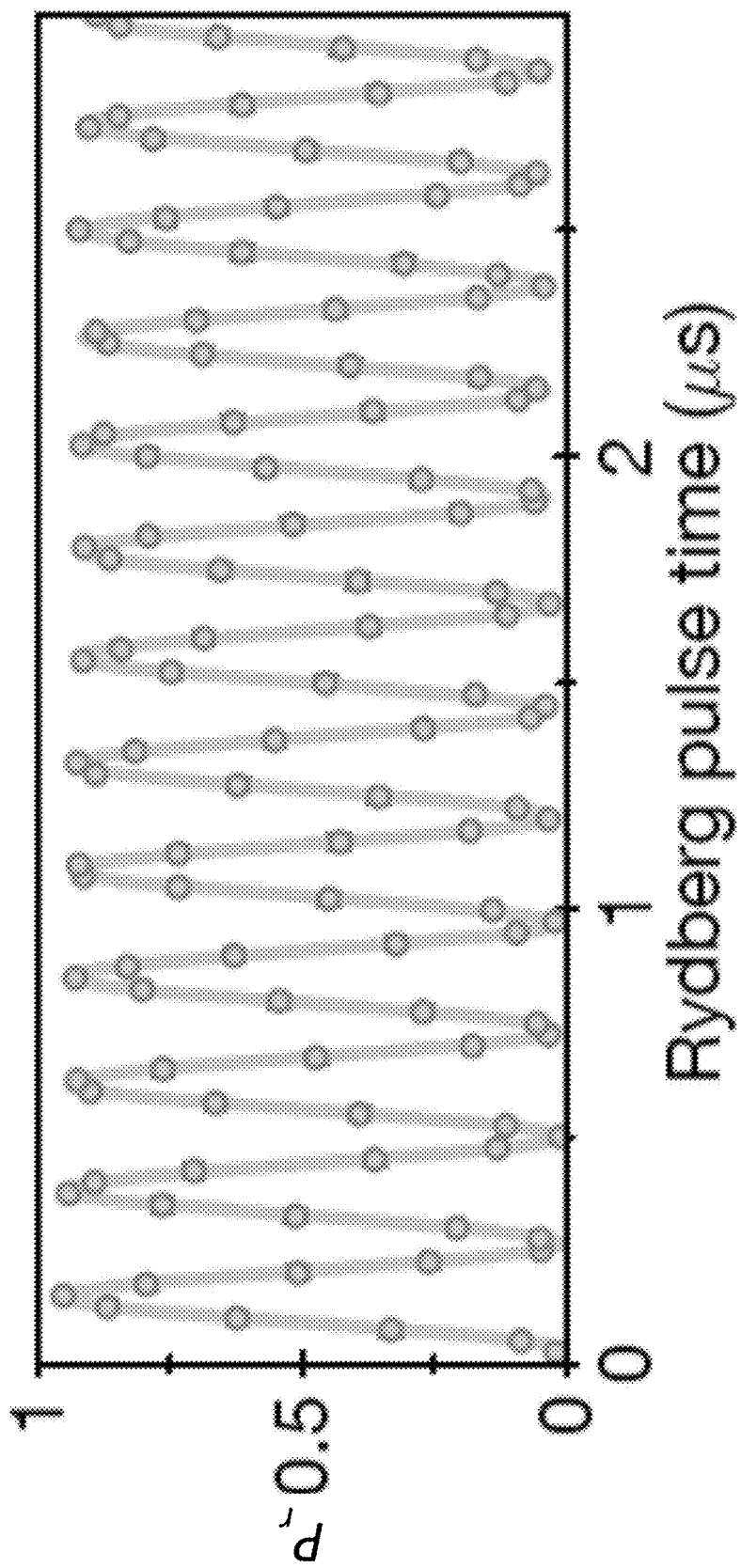
FIG. 1D is a plot of Rabi oscillations from |1⟩ to |r⟩ driven by Rydberg lasers employed in example embodiments of the system described herein.
Figure 1E:
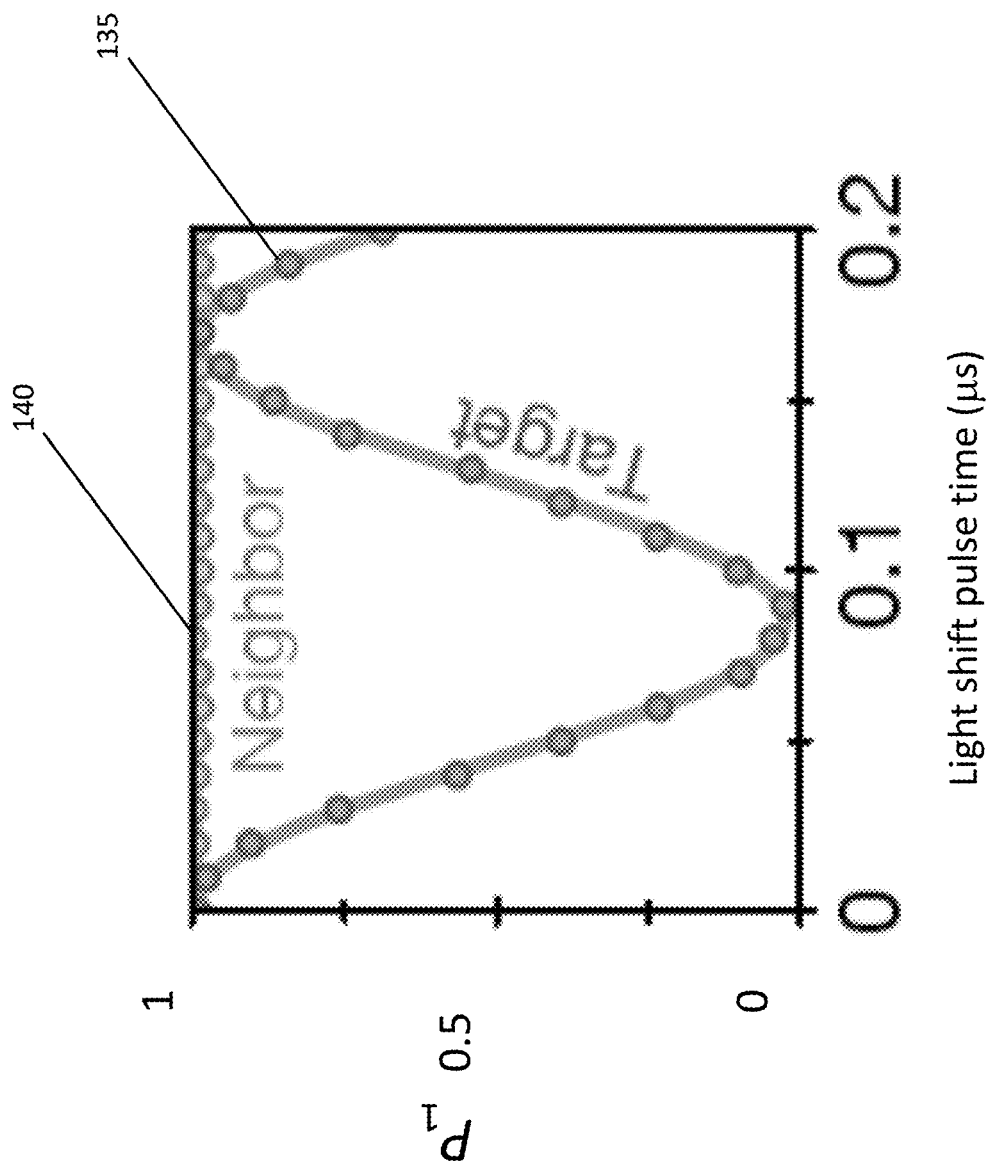
FIG. 1E is a plot of local phase shifts for an addressed target atom and a nonaddressed neighbor atom employed in example embodiments of the system described herein.

Multiqubit gates are operated by globally exciting atoms from the qubit state |1⟩ to the Rydberg state $|r⟩ = |70S_{1/2}$, $m_J = -\frac{1}{2}⟩$ by a bichromatic Rydberg laser 120 containing 420 nm and 1013 nm light. All atoms are homogeneously coupled from a non-interacting quantum state |1⟩ to an interacting excited state |r⟩ through a two-photon process with a detuning $\Delta$ and an effective Rabi frequency $\Omega \approx 2\pi \times 3.5$ MHz shown in FIG. 1D. Within a given cluster of atoms 131 and 132, the Rydberg interaction between nearest neighbors 131 and 132 is $2\pi \times 24$ MHz$>>\Omega$: neighboring atoms 131 and 132, therefore, evolve according to the Rydberg blockade such that qubits 131 and 132 in the grouping are mutually blockaded in that they cannot be simultaneously excited to the Rydberg state. The protocol described herein can be applied to other mutually blockaded qubits, such as mutually dipole blockaded qubits. As shown in FIG. 1E, local phase shifts as measured in a Ramsey sequence, averaged across the five atom pairs 131 and 132 shown in FIG. 1B, show high contrast oscillations 135 for the addressed target atom 131 and limited (<2%) crosstalk 140 for the neighboring nonaddressed atom 132.

Figure 2A:
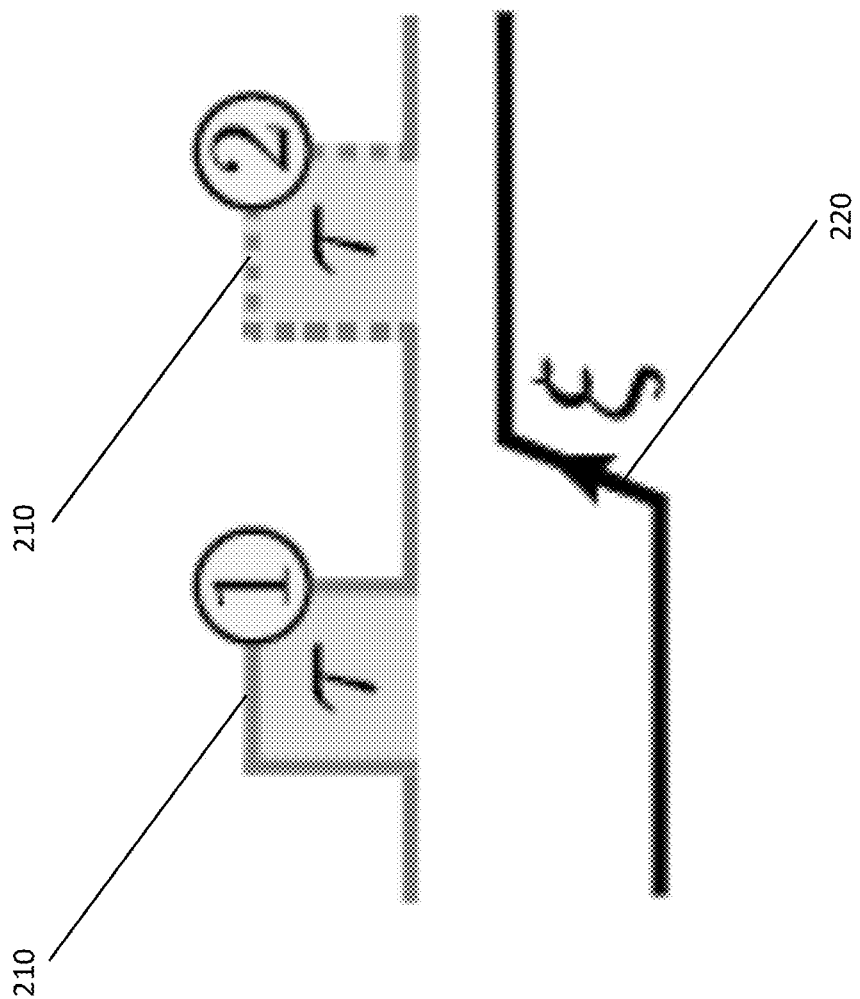
FIG. 2A is a schematic diagram representing a pulse sequence employed in example embodiments of the system described herein.
Figure 2B:
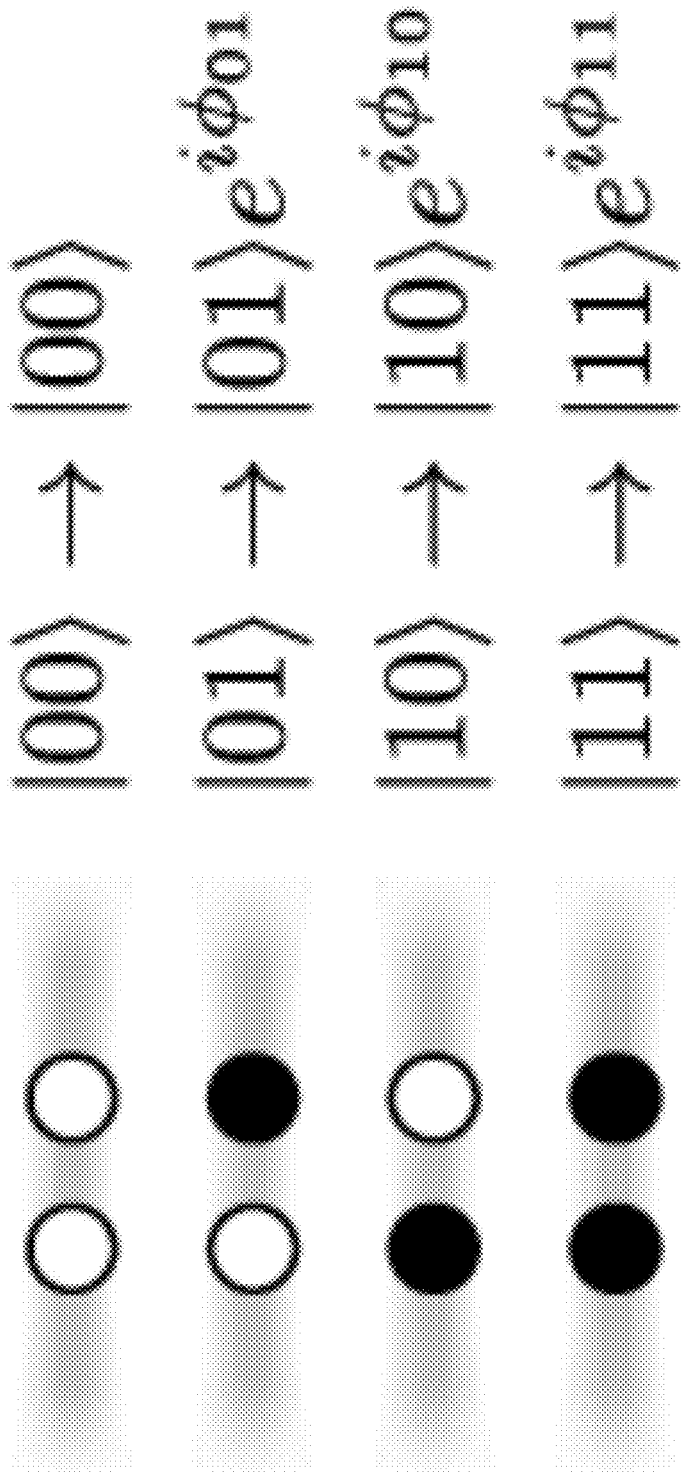
FIG. 2B is a schematic diagram representing basis states employed in example embodiments of the system described herein.

To entangle atoms in such arrays, a protocol is introduced herein for the two-qubit controlled-phase (CZ) gate that relies only on global excitation of atoms within the Rydberg blockade regime. As shown in FIG. 2B, the desired unitary CZ gate maps the computational basis states as follows:

$$|00⟩ \to |00⟩, \quad (1)$$
$$|01⟩ \to |01⟩e^{i\phi},$$
$$|10⟩ \to |10⟩e^{i\phi},$$
$$|11⟩ \to |11⟩e^{i(2\phi-\pi)}.$$

This map is equivalent to the canonical form of the controlled-phase gate $cz=2|00⟩⟨00|-\mathbb{1}$ up to a single-qubit phase $\phi$. As shown in FIG. 2A, two global Rydberg laser pulses 210 of the same length or duration $\tau$ and detuning $\Delta$ that couple |1⟩ to |r⟩ are used to realize this gate, with the laser phase 220 of the second pulse 210 shifted by $\xi$.

Figure 2C:
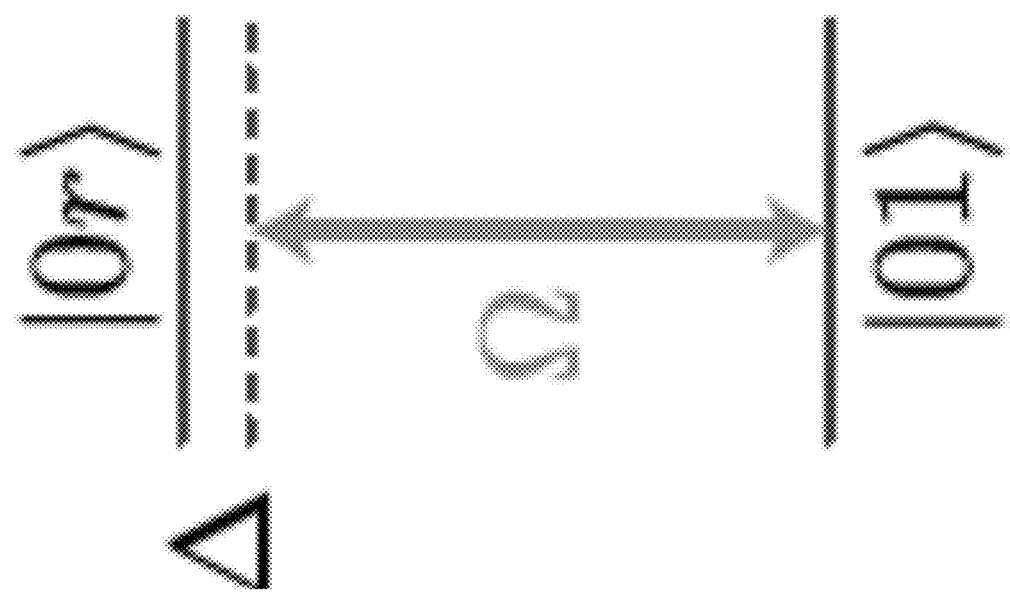
FIG. 2C is a schematic diagram representing a two-level system employed in example embodiments of the system described herein.
Figure 2D:
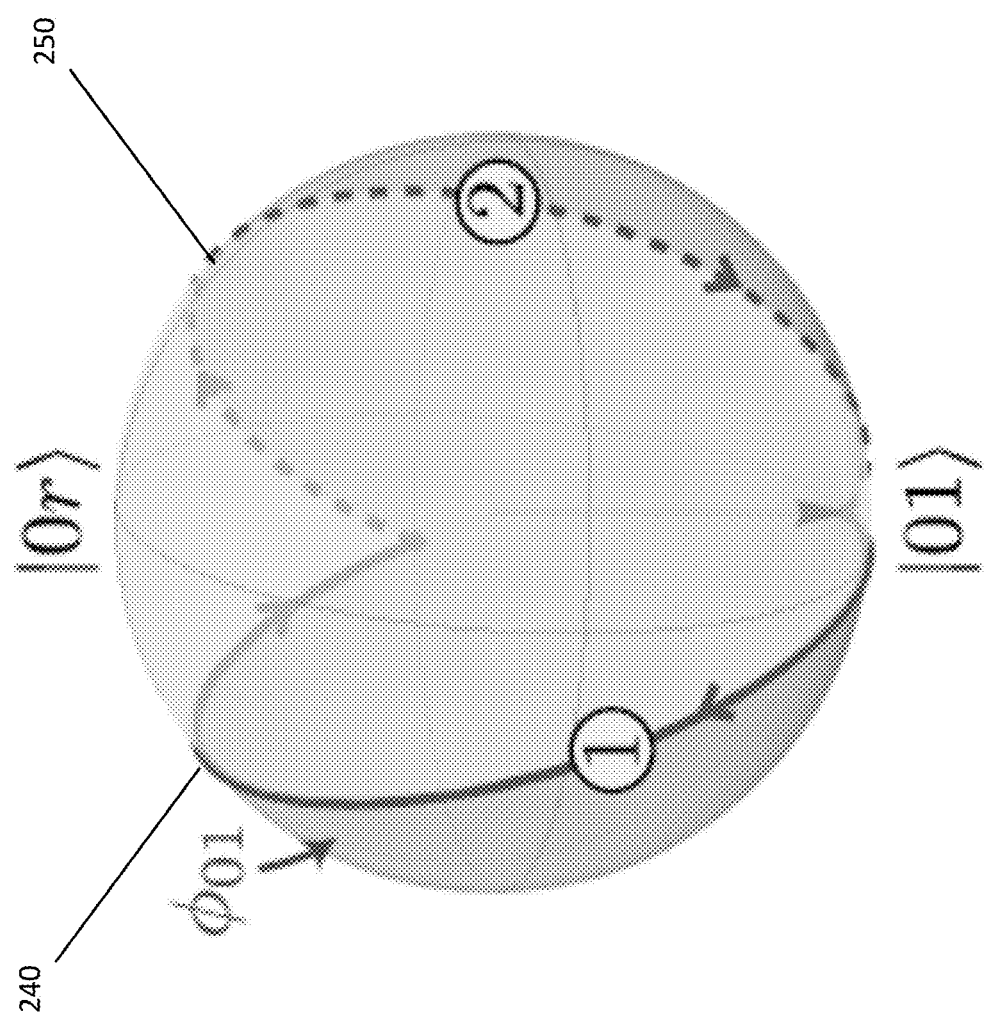
FIG. 2D is a Bloch sphere representation of a pulse sequence on the two-level system shown in FIG. 2C employed in example embodiments of the system described herein.
Figure 2E:
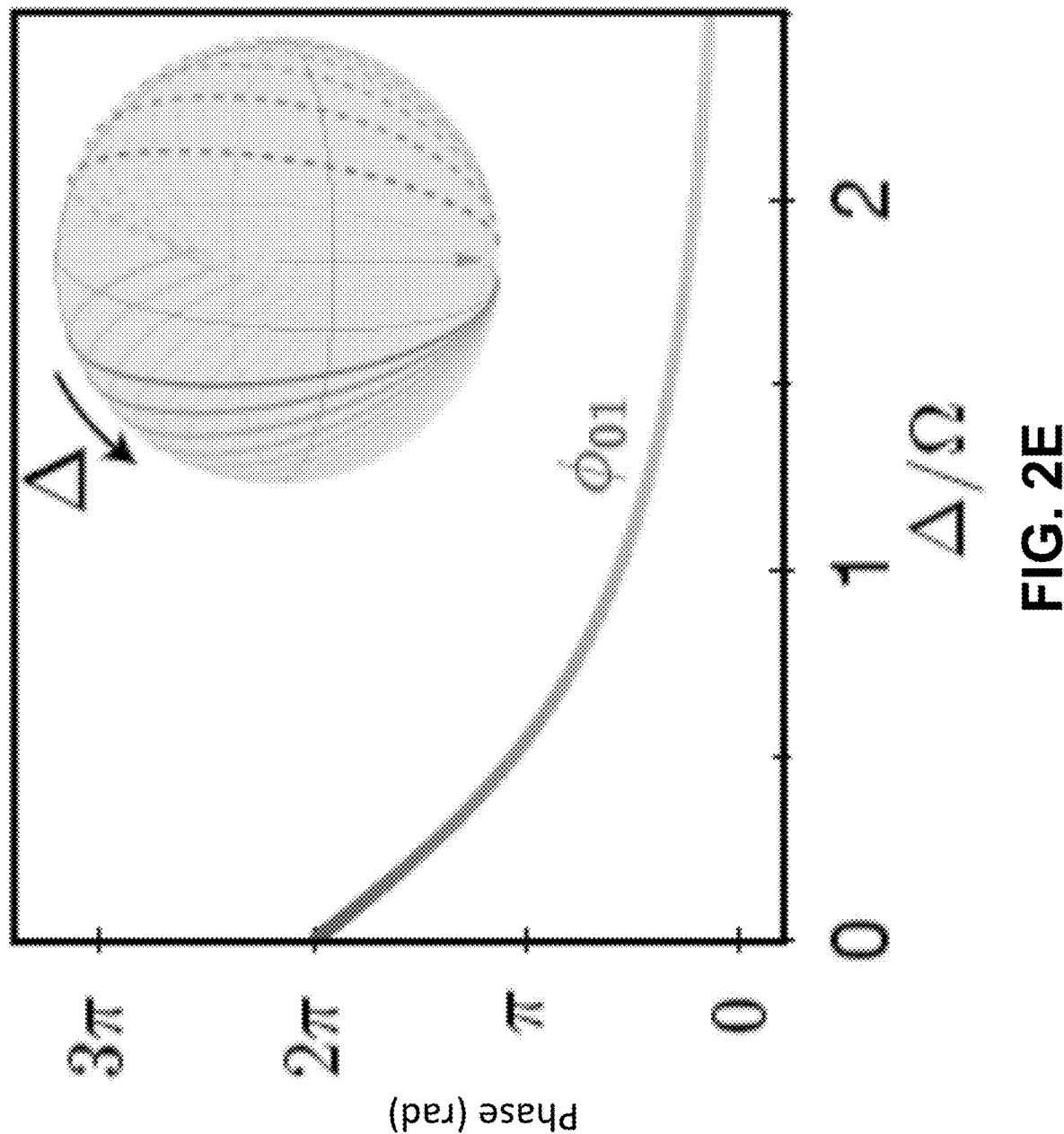
FIG. 2E is a plot of the accumulated phase shown in FIG. 2D as a function of detuning employed in example embodiments of the system described herein.
Figure 2F:
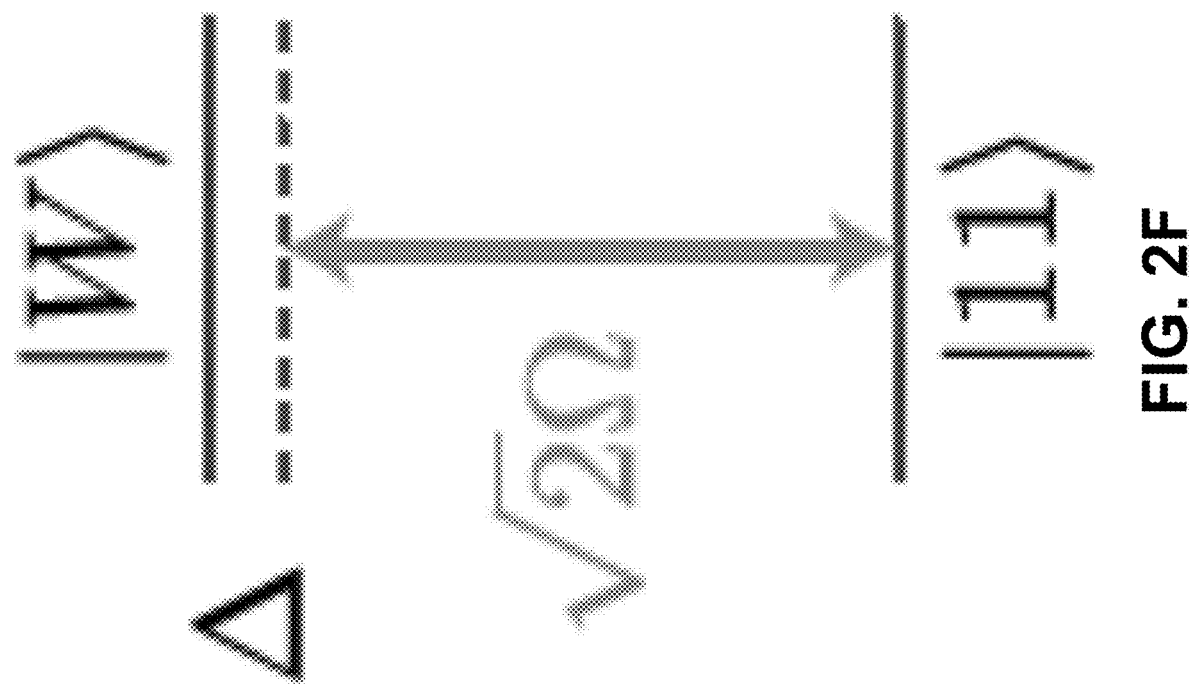
FIG. 2F is a schematic diagram representing another two-level system employed in example embodiments of the system described herein.
Figure 2G:
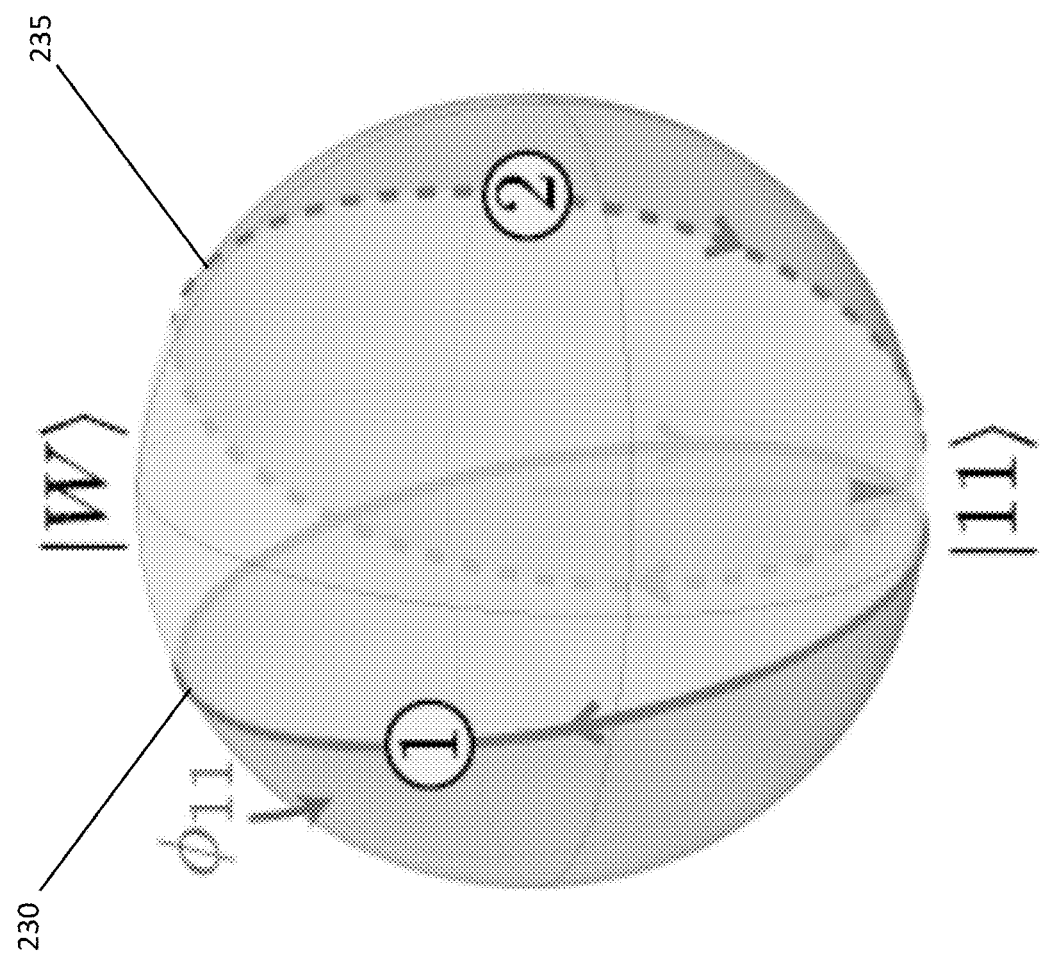
FIG. 2G is a Bloch sphere representation of a pulse sequence on the two-level system shown in FIG. 2F employed in example embodiments of the system described herein.
Figure 2H:
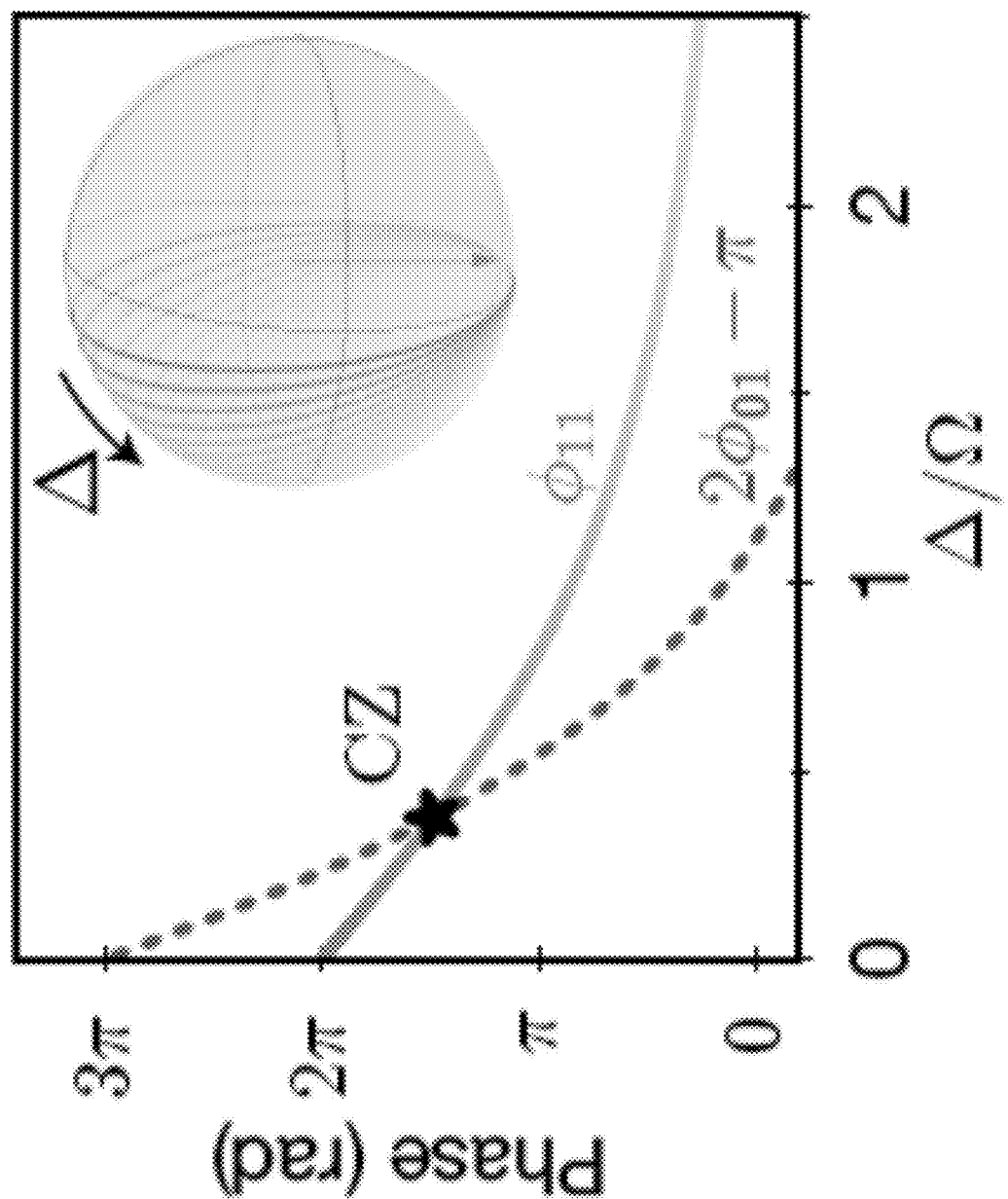
FIG. 2H is a plot of the accumulated phase shown in FIG. 2G as a function of detuning employed in example embodiments of the system described herein.

The gate can be understood by considering the behavior of the four computational basis states. The |00⟩ state is uncoupled by the laser field, and, therefore, does not evolve. The dynamics of |01⟩ (and |10⟩) are given by the coupling of the single atom on the |1⟩ ↔ |R⟩ transition, forming a two-level system with Rabi frequency $\Omega$ and detuning $\Delta$, as shown in FIG. 2C. The |11⟩ state evolves within the Rydberg blockade regime as a two-level system due to the collective coupling from |11⟩ ↔ |W⟩ =(1/√2)(|1r⟩ +|r1⟩ )), with enhanced Rabi frequency $\sqrt{2}\Omega$ and the same detuning $\Delta$, as shown in FIG. 2F. For a chosen detuning $\Delta$, and a laser intensity selected such that the Rabi frequency of the laser pulses is $\Omega$, the pulse length or duration $\tau$ is, optionally, selected such that the first laser pulse 210 completes a full cycle 230 of a detuned Rabi oscillation for the |11⟩ system, as shown in FIG. 2G, that is, $\tau = 2\pi/\sqrt{\Delta^2 + K\Omega^2}$, where (N=K=2) K is the number of qubits in the grouping of N qubits that are mutually blockaded. The same pulse 210 drives an incomplete Rabi oscillation 240 on the |01⟩ system, as shown in FIG. 2D. A subsequent relative phase shift 220 $\Omega \to \Omega e^{i\xi}$ rotates the orientation of the drive field around the Z axis by an angle $\xi$ such that a second pulse 210 of length $\tau$ completes the oscillation 250 and returns the state to |01⟩ , while driving a second complete detuned oscillation 235 on the |11⟩ configuration. By the end of the second laser pulse 210, both |01⟩ and |11⟩ return to their initial positions on the Bloch sphere but with accumulated dynamical phases $\phi_{01}$ and $\phi_{11}$, which depend on the geometric surface area of the Bloch sphere enclosed by the Δ-dependent trajectories. As shown in FIG. 2H, for a specific choice of laser detuning (Δ≈0.377Ω), $2\phi_{01}-\pi=\phi_{11}$, realizing the CZ gate, with the laser frequency, the pulse duration, and the phase shift selected based on the conditional phase angle θ of the controlled phase gate. Remarkably, this gate protocol is faster (total time 2τ=2.732π/Ω) than the traditional approach of sequential local pulses (total time 4π/Ω), and offers the additional advantage of requiring only global coupling of both qubits.

Figure 3A:
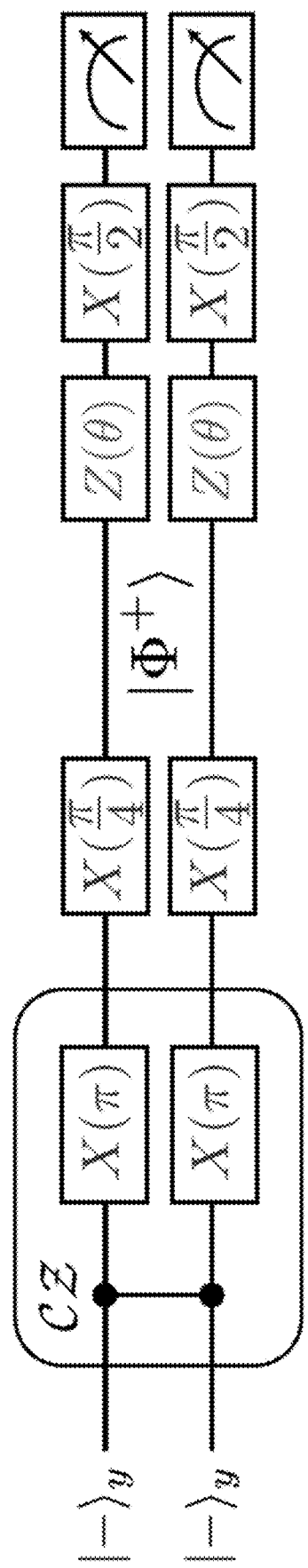
FIG. 3A is a schematic diagram representing a quantum circuit employed in example embodiments of the system described herein.
Figure 3B:
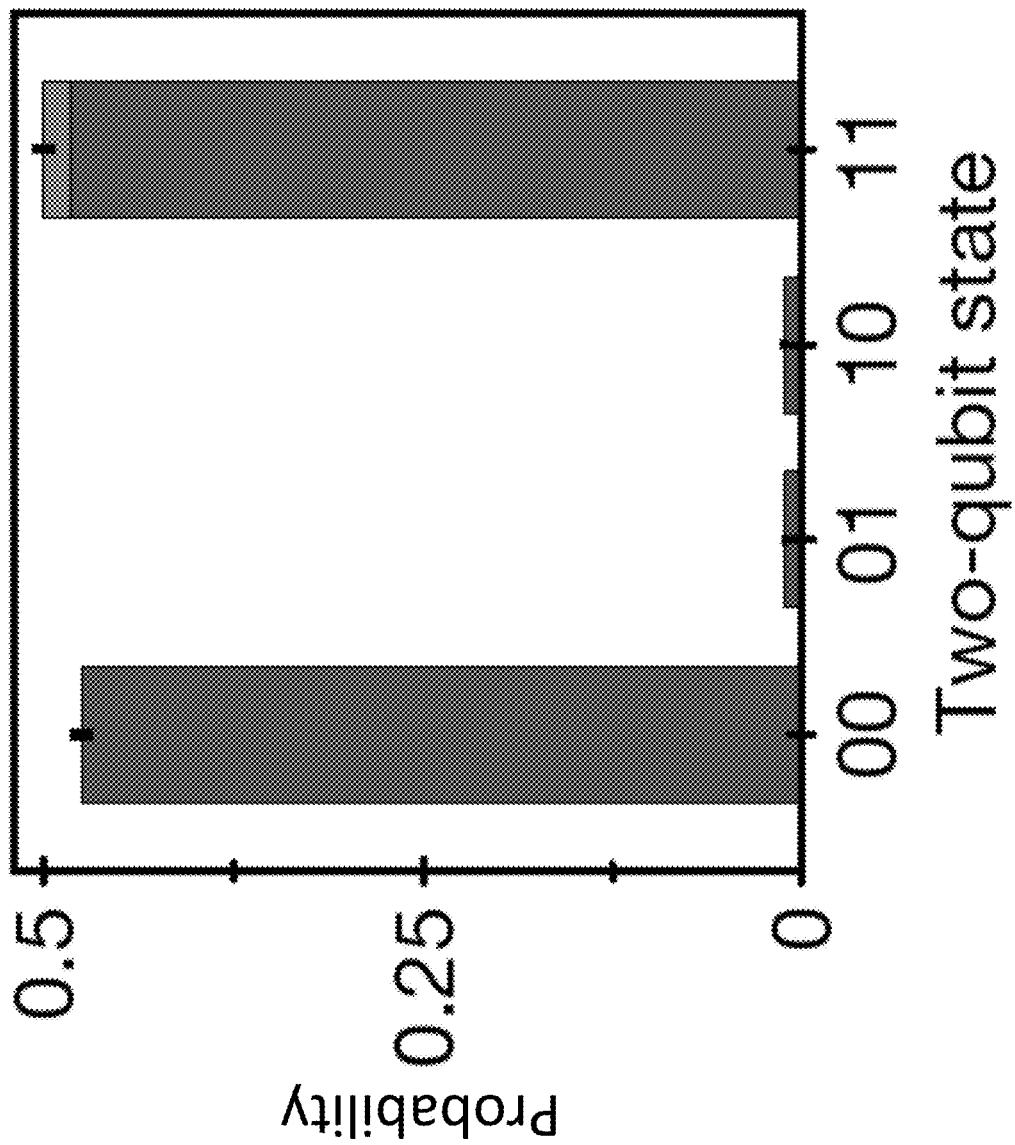
FIG. 3B is a plot of measured populations of computational basis states employed in example embodiments of the system described herein.
Figure 3C:
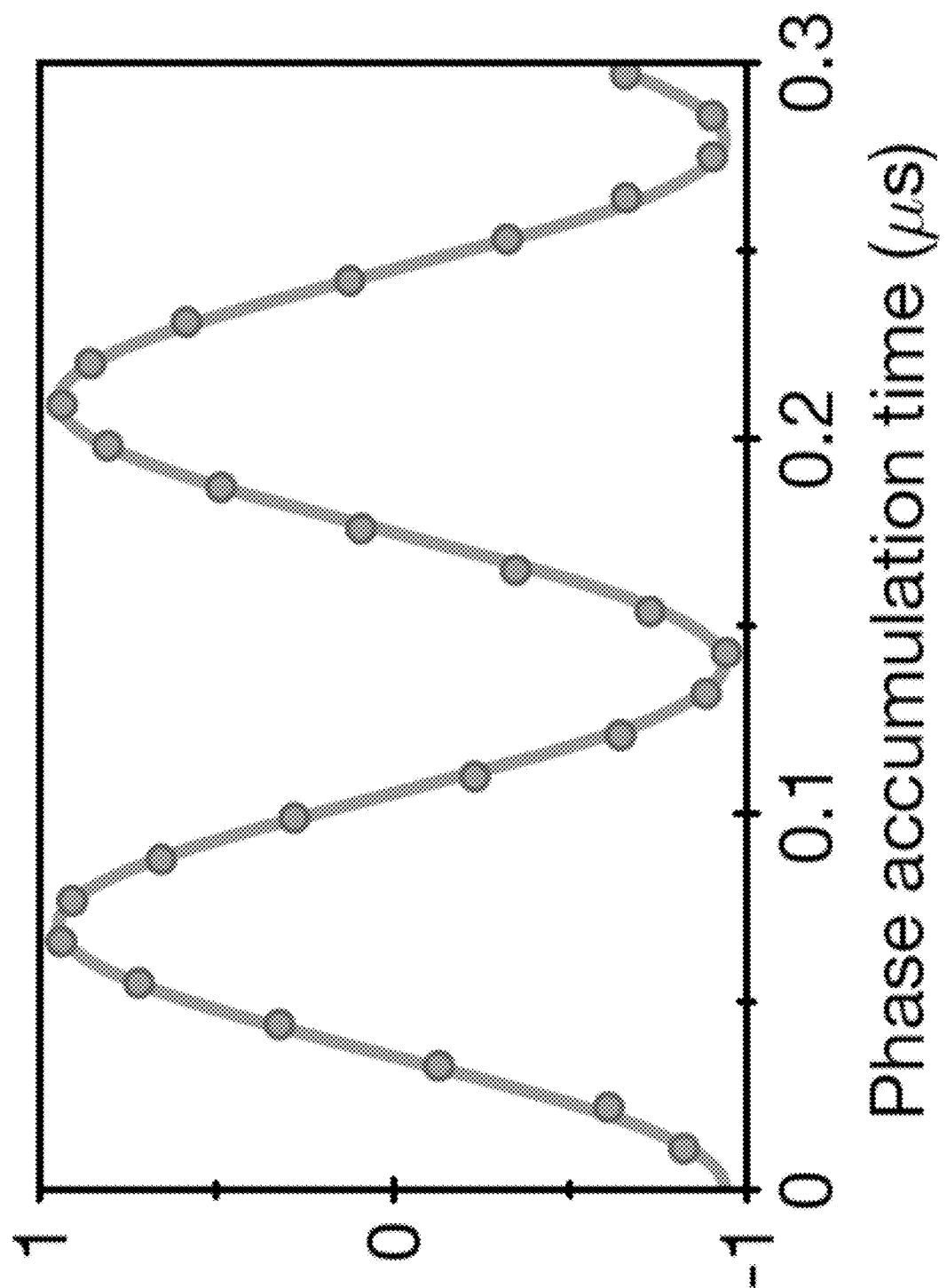
FIG. 3C is a plot of parity oscillations as a function of accumulated phase employed in example embodiments of the system described herein.
Figure 3D:
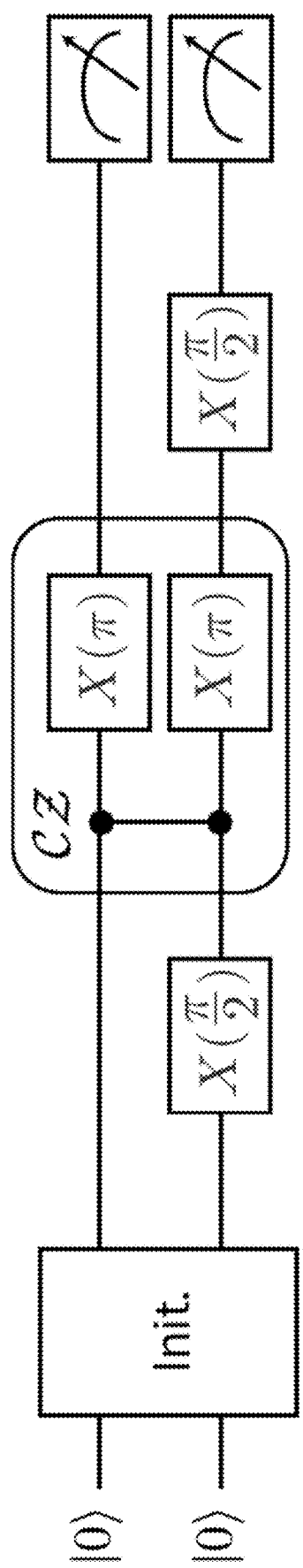
FIG. 3D is a schematic diagram representing a quantum circuit for a CNOT gate employed in example embodiments of the system described herein.

Parallel operation of the CZ gate is demonstrated on five separate pairs of atoms by using the CZ gate to create Bell states of the form $|\Phi^+\rangle=(1/\sqrt{2})(|00\rangle+|11\rangle)$ using the quantum circuit shown in FIG. 3A. All atomic qubits are initialized in $|0\rangle$, then a global X(π/2) Raman pulse is applied to prepare each atom in $|-\rangle_y=(1/\sqrt{2})(|0\rangle-i|1\rangle)$. The CZ gate protocol, consisting of the two Rydberg laser pulses, is then applied over a total time of 0.4 μs, during which time the optical tweezers are turned off to avoid antitrapping of the Rydberg state. The pulse sequence realizes map (1) discussed above and shown in FIG. 2B, along with an additional phase rotation on each qubit due to the light shift of the Rydberg lasers on the hyperfine qubit states. The CZ gate implementation is embedded in a spin echo sequence to cancel the effect of the light shift, and an additional short light shift is added to eliminate the single-particle phase φ, as described further below. Altogether, this realizes a unitary that combines the canonical $cz$ gate with a global X(π) gate as shown in FIGS. 3A and 3D. A final X(π/4) rotation produces the Bell state $|\Phi^+\rangle$, as shown in FIG. 3A and described further below.

The experimentally produced state p is characterized by evaluating its fidelity with respect to the target Bell state $\mathcal{F}=\langle\Phi^+|\rho|\Phi^+\rangle$. The fidelity is the sum of two terms, the first of which is the Bell state populations, given by the probability of observing $|00\rangle$ or $|11\rangle$, as shown in FIG. 3B. Raw measurements associating $|0\rangle$ with atom presence and $|1\rangle$ with atom absence yield 97.6(2)% in the target states. Separate measurements of leakage out of the qubit subspace indicate a small contribution to these probabilities: subtracting this contribution, the measured population is ≥95.8(3)%. The second term is the coherence between $|00\rangle$ and $|11\rangle$, measured by applying a global Z(θ) rotation followed by a global X(π/2) rotation, shown in FIG. 3A, and observing parity oscillations, shown in FIG. 3C. The parity oscillation with respect to accumulated phase θ has a measured amplitude of 94.2(4)%. The raw measurement outcomes result in a fidelity of $\mathcal{F}^{raw}\geq95.9(2)\%$. When evaluating the contributions to the fidelity, the atom population left in the Rydberg state is accounted for after the operation and after accounting for background losses. Both of these losses correspond to leakage out of the qubit subspace, and can lead to overestimation of the $|1\rangle$ population and Bell state fidelities in the raw measurements. Using separate measurements of atoms in both hyperfine qubit states, a conservative upper bound on these leakage errors is determined and subtracted, as described further below. The resulting lower bound on the Bell state fidelity is $\mathcal{F}\geq95.0(2)\%$.

Figure 3E:
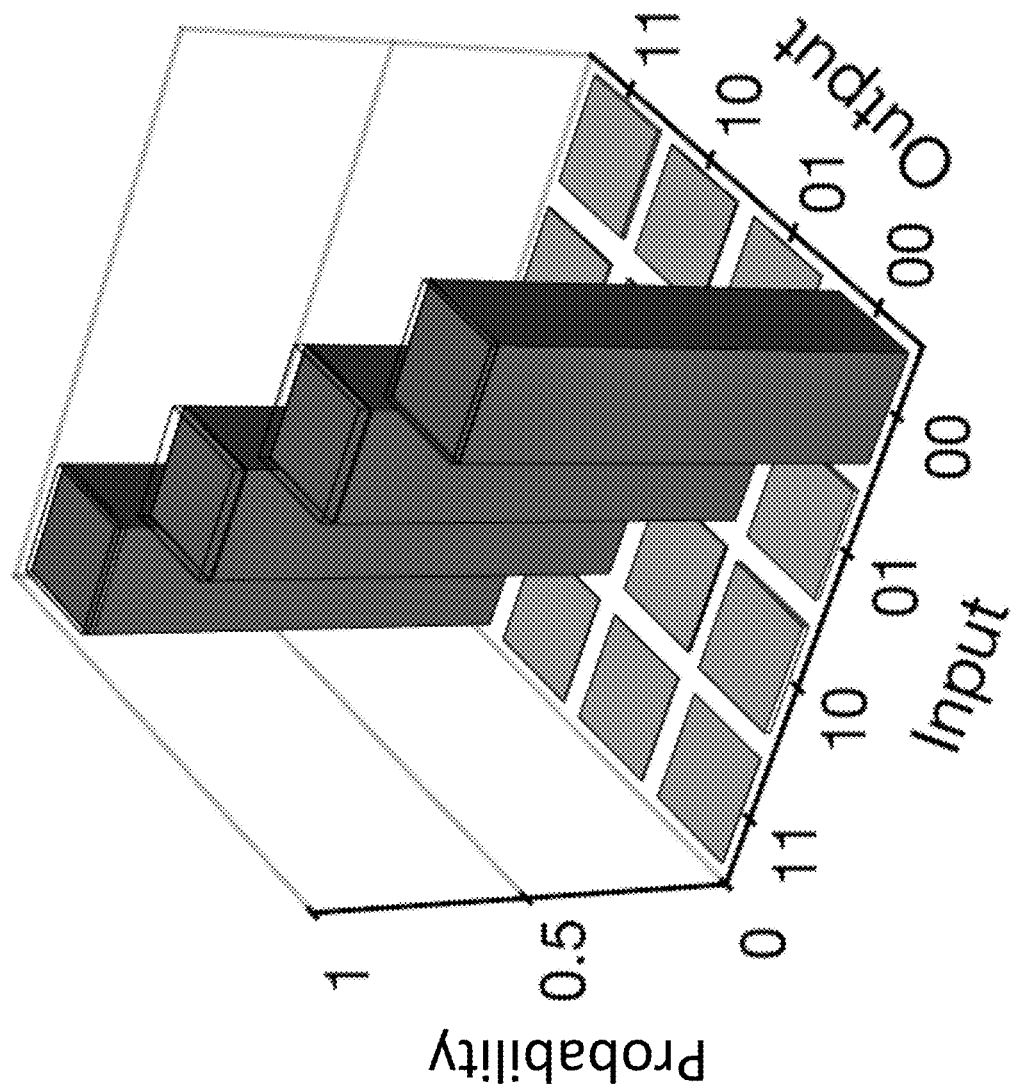
FIG. 3E is a plot of probabilities of four computational basis states employed in example embodiments of the system described herein.
Figure 3F:
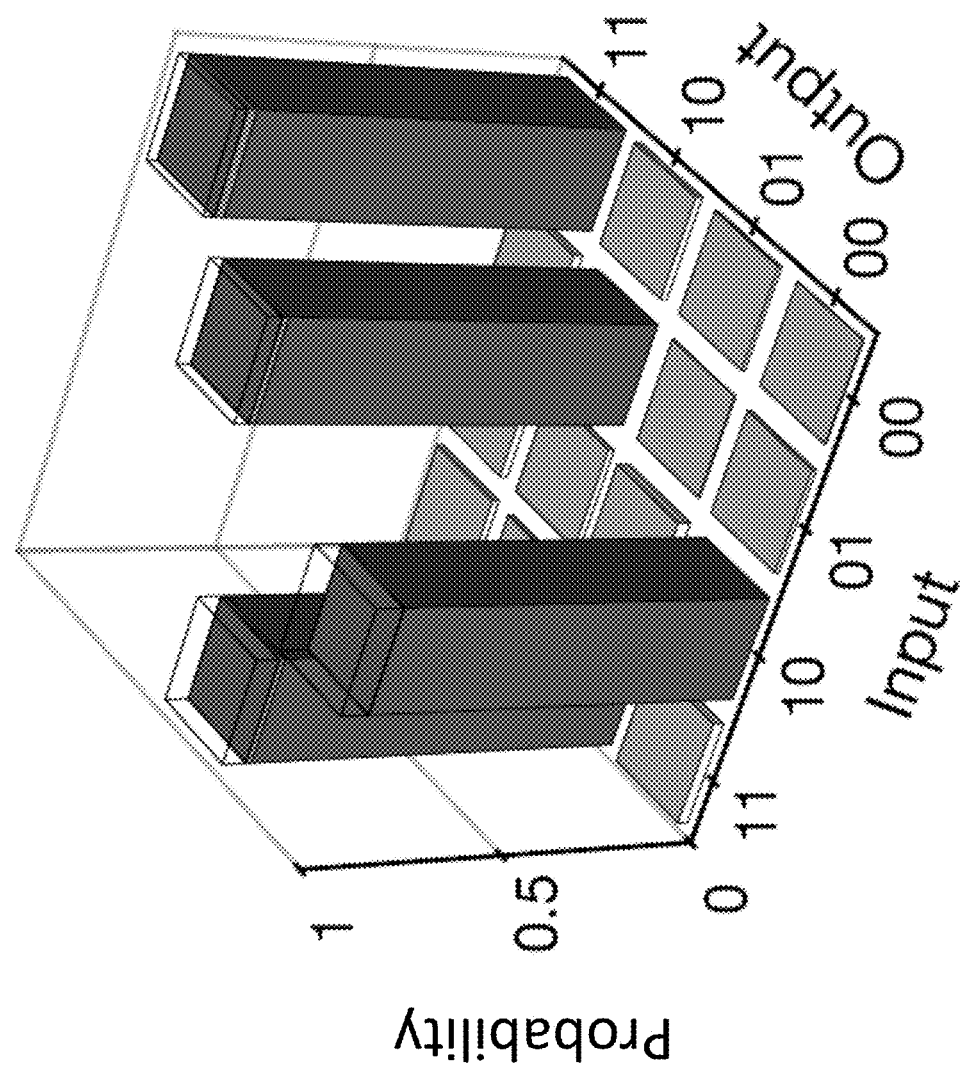
FIG. 3F is a plot of a CNOT truth table employed in example embodiments of the system described herein.

The measured Bell state fidelity includes errors in state preparation and measurement (SPAM), as well as errors in the two-qubit entangling gate. To characterize the entangling gate specifically, the error contributions from SPAM are evaluated (1.2(1)% per atom), and a SPAM-corrected fidelity $\mathcal{F}^c\geq97.4(3)\%$ is computed, as described further below. The majority of the remaining error is due to finite atomic temperature and laser scattering during Rydberg dynamics, as described further below. The native $cz$ gate is separately characterized by converting it to a controlled-NOT (CNOT) gate with the addition of local hyperfine qubit rotations, as shown in FIG. 3D. As shown in FIG. 3E, the four computational basis states are prepared with average fidelity of 96.8(2)%. The action of the CNOT gate is measured on each computational basis state to obtain its truth table fidelity to be $\mathcal{F}_{CNOT}\geq94.1(2)\%$, and $\mathcal{F}_{CNOT}^c\geq96.5(3)\%$, corrected for SPAM errors, as shown in FIG. 3F, and described further below.

Furthermore, control of multiple atomic qubits is extended to implement the three-qubit controlled-controlled-phase (CCZ) gate. This logic operation can be decomposed into five two-qubit gates. Instead, this multiple-control gate is realized directly by preparing three atoms in the nearest-neighbor blockade regime, such that both outer atoms constrain the behavior of the middle atom. The complicated three-atom dynamics makes it challenging to analytically construct global laser pulses that realize a CCZ gate in this configuration. Therefore, numerical optimization is used to construct a global amplitude and frequency modulated laser pulse which approximately implements the CCZ gate, as described further below. The laser pulse is optimized through the remote dressed chopped random basis (RedCRAB) optimal control algorithm.

Figure 4A:
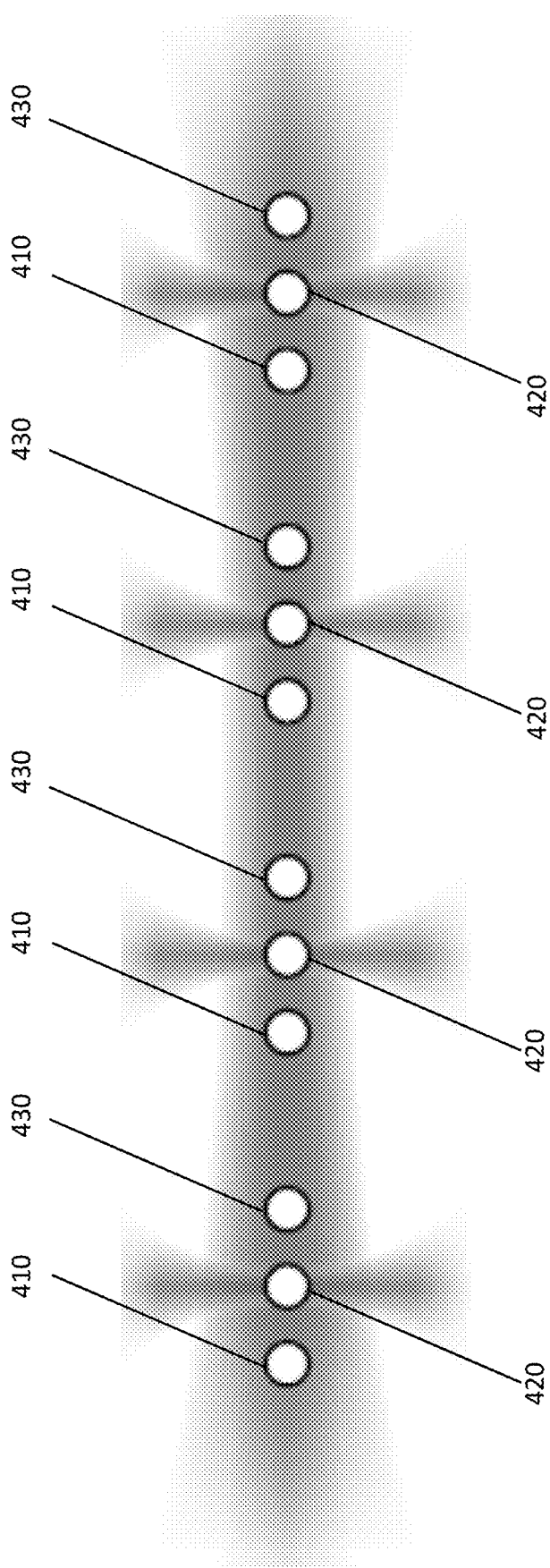
FIG. 4A is a schematic diagram representing atoms arranged in triplets employed in example embodiments of the system described herein.
Figure 4B:
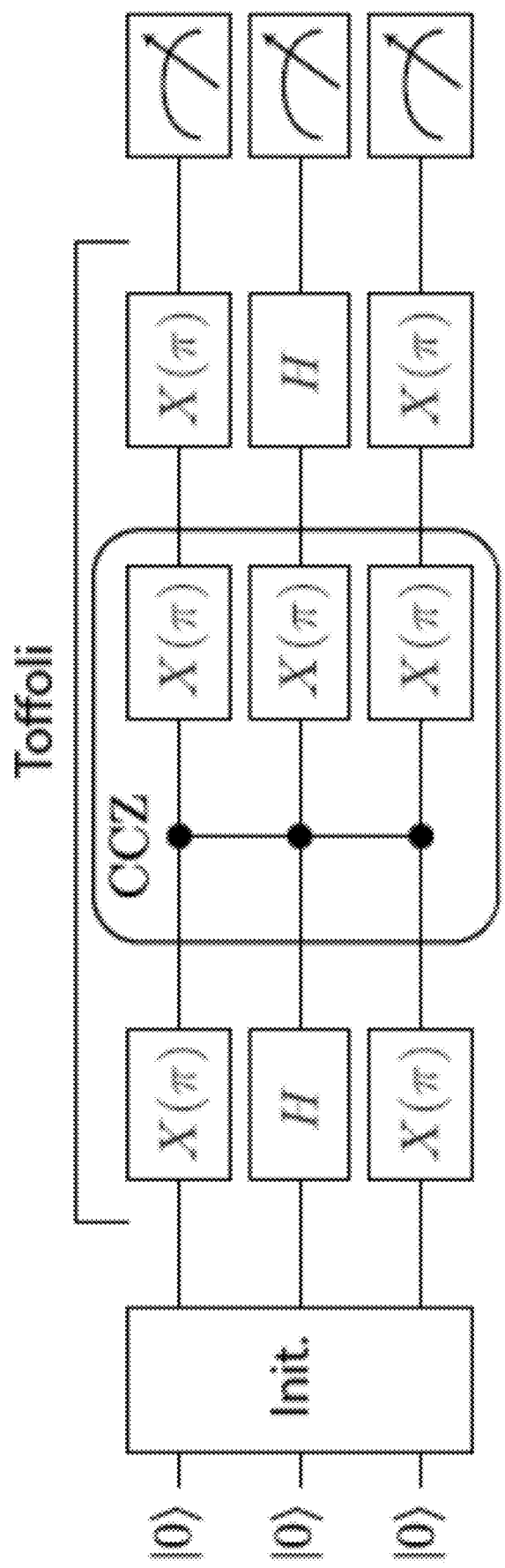
FIG. 4B is a schematic diagram representing a quantum circuit for a Toffoli gate employed in example embodiments of the system described herein.
Figure 4C:
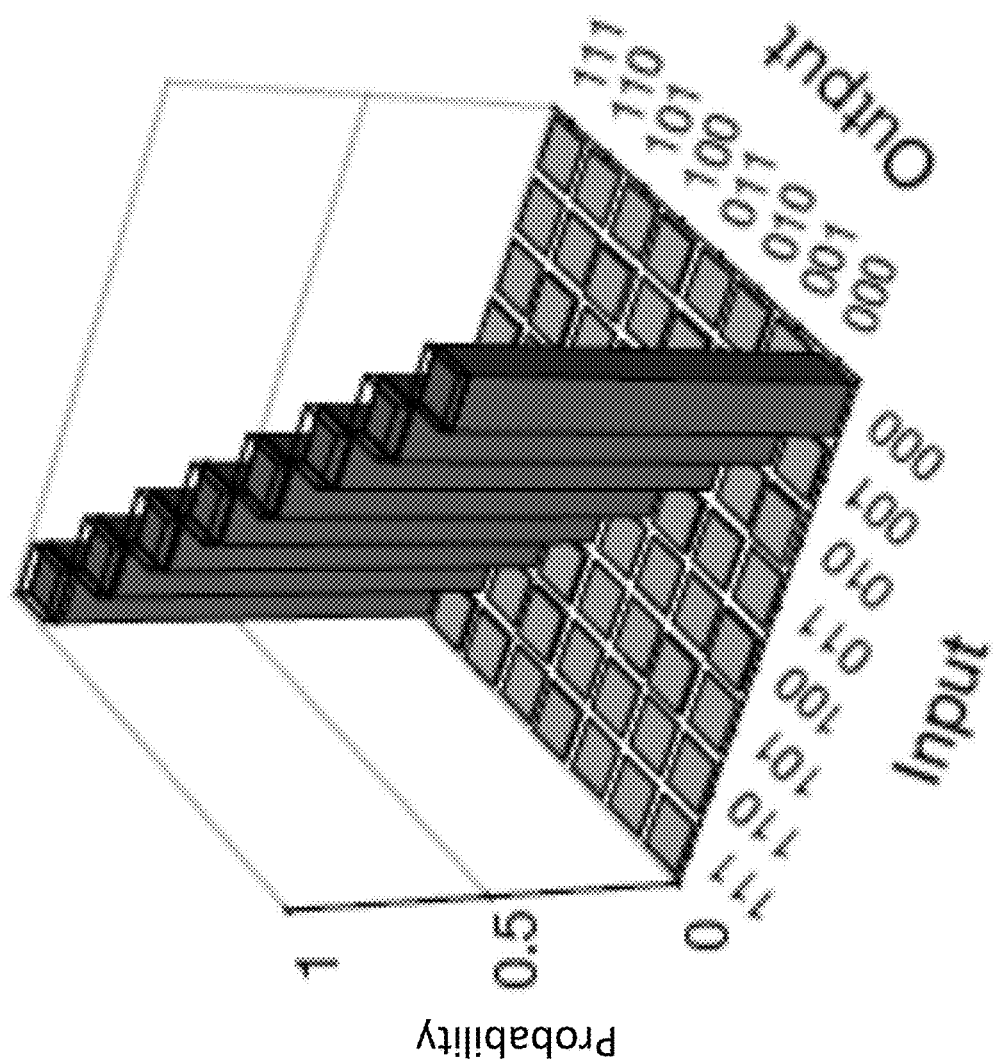
FIG. 4C is a plot of probabilities of eight computational basis states employed in example embodiments of the system described herein.
Figure 4D:
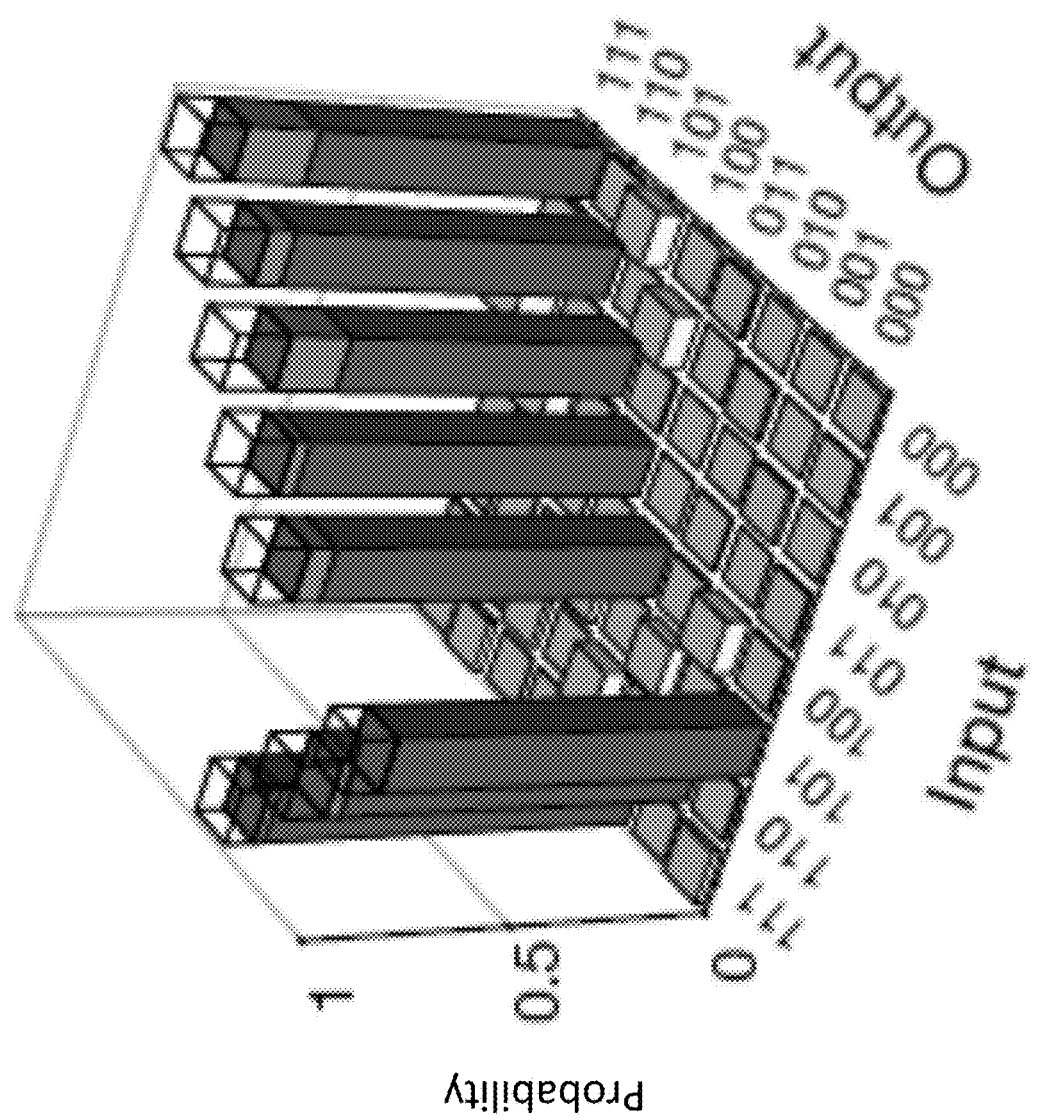
FIG. 4D is a plot of a Toffoli truth table employed in example embodiments of the system described herein.

The CCZ gate is implemented in parallel on four triplets of atomic qubits using the same lasers as for two-qubit gates described above, as shown in FIG. 4A. The three atoms 410, 420, and 430 in each triplet are arranged such that nearest neighbors (410, 420, and 420, 430) are blockaded by the strong 2π×24 MHz interaction, as in the two-qubit implementation. The edge atoms 410, and 430 interact with each other weakly (2π×0.4 MHz). As with the two-qubit gate, the CCZ gate is embedded in a spin echo sequence to cancel light shifts, such that the gate implements CCZ along with a global X(π) rotation. The performance of this three-qubit gate is characterized by converting it into a Toffoli gate by applying a local Hadamard on the middle atom 420 before and after the CCZ gate (along with edge X(π) pulses, to simplify implementation, as shown in FIG. 4B and described further below). Eight computational basis states are prepared with average fidelity of 95.3(3)%, as shown in FIG. 4C. The Toffoli gate is applied to each computational basis state to measure the truth table fidelity $\mathcal{F}_{Toff}\geq83.7(3)\%$, and $\mathcal{F}_{Toff}^c>87.0(4)\%$, corrected for SPAM errors, as shown in FIG. 4D, and described further below. Additionally, "limited tomography" was performed, consisting of truth table measurements in a rotated basis, to verify the phases of the Toffoli unitary in a more experimentally accessible manner than full process tomography. The limited tomography fidelity is $\mathcal{F}_{LT}^c\geq86.2(6)\%$, as described further below.

These results can be directly improved and extended along several directions. The fidelity of Rydberg coupling is primarily limited by finite atomic temperature and off-resonant laser scattering, which can be addressed by sideband cooling of atoms within optical tweezers and by higher power lasers. The background atomic loss and state preparation can be improved using higher quality vacuum systems and more sophisticated state preparation techniques. Finally, atomic qubit readout can be improved using recently demonstrated nondestructive readout protocols to give stronger constraints on the atomic populations.

While parallel gate implementation on spatially separated clusters of atoms was performed herein, the same approach can be extended to nonlocal coupling within contiguous atom arrays using local addressing with an additional off-resonant laser system. Specifically, subsets of the array could be simultaneously illuminated to create light shifts that bring them into resonance with a global resonant Rydberg excitation laser, as described further below. Furthermore, with more atoms arranged in the blockade volume, the controlled-phase gate demonstrated here can be extended to higher multiqubit gates with global coupling, as described further below. The dipolar interaction between S and P Rydberg states could also be used to achieve improved gate connectivity between qubits. A combination of the present results with recently demonstrated trapping and rearrangement of individual neutral atoms in two-dimensional (2D) and three-dimensional (3D) arrays will be well-suited for the implementation of deep quantum circuits or variational quantum optimization with hundreds of qubits. In addition, such a platform could be utilized to explore efficient methods for error correction and fault-tolerant operation to eventually enable scalable quantum processing.

Raman Laser

Transitions between qubit states are driven using a 795 nm Raman laser that is $2\pi \times 100$ GHz red-detuned from the $5S_{1/2}$ to $5P_{1/2}$ transition. The laser is coupled into a fiber-based Mach-Zehnder intensity modulator (Jenoptik AM785) that is DC biased around minimum transmission. The modulator is driven at half the qubit frequency ($\omega_{01}=2\pi \times 6.83$ GHZ), resulting in sidebands at $\pm 2\pi \times 3.42$ GHz, while the carrier and higher order sidebands are strongly suppressed. This approach is passively stable on the timescale of one day without any active feedback, in contrast with other approaches to generate sidebands through phase modulation and then separate suppression of the carrier mode with free-space optical cavities or interferometers.

Figure 5A:
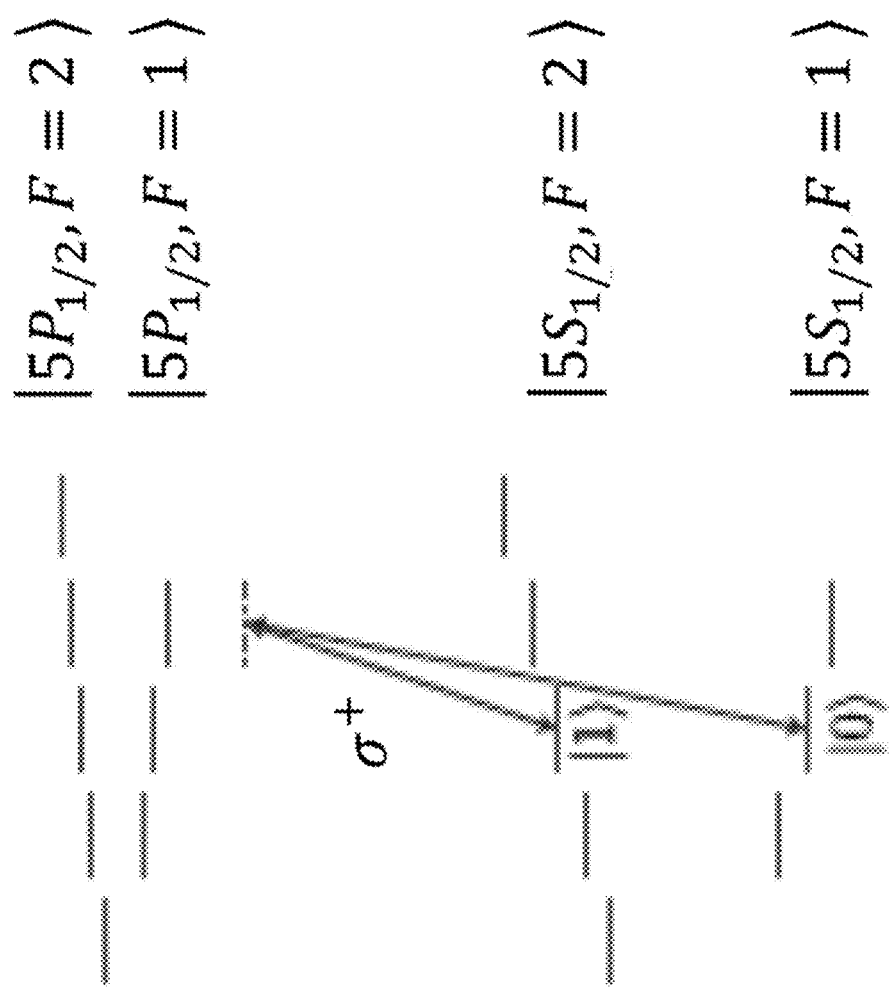
FIG. 5A is another schematic diagram representing relevant atomic levels employed in example embodiments of a system described herein.

The Raman laser is aligned along the array of atoms (co-aligned with the 8.5 G bias magnetic field) and is $\sigma^+$ polarized, such that the two sidebands coherently drive $\pi$ transitions between the F=1 and F=2 ground state manifolds with a Rabi frequency of $\Omega=2\pi \times 250$ kHz, as shown in FIG. 5A. The Raman drive light induces a differential light shift of $2\pi \times 20$ KHz on the qubit transition: the drive frequency of the intensity modulator is adjusted to correct for this light shift when a Raman pulse is applied.

Optical Pumping into |0⟩

Figure 5B:
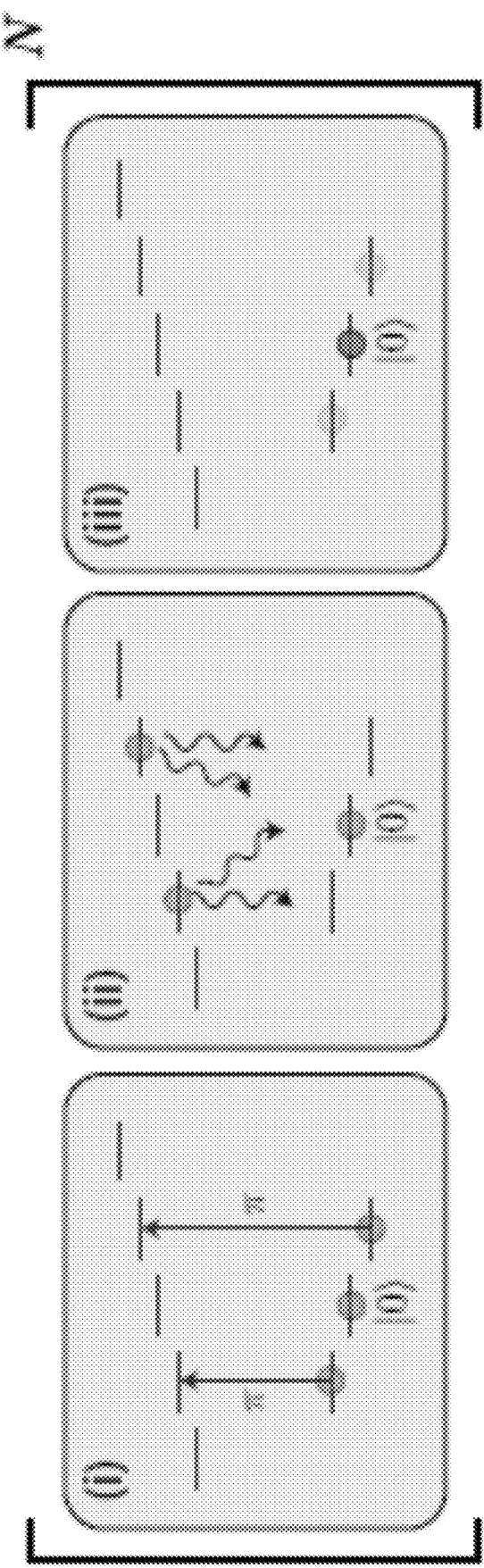
FIG. 5B is a schematic diagram representing Raman-assisted optical pumping employed in example embodiments of the system described herein.

Atoms are optically pumped into |0⟩ =|5S$_{1/2}$, F=1, m$_F$=0⟩ using a Raman-assisted pumping scheme with an 8.5 G magnetic field. As shown in FIG. 5B, coarse pumping of atoms into all m$_F$ states within the |5S$_{1/2}$, F=1⟩ manifold begins by shining resonant light on the |5S$_{1/2}$, F=2⟩ to |5P$_{3/2}$, F=2⟩ transition. A Raman $\pi$ pulse is then applied at a detuning that drives population from |F=1, m$_F$=−1⟩ to |F=2, m$_F$=−1⟩. A second pulse drives population from |F=1, m$_F$=+1⟩ to |F=2, m$_F$=+1⟩. The process then repeats by again coarse pumping any population that was transferred to F=2 back into the F=1 manifold. The net effect of one cycle is to transfer a portion of the population in |F=1, m$_F$=+1⟩ into |F=1, m$_F$=0⟩. This cycle is typically repeated 70 times over a duration of 300 μs to achieve a |0⟩ preparation fidelity of 99.3(1)%.

Rydberg Laser System

Atoms are coupled from |1⟩ =|5S$_{1/2}$, F=2, m$_F$=0⟩ to |r⟩ =|70S$_{1/2}$, m$_J$=−½⟩ through a two-color laser system at 420 nm and 1013 nm. The lasers are polarized to drive $\sigma^-$ and $\sigma^+$ transitions, respectively, through an intermediate state |6P$_{3/2}$⟩. In previous implementations using |5S$_{1/2}$, F=2, m$_F$=−2⟩ as the ground state level, selection rules ensured that only a single intermediate sublevel within |6P$_{3/2}$⟩ and only a single Rydberg state could be coupled. Additionally, the combined two-photon transition was magnetically insensitive.

Coupling from |1⟩ =|5S$_{1/2}$, F=2, m$_F$=0⟩ to Rydberg states, as described herein, adds a few complications. Firstly, multiple intermediate states are coupled and both |70S$_{1/2}$, m$_J$=+½⟩ sublevels within the Rydberg manifold can be reached. This requires working at a higher magnetic field to spectrally separate the m$_J$=+½ Rydberg levels. In the embodiments described herein, a magnetic field of 8.5 G produces a splitting between m$_J$=+½ of $2\pi \times 23.8$ MHz. The matrix element is also reduced in the coupling from |1⟩ to |r⟩ while the laser scattering rate stays the same: additionally, the transition is now magnetically sensitive. Nonetheless, this scheme benefits from high-quality qubit states |0⟩ and |1⟩ within the ground state manifold that can be easily coupled with a Raman laser system and that preserve coherence in optical tweezers. Note that the sensitivity to electric fields is unchanged in this scheme, but drifting or fluctuating electric fields can be bounded such that the Rydberg resonance varies by less than 50 KHz.

One additional complication in this implementation is coupling to another Rydberg state |r̄⟩. However, this coupling merely gives rise to an AC Stark shift that can be taken into account by appropriate renormalization of the detuning Δ.

Constructing Quantum Circuits from Native Single-Qubit Gates

All pulse sequences described above are decomposed into pre-calibrated single-qubit gates (and, where indicated above, global multi-qubit gates). The two single-qubit gates are X($\pi$/4), implemented globally on all qubits simultaneously, and Z($\pi$), implemented by a light shift from a laser focused onto a single atom. In practice, the local Z($\pi$) gates are applied to one atom from each cluster at the same time (i.e., the left atom of each cluster or the middle of each cluster).

Initializing Computational Basis States

Figure 5C:
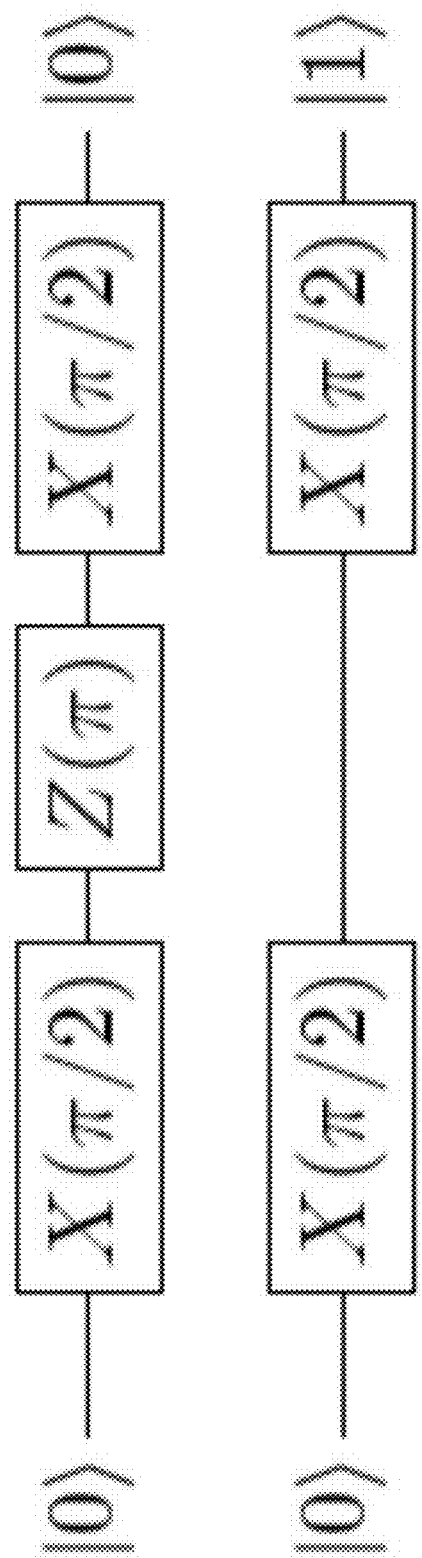
FIGS. 5C-5I are schematic diagrams representing quantum circuits employed in example embodiments of the system described herein.
Figure 5D:
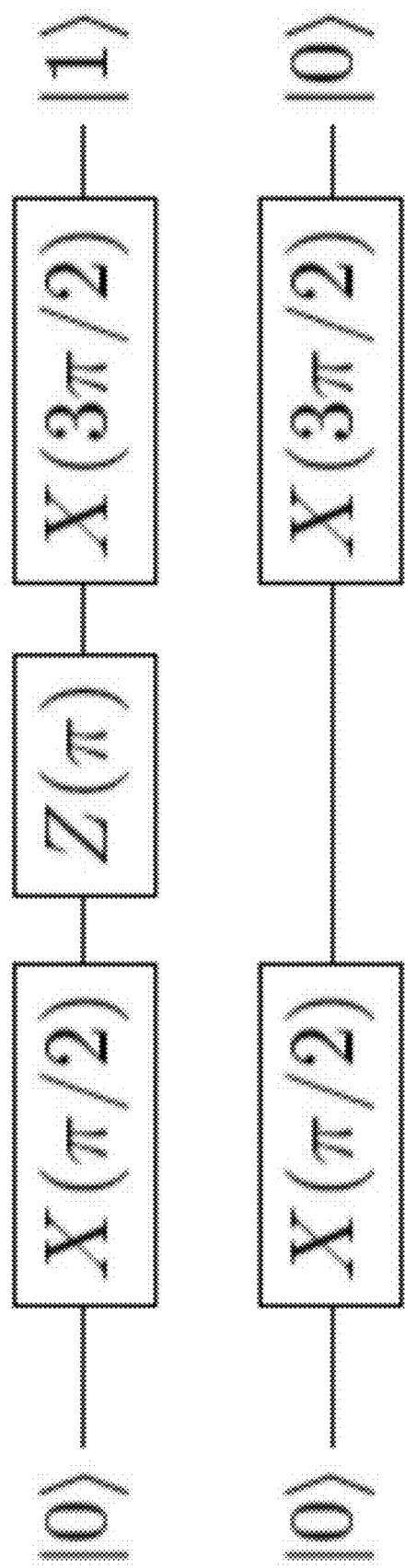

For two qubits, all four computational basis states are initialized using global X($\pi$/2) pulses (consisting of two sequential X($\pi$/4) gates) and local Z($\pi$) gates on the left atom only (top qubit in each circuit)). The |00⟩ state requires no pulses to prepare, and the |11⟩ state requires only a global X($\pi$) gate. The state |01⟩ is prepared as shown in FIG. 5C, and the state |10⟩ is prepared as shown in FIG. 5D.

Figure 5E:
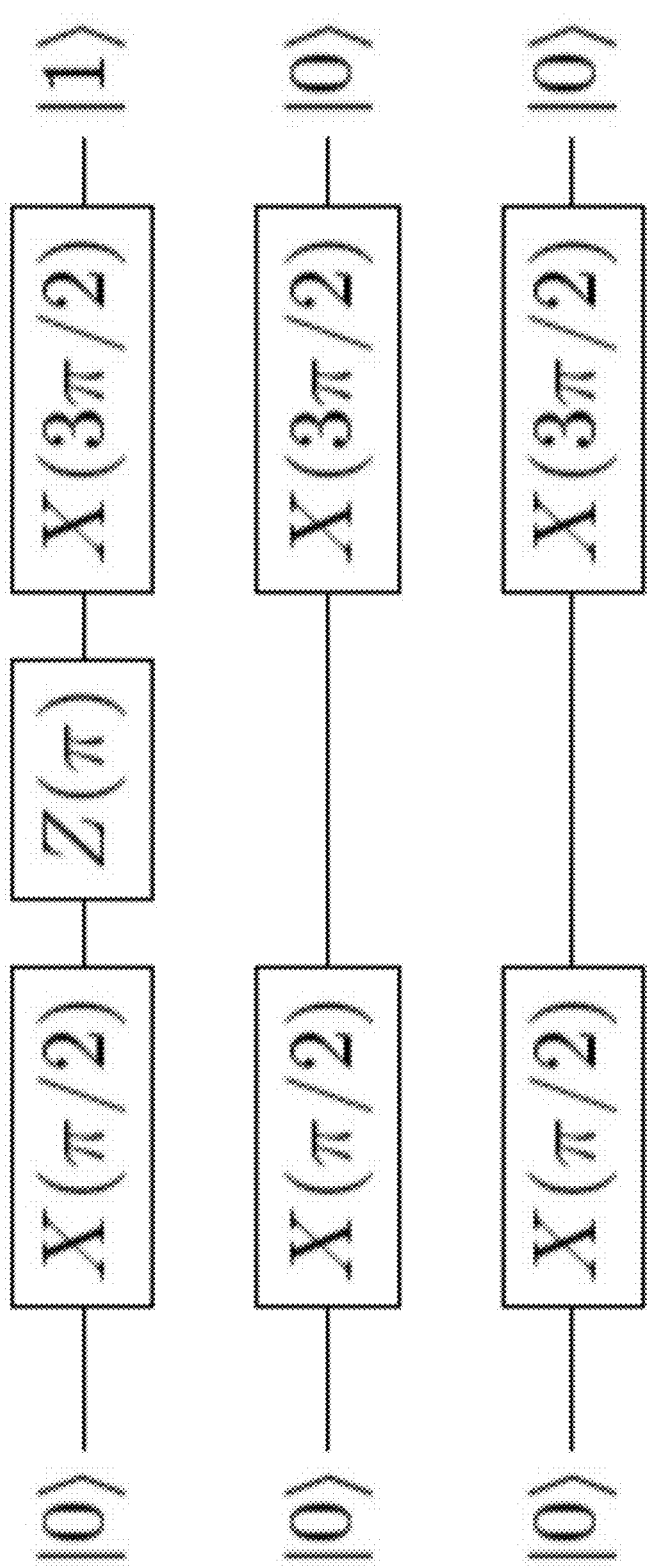
Figure 5F:
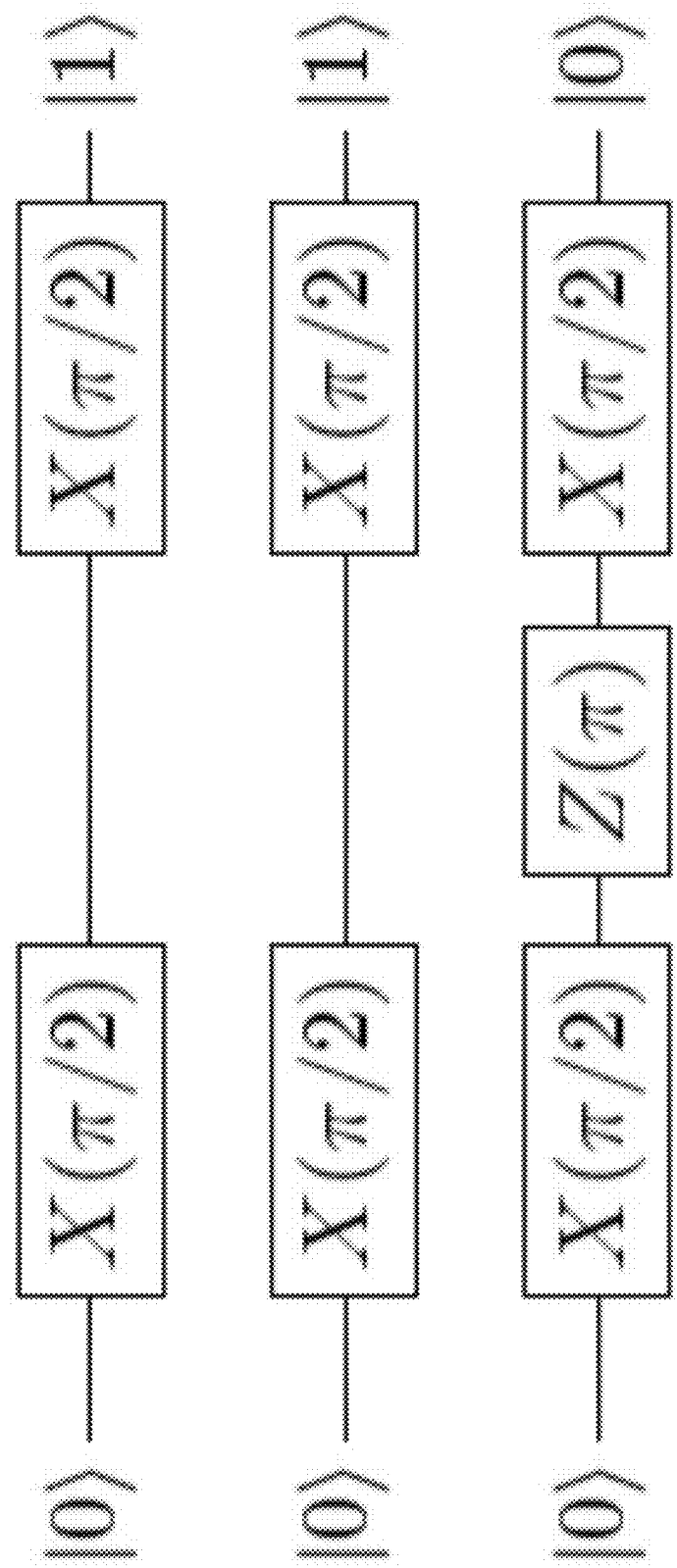

For three qubits, the eight computational basis states are again initialized using X($\pi$/2) pulses and local Z($\pi$) pulses that can be applied to any of the three atoms. |000⟩ and |111⟩ can again be prepared with either no operation or with a global X($\pi$) gate, respectively. Other states have one atom in |1⟩ and other two in |0⟩ or vice versa. How both configurations are prepared is illustrated herein by showing two examples. First, |100⟩ is prepared as shown in FIG. 5E. Second, preparation of |110⟩ requires instead local addressing on the rightmost atom, as shown in FIG. 5F.

Local X($\pi$/2) for CNOT Gate

Figure 5G:
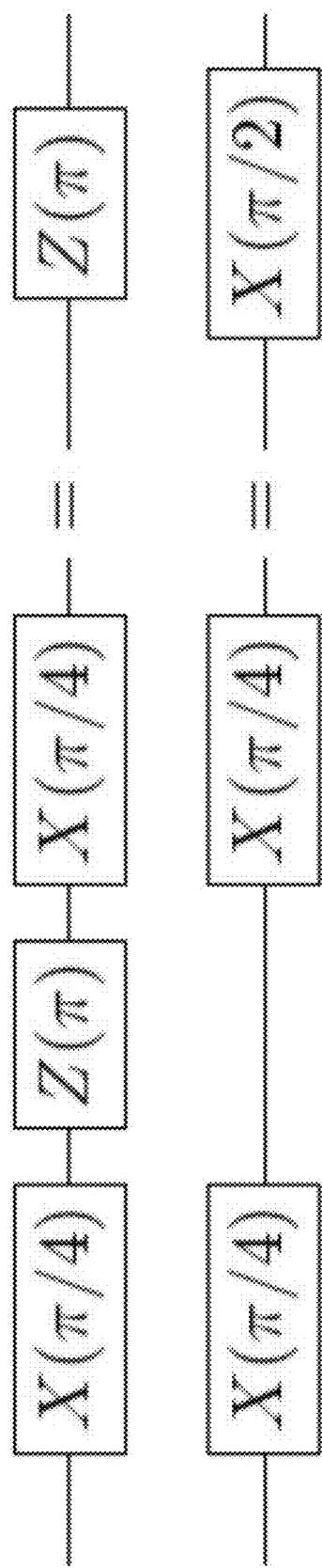

To convert the $cz$ gate to the CNOT gate, a local X($\pi$/2) is applied to the target atom before and after the gate, implemented as shown in FIG. 5G. The circuit shown in FIG. 5G applies a local X(π/2) on the right atom; while it additionally applies a Z(π) gate on the left atom, this circuit is only applied in a context in which the left atom is in a computational basis state |0⟩ or |1⟩, in which case the Z(π) gate only introduces a global phase and therefore plays no role. In general, applying additional Z(π) gates could be used to cancel the effect on the left atom, but this was not necessary for the implementations described herein.

Local Hadamard for Toffoli Implementation

Figure 5H:
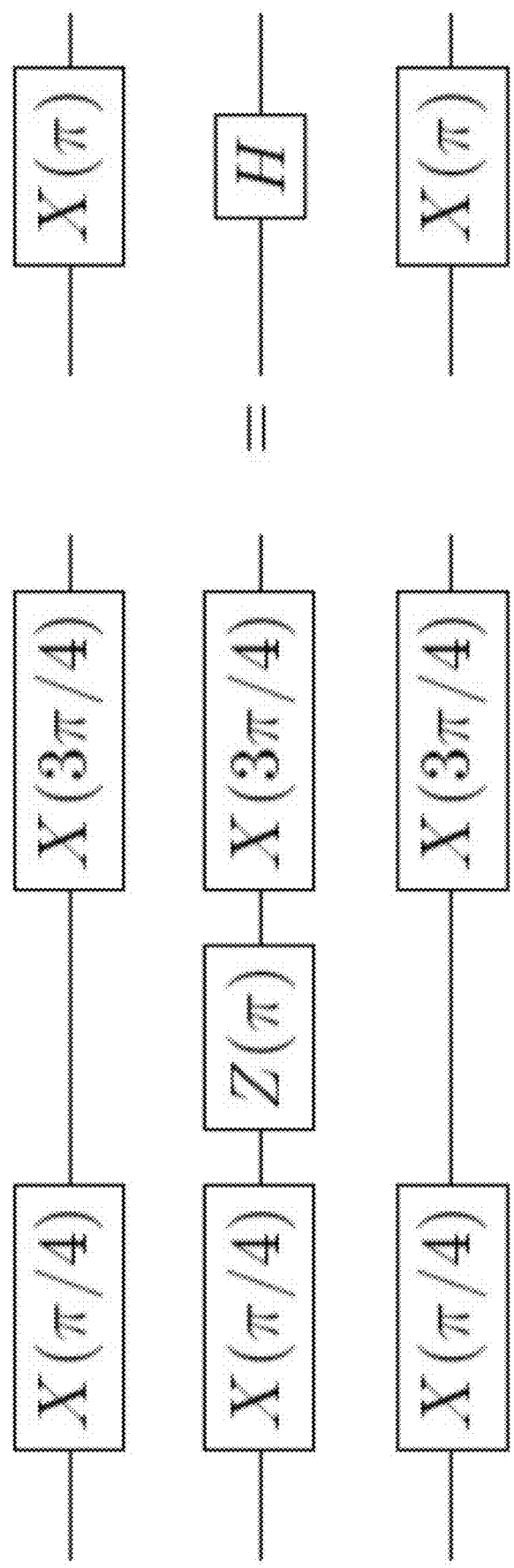

To convert the CCZ gate to a Toffoli gate, a local rotation is applied on the target (middle) qubit before and after the CCZ pulse. The simplest method to accomplish this given this native gate set is to apply a global X(π/4), followed by a local Z(π) on the middle qubit, and then a global X(3π/4), as shown in FIG. 5H.

On each edge qubit, the net effect is simply an X(π) gate. On the middle qubit, this sequence constitutes a Hadamard gate (defined along a different axis than the typical definition), where $$H = \frac{1}{\sqrt{2}}\begin{pmatrix} 1 & i \\ -i & -1 \end{pmatrix} \quad (2)$$

Design of Two-Qubit CZ Gate

This section provides a detailed theoretical discussion of the two-qubit gate realized herein. The desired unitary operation maps the computational basis states as follows:

$$|00\rangle \to |00\rangle, \quad (3)$$
$$|01\rangle \to |01\rangle$$
$$|10\rangle \to |10\rangle$$
$$|11\rangle \to |11\rangle e^{i\pi}.$$

Up to a global gauge choice (i.e., a global rotation of the qubits), this is equivalent to the following gate:

$$|00\rangle \to |00\rangle, \quad (4)$$
$$|01\rangle \to |01\rangle e^{i\phi_1}$$
$$|10\rangle \to |10\rangle e^{i\phi_1}$$
$$|11\rangle \to |11\rangle e^{i(2\phi_1+\pi)}$$

where $\phi_1$ is arbitrary.

To realize such a gate, both atoms are driven globally and homogeneously with a laser that couples state |1⟩ to the Rydberg state |r⟩. This can be achieved via a single laser field or by a two-photon process. The Hamiltonian governing the dynamics of a pair of atoms is given by $$H = \sum_{i=1}^{2} \frac{1}{2}(\Omega|1\rangle_i\langle r| + \Omega^*|r\rangle_i\langle 1|) - \Delta|r\rangle_i\langle r| + V|r\rangle_1\langle r| \otimes |r\rangle_2\langle r|$$

where $\Delta$ is the detuning of the excitation laser from the transition frequency between states |1⟩ and |r⟩, and $\Omega$ is the corresponding Rabi frequency. The interaction strength between two atoms in Rydberg states is given by V. In the following analysis, it is first assumed that V>>|Ω|, |Δ|, which can be realized by trapping the atoms sufficiently close to each other. This so-called Rydberg blockade regime simplifies the following description, but is not required for the realization of the gate.

The dynamics of the system decouple into a few simple sectors:

(i) The state |00⟩ does not evolve.
(ii) If one of the atoms in in |0⟩, only the other system evolves. The dynamics are thus equivalent to that of a two-level system (TLS) with states |1⟩=|a₁⟩ and |r⟩=|b₁⟩ and Hamiltonian $$H_1 = \frac{1}{2}(\Omega|a_1\rangle\langle b_1| + \Omega^*|b_1\rangle\langle a_1|) - \Delta|b_1\rangle\langle b_1|.$$

(iii) If both atoms are initially in state |1⟩, then the dynamics are again equivalent to that of an effective single TLS, formed by the states |11⟩=|a₂⟩ and $$\frac{1}{\sqrt{2}}(|r, 1\rangle + |1, r\rangle) = |b_2\rangle,$$

with Hamiltonian $$H_2 = \frac{\sqrt{2}}{2}(\Omega|a_2\rangle\langle b_2| + \Omega^*|b_2\rangle\langle a_2|) - \Delta|b_2\rangle\langle b_2|.$$

This assumes a perfect Rydberg blockade, equivalent to V→∞. Note, however, that this assumption simplifies the analysis, but is not necessary to realize the gate described herein.

The controlled-phase gate can be constructed from two identical pulses of the Rydberg laser field, with equal duration rand detuning Δ, along with a phase jump (i.e., relative phase shift) by ξ in between. Each pulse changes the state of the atoms according to the unitary U=exp(−iHτ). The change of the laser phase between pulses, $\Omega \to \Omega e^{i\xi}$, effectively corresponds to driving the system around a different axis on the Bloch sphere.

Consider how the four computational basis states evolve under the action of $\mathcal{U}$, which describes the effect of both laser pulses combined. First, note that $\mathcal{U}$ |00⟩ =|00⟩. Thus, the unitary $\mathcal{U}$ maps the state |00⟩ as expected for the CZ gate.

Next, consider the evolution of state | 11⟩, wherein all qubits in the grouping begin in the quantum state |1⟩. The length or duration of each pulse τ is, optionally, chosen such that a system prepared in state |11⟩ undergoes a complete, detuned Rabi oscillation and returns to the state |11⟩ already after the first laser pulse; that is U|11⟩ =$e^{i\phi_2/2}$|11⟩. The return to the state |11⟩ is ensured by the choice of τ as $$\tau = 2\pi / \sqrt{\Delta^2 + 2\Omega^2} \quad (5)$$

The second laser pulse also leads to a complete, detuned Rabi cycle about a different axis, such that all qubits in the grouping return to the quantum state |1⟩ upon completion of each of the first and the second laser pulses, with the second laser pulse resulting in the same accumulated phase. In total, U|11⟩ =$e^{i\phi_2}$|11⟩. The dynamical phase accumulated by this process is given by $\phi_2=2\pi\times2\Delta/\sqrt{\Delta^2+2\Omega^2}$.

Finally, consider the evolution of the states |01⟩ and |10⟩. In each case, this evolution is also described by a detuned Rabi oscillation. However, due to the mismatch between the effective Rabi frequencies in H$_1$ and H$_2$, the state |10⟩ (|01⟩) does not return to itself after the time τ but a superposition state is created: U|10⟩ =cos(α)|10⟩ +sin(β) $e^{i\gamma}$|r0⟩, and U|01⟩ =cos(α)|01⟩ +sin(β)$e^{i\gamma}$|0r⟩. The real coefficients α, β, and γ, are determined by the choice of Ω, Δ, and τ. By a proper choice of the phase jump (i.e., relative phase shift) between the first and the second laser pulse, ξ, one can always guarantee that the system returns to the state |10⟩ (|01⟩) after the second laser pulse. The phase jump can be calculated as $$e^{-i\xi} = \frac{-\sqrt{y^2+1}\cos\left(\frac{1}{2}s\sqrt{y^2+1}\right)+iy\sin\left(\frac{1}{2}s\sqrt{y^2+1}\right)}{\sqrt{y^2+1}\cos\left(\frac{1}{2}s\sqrt{y^2+1}\right)+iy\sin\left(\frac{1}{2}s\sqrt{y^2+1}\right)} \quad (6)$$

where y=Δ/Ω and s=Ωτ. With this choice of the phase, U|10⟩ =$e^{-i\phi_1}$|10⟩ and U|01⟩ =$e^{-i\phi_1}$|01⟩, and each qubit that begins in quantum state |1⟩ returns to the state |1⟩ upon completion of the first and second laser pulses. The acquired dynamical phase can be calculated using straightforward algebra, and is a function of Δ/Ω, τΩ, and ξ. As τ is fixed in Equation (5), and ξ is fixed in Equation (6), $\phi_1$ is actually solely determined by the dimensionless quantity Δ/Ω. Note that $\phi_2$ is also only a function of Δ/Ω. However, the functional dependence is different, and a choice can be found for Δ/Ω such that $e^{i\phi_2}=e^{i(2\phi_1+\pi)}$, as shown in FIG. 2H. With these selected values for the set of parameters of the first and second laser pulses, the parameters selected from the relative phase shift, the laser frequency, the laser intensity, and the pulse duration, the gate given in map (4) is exactly obtained, which is equivalent to the controlled-phase gate map (3) (up to trivial single qubit rotations). The corresponding numerical values of the relevant parameters are:

$$\Delta/\Omega = 0.377371 \quad (7)$$

$$\xi = 3.90242 \quad (8)$$

$$\Omega\tau = 4.29268 \quad (9)$$

where ξ has units of radians.

Note that, as described further below, this construction can be generalized to multi-qubit controlled-phase gates in fully blockaded systems with more than two atoms.

Accounting for Imperfect Blockade

The above analysis is based on the perfect blockade mechanism. Finite blockade interactions (and other imperfections, such as coupling to other Rydberg states) can be accounted for, and lead only to an effective renormalization of the parameters given in Equations (7-9). To see this, note that a finite value of V only affects the dynamics if the system is initially in the state |11⟩. Instead of being restricted to the two states |$a_2$⟩=|11⟩ and |$b_2$⟩ =(|1r⟩ +|r1⟩), a third state |c⟩ =|rr⟩ has to be considered, and H$_2$ is replaced by $$H_2 = \frac{\sqrt{2}}{2}(\Omega|a_2\rangle\langle b_2|+\Omega|b_2\rangle\langle c_2|+\Omega^*|c_2\rangle\langle b_2|+\Omega^*|b_2\rangle\langle a_2|) - \quad (10)$$
$$\Delta|b_2\rangle\langle b_2|+(V-2\Delta)|c_2\rangle\langle c_2|.$$

For V>>|Δ|, |Ω|, the effect for finite blockade simply reduces to the two-level system {|$a_2$⟩, |$b_2$⟩} where Δ is renormalized by an amount $\Omega^2/(2V)$. Even for small V>0 and a given Δ, Ω and τ can always be chosen such that the system initialized in the state |$a_2$⟩ returns to the state |$a_2$⟩ after the first pulse. Thus, finite blockade simply replaces the complete Rabi oscillation in the fully blockaded regime by a slightly more complicated, but still closed path in a two-dimensional Hilbert space. The analysis of the dynamics of the other computational basis states is unaffected by the finite value of V. It is thus straightforward to ensure that a system initially in the state |10⟩ returns to |10⟩ for each choice of V and Δ. This enables one to use Δ as a control knob for the relative dynamical phases acquired by |11⟩ and |10⟩, and thus realize a CZ gate for all values of V. Three example solutions are listed in Table 1.

TABLE 1

| Example 1 | Example 2 | Example 3 |
|---|---|---|
| V/Ω = 2.7685 | V/Ω = 4.31092 | V/Ω = 7.28278 |
| Δ/Ω = 0.539911 | Δ/Ω = −0.320228 | Δ/Ω = −0.342217 |
| ζ = −2.21031 | ζ = 2.52094 | ζ = 2.46328 |

Experimental Calibration of CZ Gate

The CZ gate requires two laser pulses with a relative phase shift between them. The detuning of the two pulses Δ is determined relative to the experimentally calibrated Rydberg resonance by numerical calculations. The pulse time and the phase jump between pulses both require experimental calibration due to perturbations in timing and phase associated with an acousto-optic-modulator (AOM)-based control system. The pulse time τ is calibrated first by preparing both atoms in the qubit pair in |1⟩ and driving at detuning Δ to the Rydberg state. Detuned Rabi oscillations to the symmetrically excited state $$|W\rangle = \frac{1}{\sqrt{2}}(|1r\rangle + |r1\rangle)$$

are observed, and the pulse time at which the population returns fully to |11⟩ is extracted.

After fixing t, only single isolated atoms are prepared in |1⟩ and two pulses of length tare driven with a variable relative phase. The relative phase ξ is fixed by identifying the phase for which the single atom returns fully to |1⟩ by the end of the sequence.

Finally, a calibration is described herein of the global phase shift necessary to convert the CZ gate (with single-particle phase ø) into the canonical form:

$$\mathcal{CZ} = \begin{pmatrix} 1 & 0 & 0 & 0 \\ 0 & -1 & 0 & 0 \\ 0 & 0 & -1 & 0 \\ 0 & 0 & 0 & -1 \end{pmatrix}. \quad (11)$$

This phase correction is implemented by applying the global 420 nm laser for a fixed time in the absence of the 1013 nm Rydberg light; this avoids any resonant Rydberg excitation and instead only adds a phase shift. To calibrate the phase correction, the Bell state sequence is applied, in which an attempt is made to prepare the Bell state $|\Phi^+\rangle$ and then an additional $X(\pi/2)$ rotation is applied to both qubits. If the phase correction is optimal, then the state $|\Psi^+\rangle$ should be prepared, which can be measured in populations. The global phase correction is varied to maximize the measured populations in $|\Psi^+\rangle$ at the end of this sequence.

Preparation of Bell State Using $\mathcal{CZ}$ Gate and $\pi/4$ Pulse

The global implementation of the $\mathcal{CZ}$ gate described herein enables the preparation of Bell states with no local addressing. The protocol is most naturally understood by describing the two-qubit system in the Bell basis:

$$|\Psi^\pm\rangle = \frac{1}{\sqrt{2}}(|01\rangle \pm |10\rangle) \quad (12)$$

$$|\Phi^\pm\rangle = \frac{1}{\sqrt{2}}(|00\rangle \pm |11\rangle) \quad (13)$$

The system is prepared in $|11\rangle$, and after a global $X(\pi/2)$ pulse, the following state is prepared:

$$|\psi_1\rangle = \frac{1}{2}(|00\rangle - i|01\rangle - i|10\rangle - |11\rangle) \quad (14)$$

The controlled phase gate creates the state $$|\psi_2\rangle = \mathcal{CZ}|\psi_1\rangle = \frac{1}{2}(|00\rangle - i|01\rangle - i|10\rangle - |11\rangle) \quad (15)$$

$$= \frac{1}{\sqrt{2}}(|\Phi^+\rangle + i|\Psi^+\rangle) \quad (16)$$

The states $|\Phi^+\rangle$ and $|\Psi^+\rangle$ are both within the triplet manifold of the two qubits and are coupled resonantly by a global drive field to form an effective two-level system with twice the single-particle Rabi frequency. A $\pi/2$ pulse within this effective two-level system corresponds to a $\pi/4$ pulse at the single-particle Rabi frequency, and maps:

$$|\psi_2\rangle = \frac{1}{\sqrt{2}}(|\Phi^+\rangle + i|\Psi^+\rangle) \to |\psi_3\rangle = |\Phi^+\rangle \quad (17)$$

Implementation of the CCZ Gate

One can generalize the above two-qubit gate to a 3-qubit gate controlled-controlled-phase gate with a mapping given by $$\begin{aligned}
|000\rangle &\to |000\rangle \\
|001\rangle &\to |001\rangle e^{i\phi_1} \\
|010\rangle &\to |010\rangle e^{i\phi_1} \\
|100\rangle &\to |100\rangle e^{i\phi_1} \\
|011\rangle &\to |011\rangle e^{2i\phi_1} \\
|101\rangle &\to |101\rangle e^{2i\phi_1} \\
|110\rangle &\to |110\rangle e^{2i\phi_1} \\
|111\rangle &\to |111\rangle e^{i(3\phi_1+\pi)}
\end{aligned} \quad (18)$$

which is equivalent to a controlled-controlled-phase gate (up to global single qubit rotations).

The dynamics of the three atoms involved are described by the Hamiltonian $$H = \sum_{i=1}^{3}\left(\frac{\Omega}{2}(|1\rangle_i\langle r| + |r\rangle_i\langle 1|) - \Delta|r\rangle_i\langle r|\right) +$$

$$V_{1,2}|r\rangle_1\langle r| \otimes |r\rangle_2\langle r| + V_{2,3}|r\rangle_2\langle r| \otimes |r\rangle_3\langle r| + V_{1,3}|r\rangle_1\langle r| \otimes |r\rangle_3\langle r|$$

Consider an arrangement of the three atoms such that they are all within the blockade radius, that is, all qubits in the grouping are mutually blockaded such that effectively no two atoms can be simultaneously excited to the Rydberg state, meaning that $V_{i,j} \gg |\Omega| \gg |\Delta|$. Then, the only difference from the discussion above of the 2-qubit controlled-phase gate is that now there is an additional two-level system that has to be considered, with states $$|111\rangle = |e\rangle$$

and $$\frac{1}{\sqrt{3}}(|11r\rangle + |1r1\rangle + |r11\rangle) = |f\rangle,$$

and Hamiltonian $$H_3 = \frac{\sqrt{3}\,\Omega}{2}(|e\rangle\langle f| + |f\rangle\langle e|) - \Delta|f\rangle\langle f|.$$

A sequence of pulses interspersed with jumps (i.e., relative phase changes) of the laser driving phase is used to realize a doubly-controlled-phase gate, as described by $$\mathcal{U} = \prod_{l=1}^{p} \exp(-i\xi_l)\exp(-iH\tau). \quad (19)$$

This pulse sequence is a generalization of the above two-qubit pulse sequence, with p cycles (of equal length, Rabi frequency, and detuning), interspersed with p−1 relative changes of the laser phase ($\xi_p = 0$ without loss of generality). The controlled-controlled-phase gate can be realized with p=6 pulses and a palindromic (e.g., symmetric) sequence of pulses, where $\xi_l = \xi_{p-l}$.

As used herein, the term "palindromic," when referring to a sequence (a train) of ordered pulses, means that the sequence remains the same when reversed in order. An example of a palindromic sequence of laser pulses is a "symmetrical" sequence, i.e., a sequence of laser pulses that starts at time $t=t_0$ and terminates at time $t=t_1$, characterized in that the plot of the amplitude of laser light as a function of time $A=A(t)$ has a reflection symmetry about the line $t=_{1/2}(t_1-t_0)$.

The pulse length or duration is again, optionally, chosen (N=K=3) to be $$\tau = 2\pi \Big/ \sqrt{\Delta^2 + 3\Omega^2}, \quad (20)$$

such that $\exp(-iH\tau)|111\rangle = \exp(i\phi_3/6)|111\rangle$. This choice of $\tau$ ensures that the fastest effective two-level system completes a detuned Rabi oscillation upon completion of each of the 6 pulses. The three parameters quantifying the phase jumps (i.e., relative phase changes) $\xi_1$, $\xi_2$, and $\xi_3$ are determined such that a system initialized in one of the three basis states returns to the same state (up to a dynamical phase) after the 6 pulses. That is, $\mathcal{U}|001\rangle = \exp(i\phi_1)|001\rangle$, $\mathcal{U}|011\rangle = \exp(i\phi_2)|011\rangle$. The other states satisfy corresponding equations by symmetry, and the state $|000\rangle$ trivially does not evolve. In addition to the above conditions, the dynamical phases acquired in these dynamics satisfy $\exp(i2\phi_1)=\exp(i\phi_2)$ and $\exp(i3\phi_1)=\exp(\phi_3+\pi)$. The four independent free parameters $\Delta/\Omega$, $\xi_1$, $\xi_2$, and $\xi_3$ are numerically determined from these 4 equations. A specific solution is given by $$\Delta/\Omega = -0.229479 \quad (21)$$

$$\xi_1 = 0.5869771 = \xi_5 \quad (22)$$

$$\xi_2 = 4.5323846 = \xi_4 \quad (23)$$

$$\xi_3 = 6.2250881 \quad (24)$$

Figure 2I:
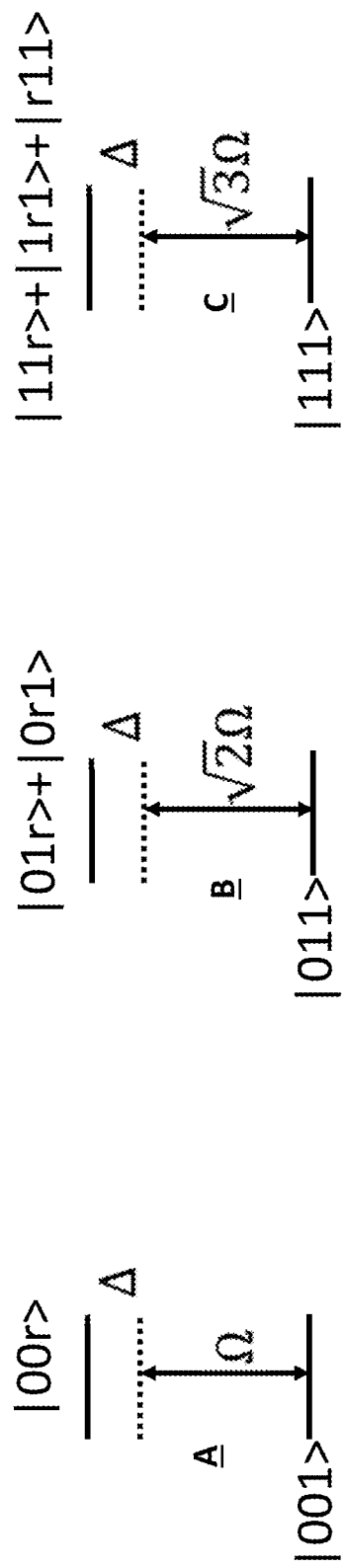
FIG. 2I contains schematic diagrams representing relevant atomic levels of a 3-qubit gate employed in example embodiments of the system described herein.
Figure 2K:
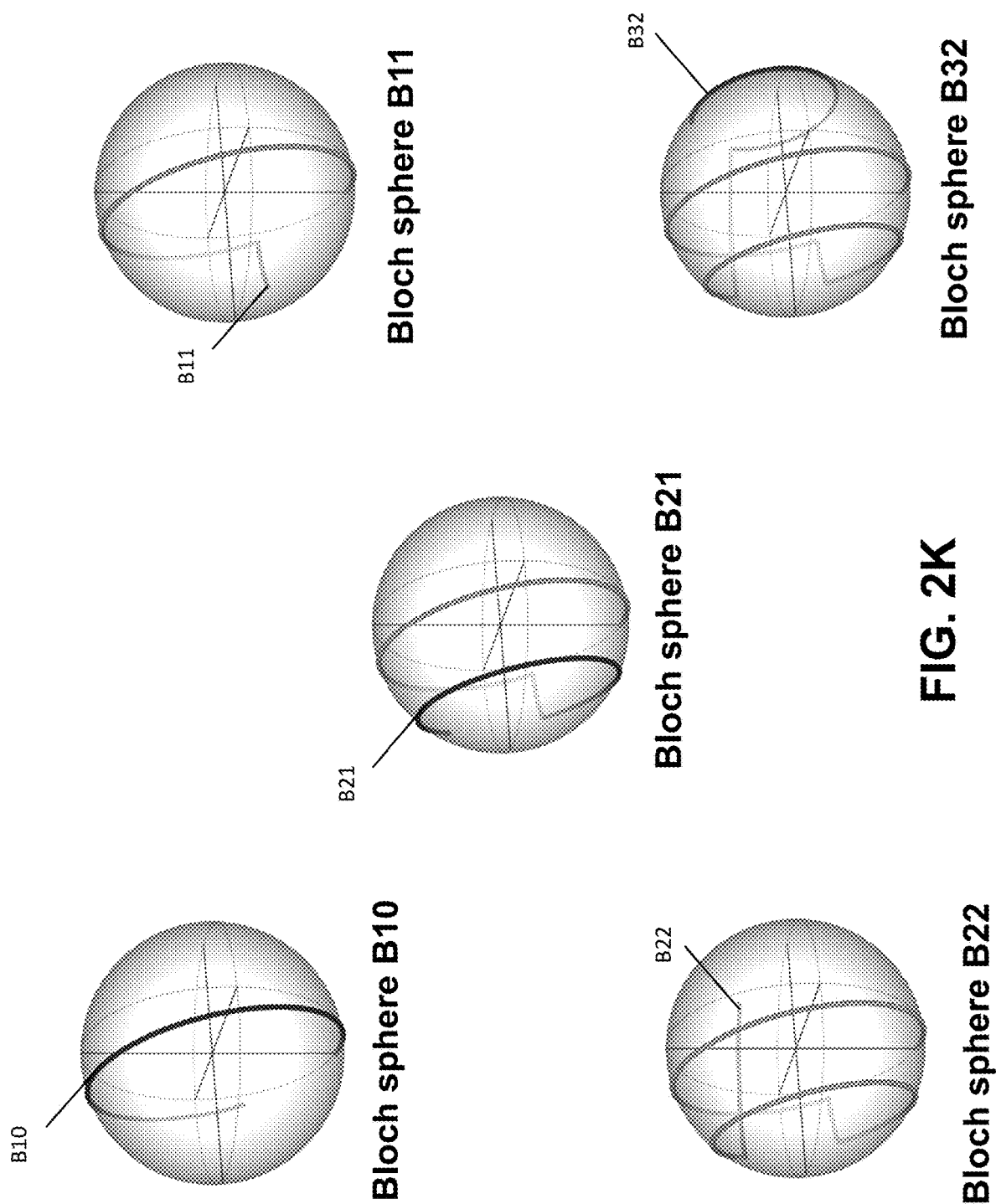
Figure 2L:
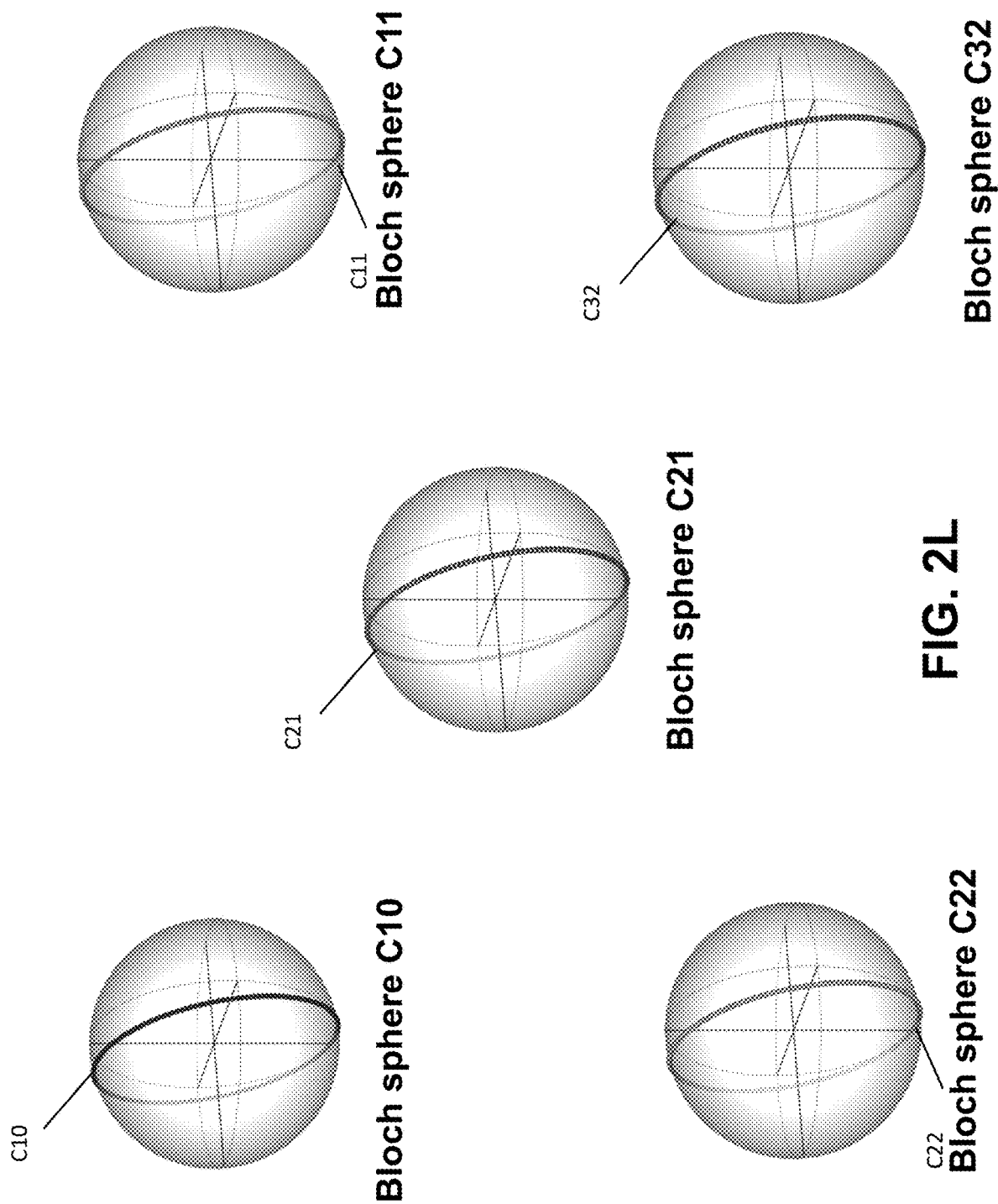
Figure 2M:
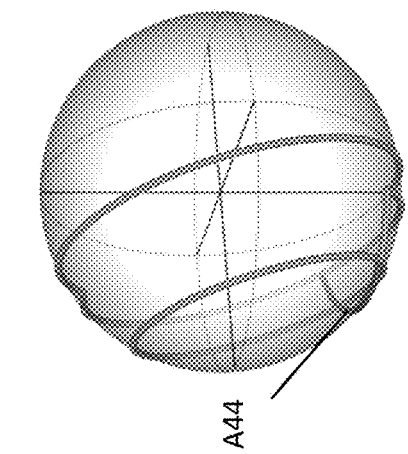
Figure 2M:
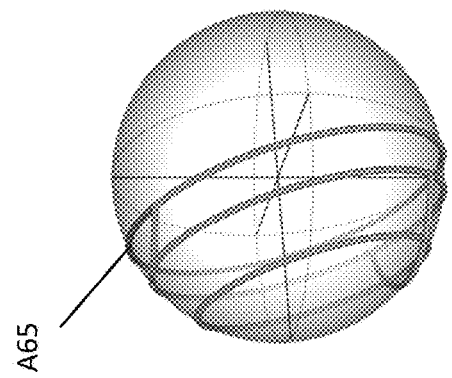
Figure 2M:
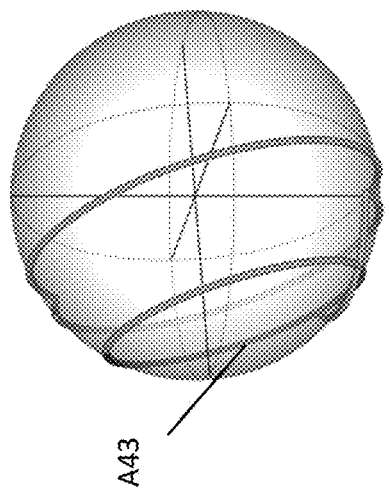
Figure 2M:
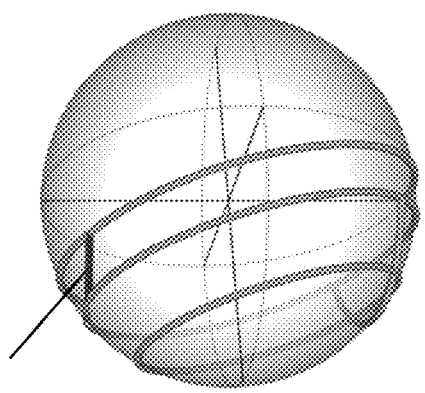
Figure 2M:
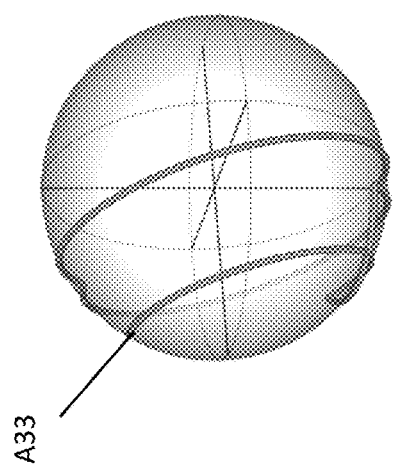
Figure 2M:
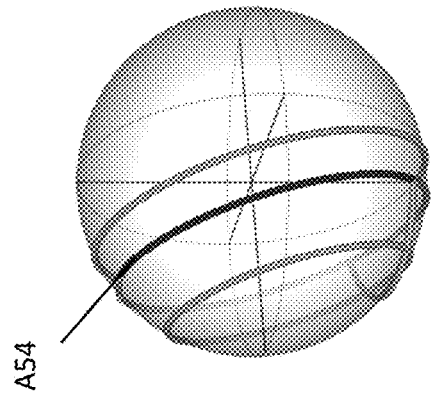
Figure 2N:
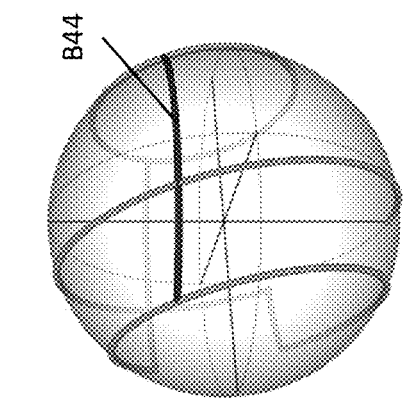
Figure 2N:
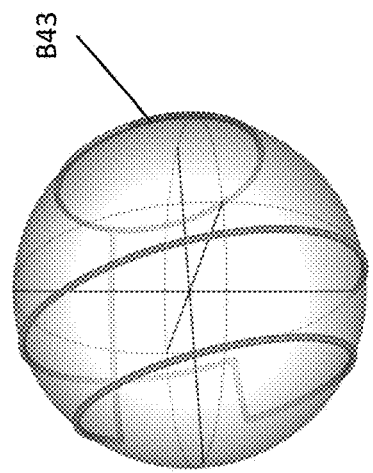
Figure 2N:
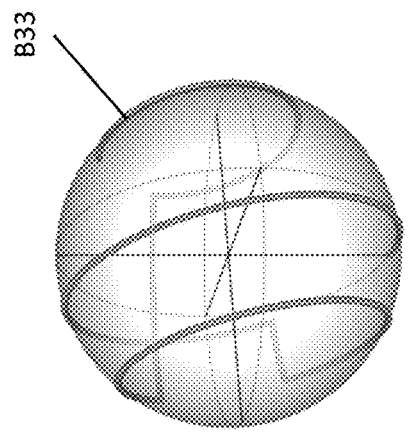
Figure 2N:
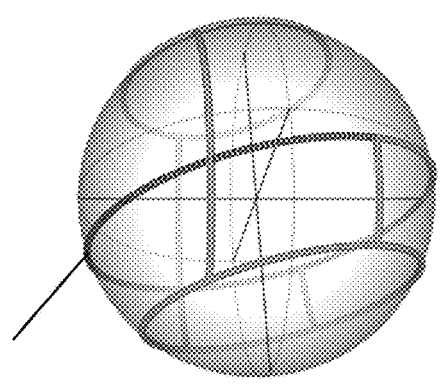
Figure 2N:
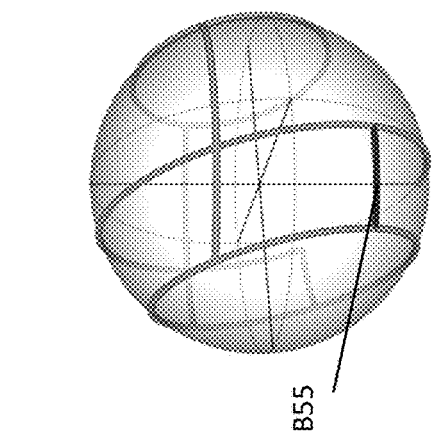
Figure 2N:
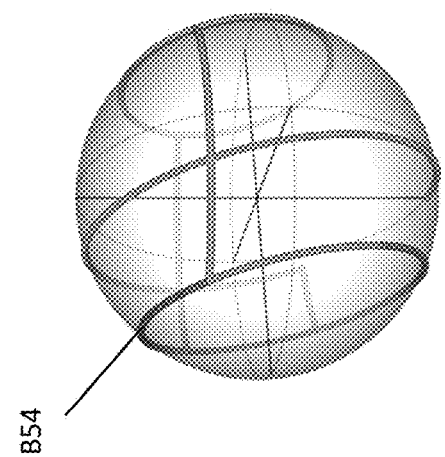
Figure 2O:
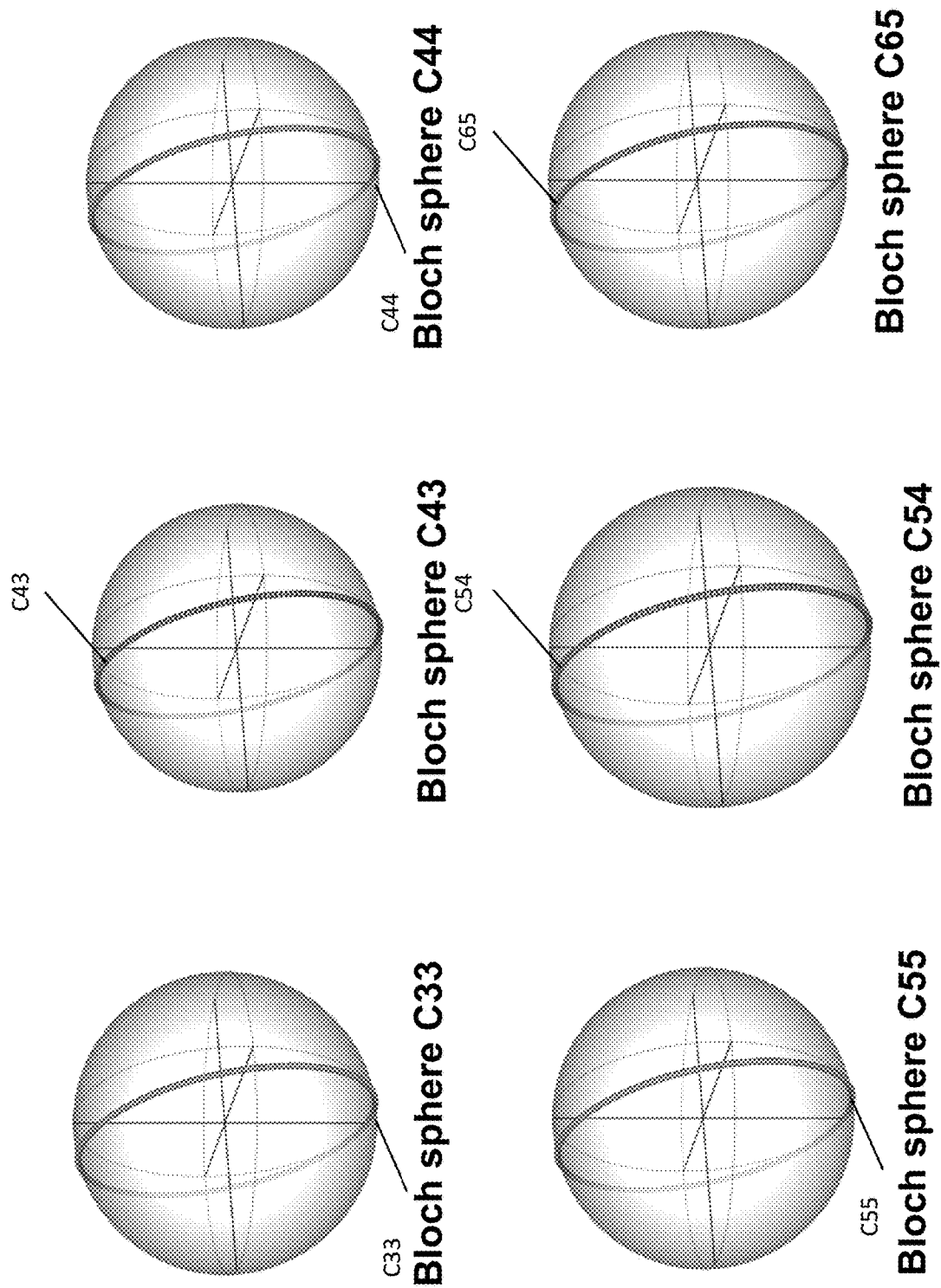

The three two-level systems, denoted A, B, and C, are shown in FIG. 2I. The first pulse is shown in FIGS. 2J-O as A10, B10, and C10. In FIGS. 2J-O, the notation X## is used—the letter indicates the two-level system A, B, or C, the first number indicates the pulse number 1-6, and the second number indicates the phase shift number 1-5. As illustrated in Bloch sphere C10, the first pulse C10 leads to a complete, detuned Rabi cycle at an enhanced Rabi frequency of $\sqrt{3}\Omega$ and detuning $\Delta$ shown in FIG. 2I, system C. As shown in Bloch spheres A10 and B10, the first pulse A10 and B10 leads to an incomplete Rabi cycle for the two-level systems A and B, with the same detuning $\Delta$, Rabi frequency $\Omega$ for the two-level system A, and enhanced Rabi frequency $\sqrt{2}\Omega$ for the two-level system B, as shown in FIG. 2I, systems A and B, respectively. The first phase shift, ($\xi_1$=0.5869771 rad≈33°) is shown as A11 and B11 in Bloch spheres A11 and B11, respectively. As shown in Bloch sphere C11, the two-level system C is in its ground state and therefore is unchanged by the phase shift, remaining at the south pole C11 of the Bloch sphere during this phase shift. The second pulse C21 again leads to a complete, detuned Rabi cycle, as shown in Bloch sphere C21, and incomplete Rabi cycles A21 and B21, as shown in Bloch spheres A21 and B21, respectively. The second phase shift, ($\xi_2$=2π−4.5323846 rad≈−100°) is shown as A22 and B22 in Bloch spheres A22, and B22, respectively. As shown in Bloch sphere C22, the two-level system C is in its ground state and therefore is again unchanged by the phase shift, remaining at the south pole C22 of the Bloch sphere during this phase shift. The third pulse C32 again leads to a complete, detuned Rabi cycle, as shown in Bloch sphere C32, and incomplete Rabi cycles A32 and B32, as shown in Bloch spheres A32 and B32, respectively. The third phase shift, ($\xi_3$=2π−6.2250881 rad≈−3.3°) is shown as A33 and B33 in Bloch spheres A33, and B33, respectively. As shown in Bloch sphere C33, the two-level system C is in its ground state and therefore is again unchanged by the phase shift, remaining at the south pole C33 of the Bloch sphere during this phase shift. The fourth pulse C43 again leads to a complete, detuned Rabi cycle, as shown in Bloch sphere C43, and incomplete Rabi cycles A43 and B43, as shown in Bloch spheres A43 and B43, respectively. The fourth phase shift, ($\xi_4=\xi_2$=2π−4.5323846 rad≈−100°) is shown as A44 and B44 in Bloch spheres A44, and B44, respectively. As shown in Bloch sphere C44, the two-level system C is in its ground state and therefore is again unchanged by the phase shift, remaining at the south pole C44 of the Bloch sphere during this phase shift. The fifth pulse C54 again leads to a complete, detuned Rabi cycle, as shown in Bloch sphere C54, and incomplete Rabi cycles A54 and B54, as shown in Bloch spheres A54 and B54, respectively. The fifth phase shift, ($\xi_5=\xi_1$=0.5869771 rad≈33°) is shown as A55 and B55 in Bloch spheres A55, and B55, respectively. As shown in Bloch sphere C55, the two-level system C is in its ground state and therefore is again unchanged by the phase shift, remaining at the south pole C55 of the Bloch sphere during this phase shift. The sixth pulse A65 and B65 returns the A and B two-level systems to their initial positions, as shown in Bloch sphere A65 and B65, respectively, and completes a final detuned Rabi cycle C65, as shown in Bloch sphere C65.

Another version of this gate can be constructed if the atoms are arranged such that $V_{1,2}$, $V_{2,3}$>>$|\Omega|$, $|\Delta|$, and $V_{1,3}$<<$|\Omega|$, $|\Delta|$. The same palindromic (e.g., symmetric) 6-pulse ansatz described by Eq. (19) is used, now with the pulse length or duration $\tau$ optionally chosen (K=2) as $$\tau = 2\pi \Big/ \sqrt{\Delta^2 + 2\Omega^2}, \quad (25)$$

and parameters $$\Delta/\Omega = 0.0422037 \quad (26)$$

$$\xi_1 = -1.20646 = \xi_5 \quad (27)$$

$$\xi_2 = 5.18936 = \xi_4 \quad (28)$$

$$\xi_3 = 5.30347 \quad (29)$$

This set of parameters gives approximately the desired 3-qubit gate, with an error in the populations that is less than $\mathcal{O}(10^{-2})$ and an error in the phase that is less than $\mathcal{O}(10^{-5})$.

As discussed above, this controlled-controlled-phase (CCZ) gate is implemented in the regime in which nearest neighbors are constrained by the Rydberg blockade, but next-nearest neighbors have only weak interactions, that is $V_{1,2}$, $V_{2,3}$>>$|\Omega|$, $|\Delta|$, and $V_{1,3}$<<$|\Omega|$, $|\Delta|$. In light of this, the CCZ gate that is to be implemented is motivated by the fact that both edge atoms can simultaneously blockade the middle (target) atom. In particular, the following scheme is considered to implement CCZ that involves local excitation to Rydberg states:

1. Apply a π pulse on both edge atoms, transferring all of their population in $|1\rangle$ to $|r\rangle$.

2. Apply a 2π pulse on the center atom, exciting from |1⟩ to |r⟩ and back to |1⟩, accumulating a π phase shift only if neither edge atom is blockading this central atom and the atom is in |1⟩.
3. Apply another π pulse on the edge atoms to return any population from |r⟩ to |1⟩.

Such a protocol realizes the following unitary:

$$CCZ = \begin{pmatrix} 1 & 0 & 0 & 0 & 0 & 0 & 0 & 0 \\ 0 & -1 & 0 & 0 & 0 & 0 & 0 & 0 \\ 0 & 0 & -1 & 0 & 0 & 0 & 0 & 0 \\ 0 & 0 & 0 & -1 & 0 & 0 & 0 & 0 \\ 0 & 0 & 0 & 0 & -1 & 0 & 0 & 0 \\ 0 & 0 & 0 & 0 & 0 & 1 & 0 & 0 \\ 0 & 0 & 0 & 0 & 0 & 0 & -1 & 0 \\ 0 & 0 & 0 & 0 & 0 & 0 & 0 & -1 \end{pmatrix} \quad (30)$$

Figure 5I:
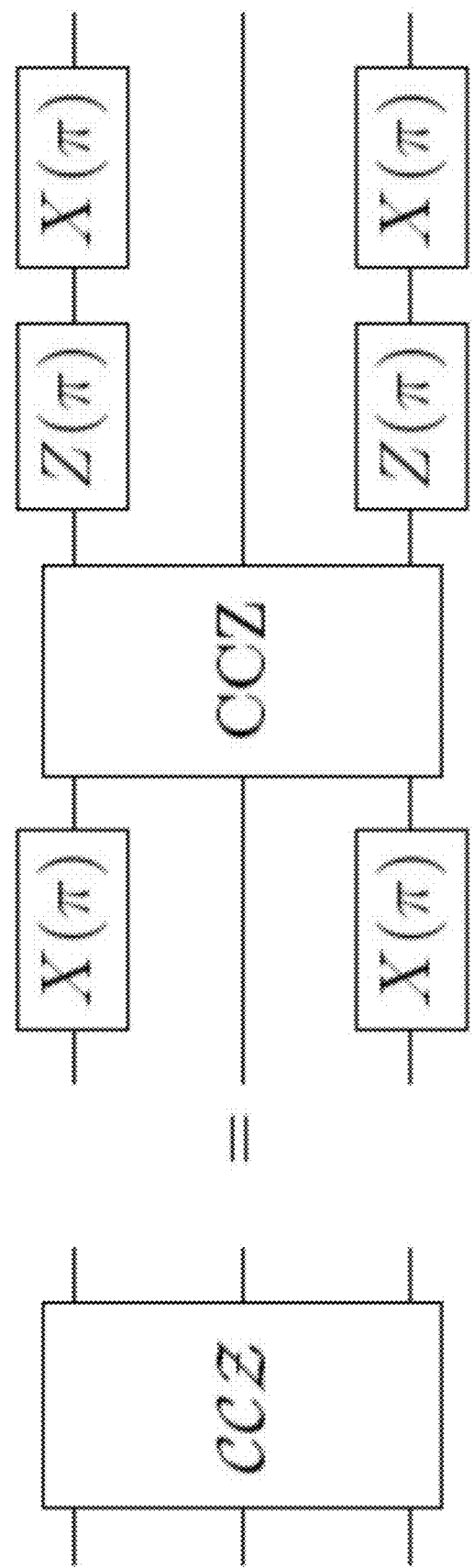

This unitary is equivalent to the canonical controlled-controlled-phase gate, denoted $ccz = 1 - 2|111⟩⟨111|$ up to local rotations, as shown in FIG. 5I.

In the absence of local excitation to Rydberg states, global Rydberg coupling can still approximately realize this unitary. Since different input configurations evolve according to dynamics of few-level systems with different coupling frequencies, it is challenging to design a single analytic global pulse to control all input configurations properly. For example, the |001⟩ state couples to |00r⟩ as a two-level system with Rabi frequency Ω. The |011⟩ state couples to $$\frac{1}{\sqrt{2}}(|r11⟩ + |0r1⟩)$$

with Rabi frequency $\sqrt{2}Ω$. The |111⟩ state couples both to |1r1⟩ with Rabi frequency Ω, and also couples to $$\frac{1}{\sqrt{2}}(|r11⟩ + |11r⟩)$$

with Rabi frequency $\sqrt{2}Ω$ (which then couples to |r1r⟩). The systems are further complicated by the finite next-nearest neighbor interaction between edge atoms.

Figure 6:
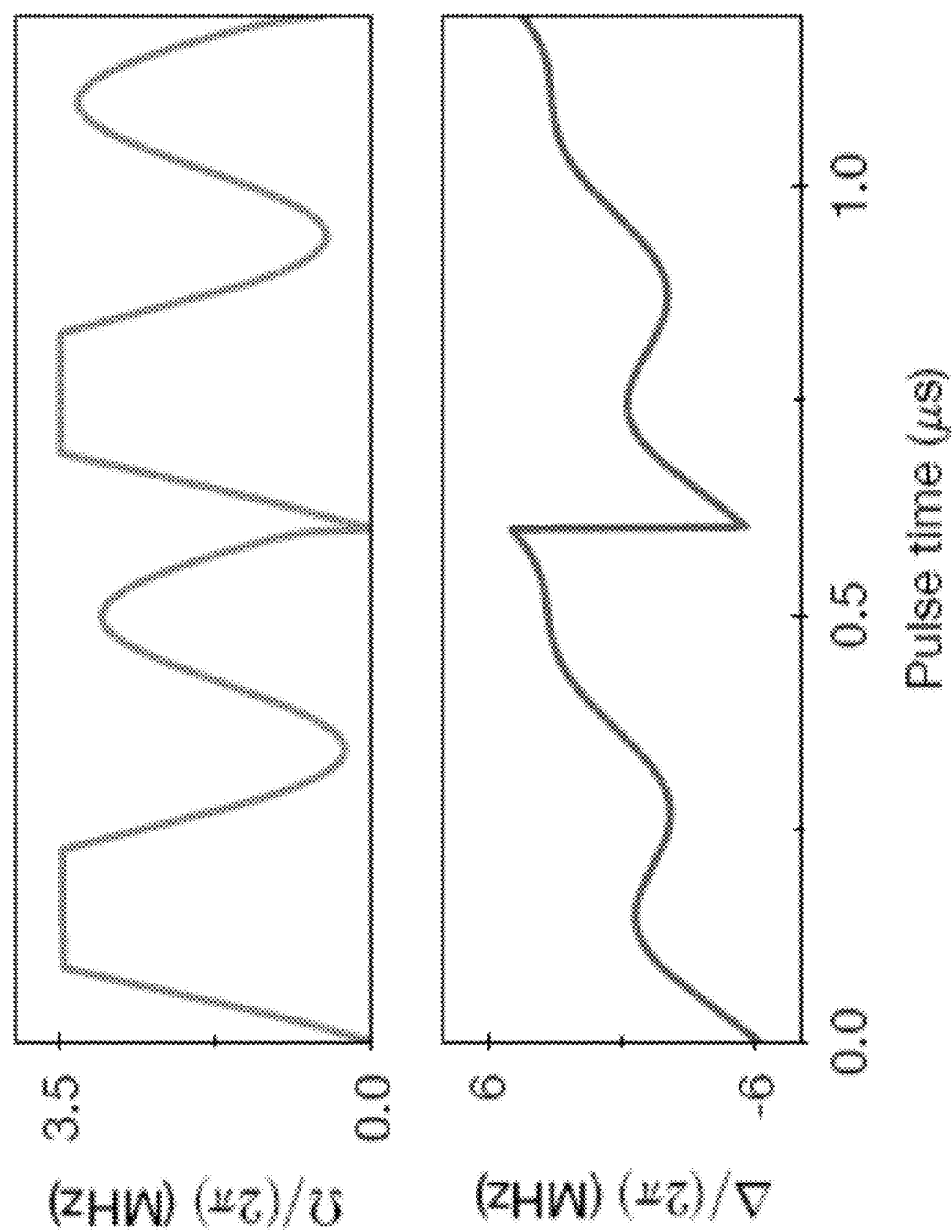
FIG. 6 is a plot of time variation of the Rydberg Rabi frequency and detuning employed in example embodiments of the system described herein.

To find a global pulse that works on all input configurations, in one embodiment, the RedCRAB optimal control algorithm was used to optimize the amplitude and frequency profile for the coupling field, and thereby selecting the laser intensity, the laser frequency, pulse duration, and laser phase. The optimized pulse, shown in FIG. 6, has a duration of 1.2 μs and achieves a desired numerically simulated gate fidelity of 97.6%.

Additional implementations with colder atoms could achieve higher gate fidelities by designing gate timings to intentionally cancel the effect of the unwanted phase accumulation between next-nearest neighbors. Alternatively, few-qubit gates could be implemented with all atoms in the fully blockaded regime by bringing atoms closer together or by exciting to higher Rydberg states.

Spin Echo Procedure for CZ and CCZ

Figure 7A:
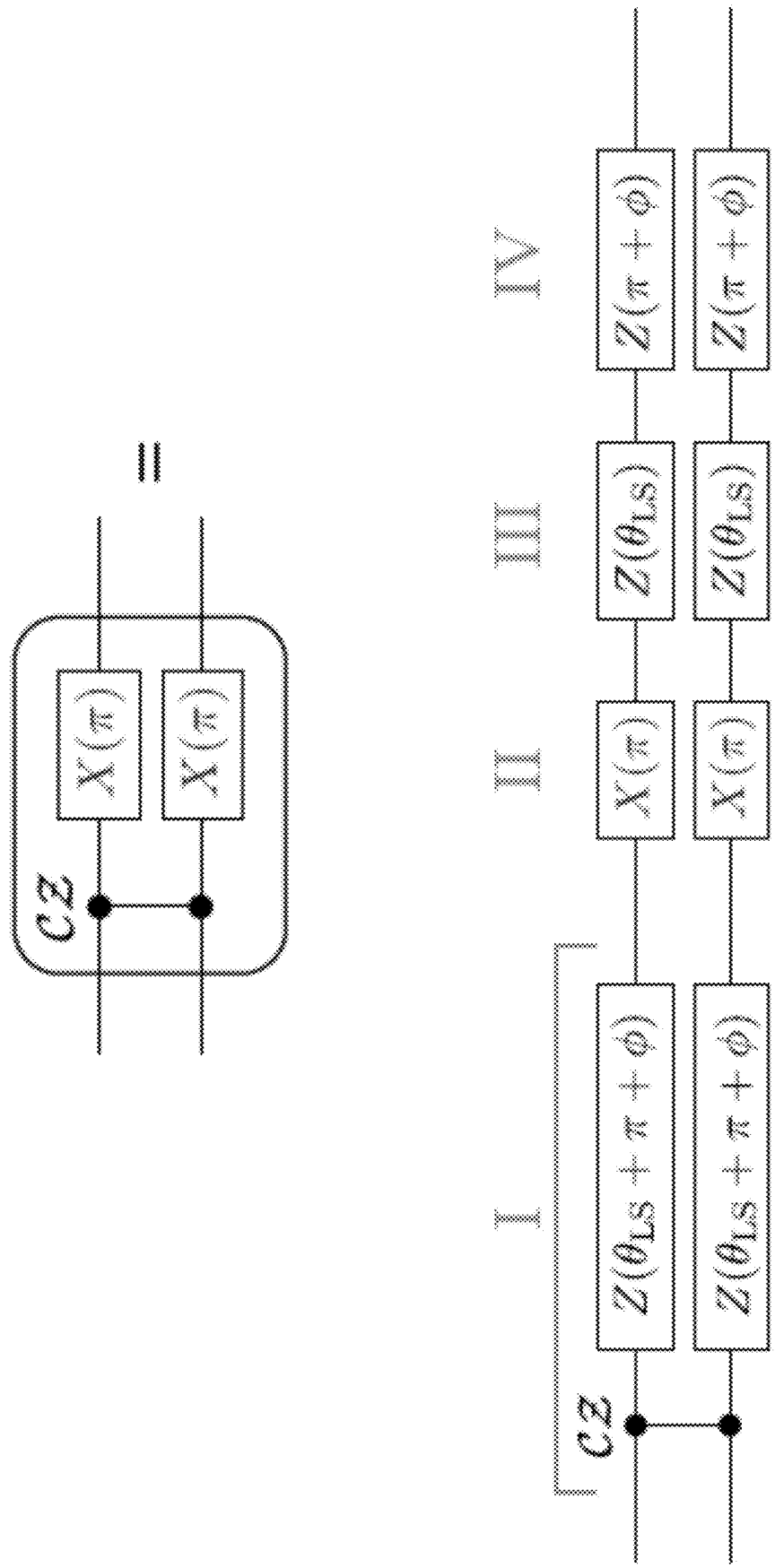
FIG. 7A is a schematic diagram representing a quantum circuit for a controlled-phase gate employed in example embodiments of the system described herein.
Figure 7B:
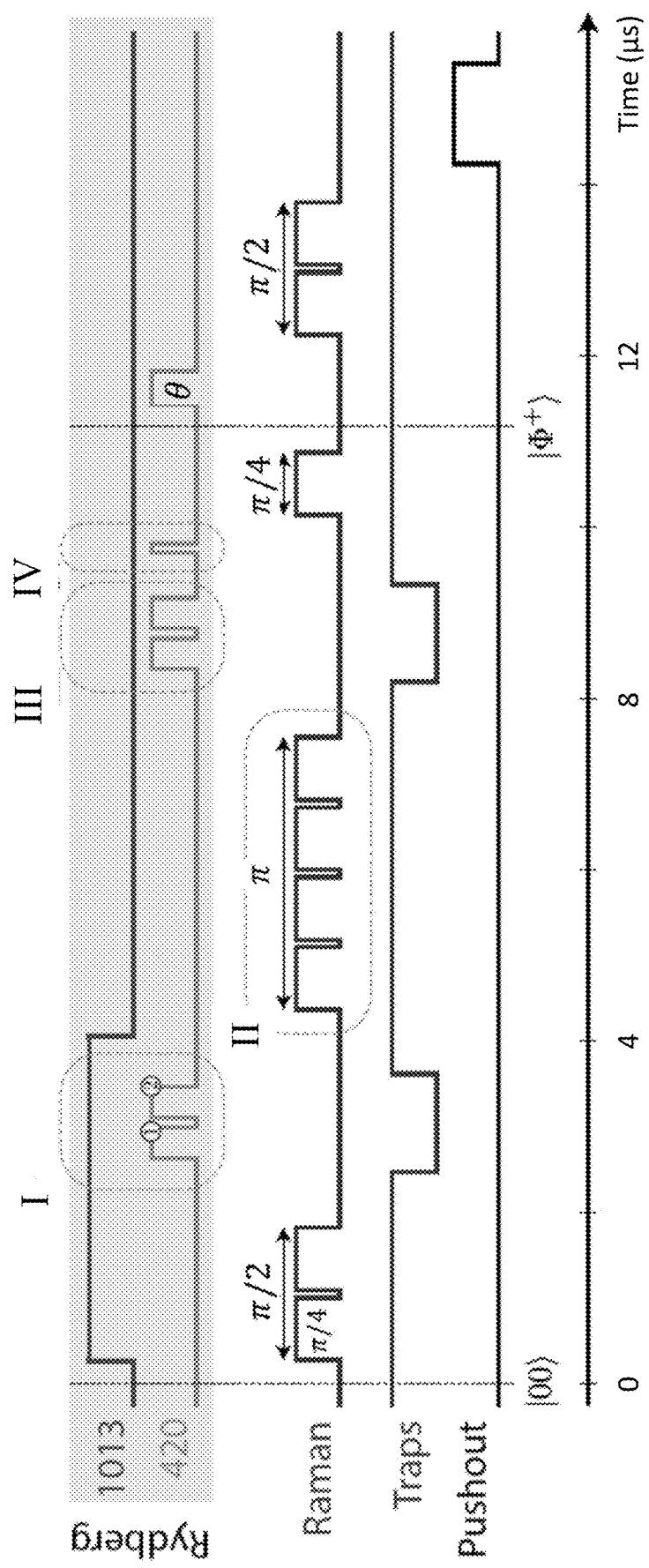
FIG. 7B is a schematic diagram representing a pulse sequence employed in example embodiments of the system described herein.

The implementation of the controlled-phase gate in the enclosed region shown in FIG. 7A is shown in more explicit detail on the right hand side of the equal sign. The direct implementation of the $cz$ gate (region I) includes an extra phase shift on both qubits. This is corrected by a hyperfine qubit X(π) echo pulse (II), followed by the appropriate phase shifts (III and IV). The Rydberg pulse that implements the CZ or the CCZ gate includes both a 1013 nm laser field and a 420 nm laser field, the latter of which adds a differential light shift to the qubit levels of ~2π×3 MHz. To correct for the phase accumulated due to this light shift, after the CZ gate, a qubit X(π) rotation is applied on all atoms, and then the same 420 nm pulse used for the CZ gate is applied, but this time in the absence of 1013 nm light. The single particle phase ϕ, shown in map (1) above, that is inherent in the design of the CZ protocol is separately corrected by an additional short pulse of the 420 nm laser. The full detailed pulse sequence is shown in FIG. 7B. The full pulse sequence for preparing Bell states begins with both atoms in |0⟩ and a global X(π/2) pulse (produced by two π/4 pulses) to put both atoms in |-⟩ y. Then, while the 1013 nm laser is on, the 420 nm laser is applied in two pulses (with a relative phase between the pulses) to enact the CZ gate, along with global phase shifts coming from the light shift of the 420 nm laser. A global X(π) pulse flips the qubit states, at which point the same 420 nm pulses are applied, but now in the absence of 1013 nm light. This negates the effect of light shifts in the first portion of the CZ gate implementation. Then, an additional short pulse of the 420 nm laser adds an additional phase correction to turn the CZ gate into the canonical $cz$ gate. A subsequent global X(π/4) pulse prepares the two atoms in the Bell state |Φ⁺⟩. A final 420 nm laser pulse can be used to add dynamical phase to this Bell state, which can be detected by a subsequent global X(π/2) for measuring parity oscillations. Finally, atoms in |1⟩ are pushed out to detect populations.

State Readout Through Atom Loss

The primary technique used herein for state readout is to apply a resonant laser pulse that heats atoms in |1⟩ (in F=2, more generally) out of the tweezers, after which a fluorescence image of remaining atoms in |0⟩ is taken. This method correctly identifies atoms in |0⟩, but can mistake atoms that were lost through background loss processes or by residual Rydberg excitation for atoms in |1⟩, leading to an overestimation of the population in |1⟩. For any measurements involving Rydberg excitation, measurement statistics were collected both with and without the pushout pulse, which provides an upper bound on how much leakage out of the qubit subspace occurred, and therefore also gives a lower bound on the true population in |1⟩.

This procedure is illustrated in the context of the two-qubit experiments, denoting the two types of measurements as A (in which the pushout of |1⟩ atoms is applied) and B (in which the pushout is disabled). For each measurement procedure, statistics were obtained by observing the four two-qubit states, consisting of 'lost' or 'present' for each qubit. The A vector associates these as |0⟩ and |1⟩, so $A_{ij}$ (for i,j ∈ {0, 1}) denotes the probability of identifying the left and right atom in 0, 1 through the simple loss/presence analysis. However, the atoms can be not only in the qubit states 0, 1, but they can also be lost from the trap or in the Rydberg state, which in both cases will be detected as 'lost'. Denoting C as the computational subspace containing |0⟩ and |1⟩, and denoting $\bar{C}$ as anything outside this subspace (including Rydberg population or loss), the B vector measures whether the atoms are in C (either |0⟩ or |1⟩), or not ($\bar{C}$), so it is denoted $B_{ij}$ where i,j ∈ {C, $\bar{C}$}.

Both $A_{ij}$ and $B_{ij}$ can be explicitly expressed in terms of the underlying atomic populations $p_{\alpha\beta}$ where $\alpha,\beta \in \{0, 1, \overline{C}\}$, as follows:

$$A_{00} = p_{00} \quad (31)$$

$$A_{01} = p_{01} + p_{0\overline{C}} \quad (32)$$

$$A_{10} = p_{10} + p_{\overline{C}0} \quad (33)$$

$$A_{11} = p_{11} + p_{1\overline{C}} + p_{\overline{C}1} + p_{\overline{C}\overline{C}} \quad (34)$$

$$B_{CC} = p_{00} + p_{01} + p_{10} + p_{11} \quad (35)$$

$$B_{C\overline{C}} = p_{0\overline{C}} + p_{1\overline{C}} \quad (36)$$

$$B_{\overline{C}C} = p_{\overline{C}0} + p_{\overline{C}1} \quad (37)$$

$$B_{\overline{C}\overline{C}} = p_{\overline{C}\overline{C}} \quad (38)$$

Measuring $A_{ij}$ and $B_{ij}$, one can now solve for the atomic populations of interest: $p_{00}$, $p_{01}$, $p_{10}$, and $p_{11}$.

$$p_{00} = A_{00} \quad (39)$$

$$p_{01} = A_{01} - B_{C\overline{C}} + p_{1\overline{C}} \quad (40)$$

$$p_{10} = A_{10} - B_{\overline{C}C} + p_{\overline{C}1} \quad (41)$$

$$p_{11} = A_{11} - B_{C\overline{C}} - B_{\overline{C}C} - B_{\overline{C}\overline{C}} + (p_{0\overline{C}} + p_{\overline{C}0}) \quad (42)$$

Since all probabilities are non-negative and $B_{C\overline{C}} + B_{\overline{C}C} + B_{\overline{C}\overline{C}} = 1 - B_{CC}$, lower bounds are obtained for the true populations:

$$p_{00} = A_{00} \quad (43)$$

$$p_{01} \geq A_{01} - B_{C\overline{C}} \quad (44)$$

$$p_{10} \geq A_{10} - B_{\overline{C}C} \quad (45)$$

$$p_{11} \geq A_{11} - (1 - B_{CC}) \quad (46)$$

Figure 8A:
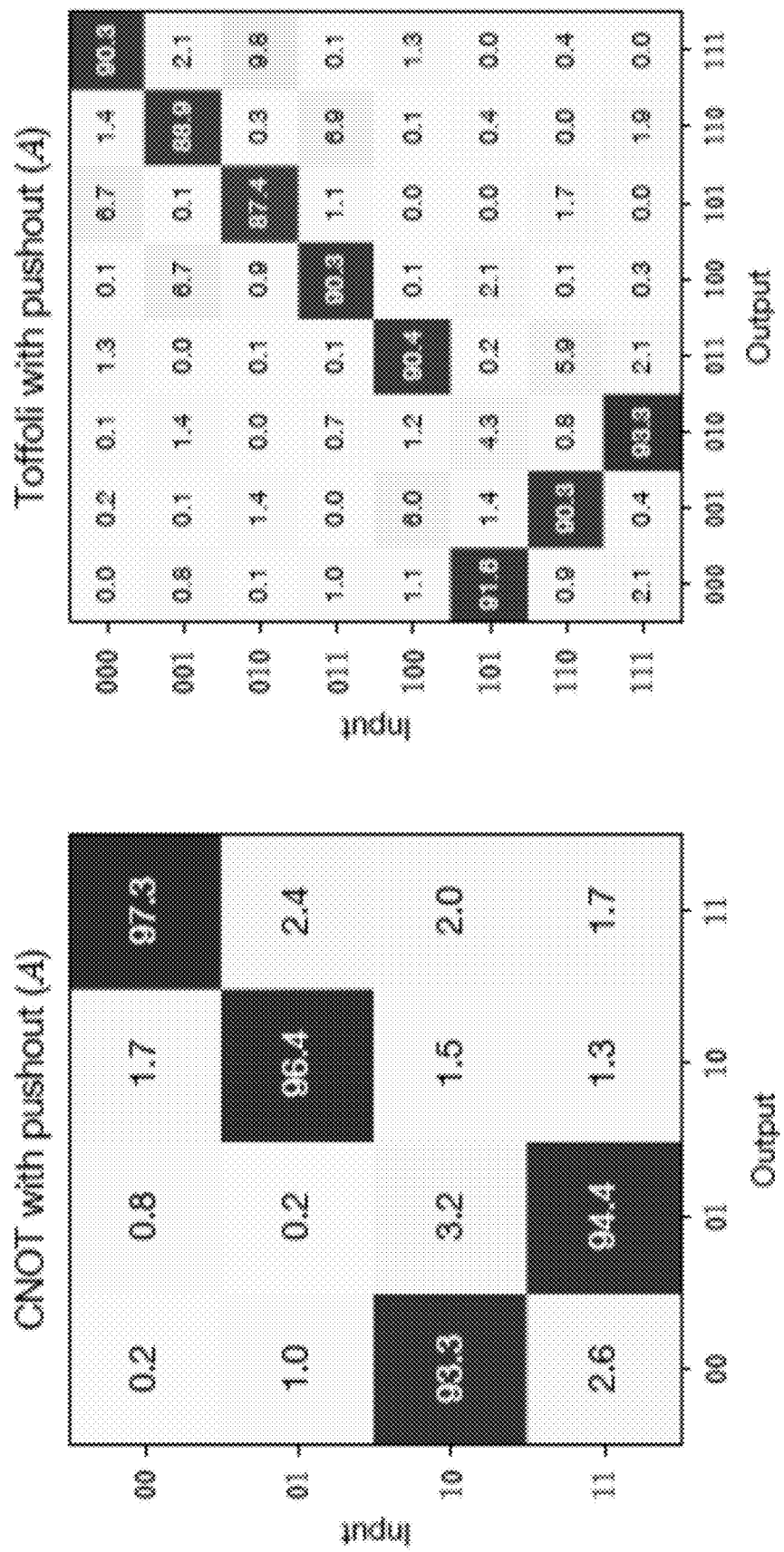
Figure 8B:
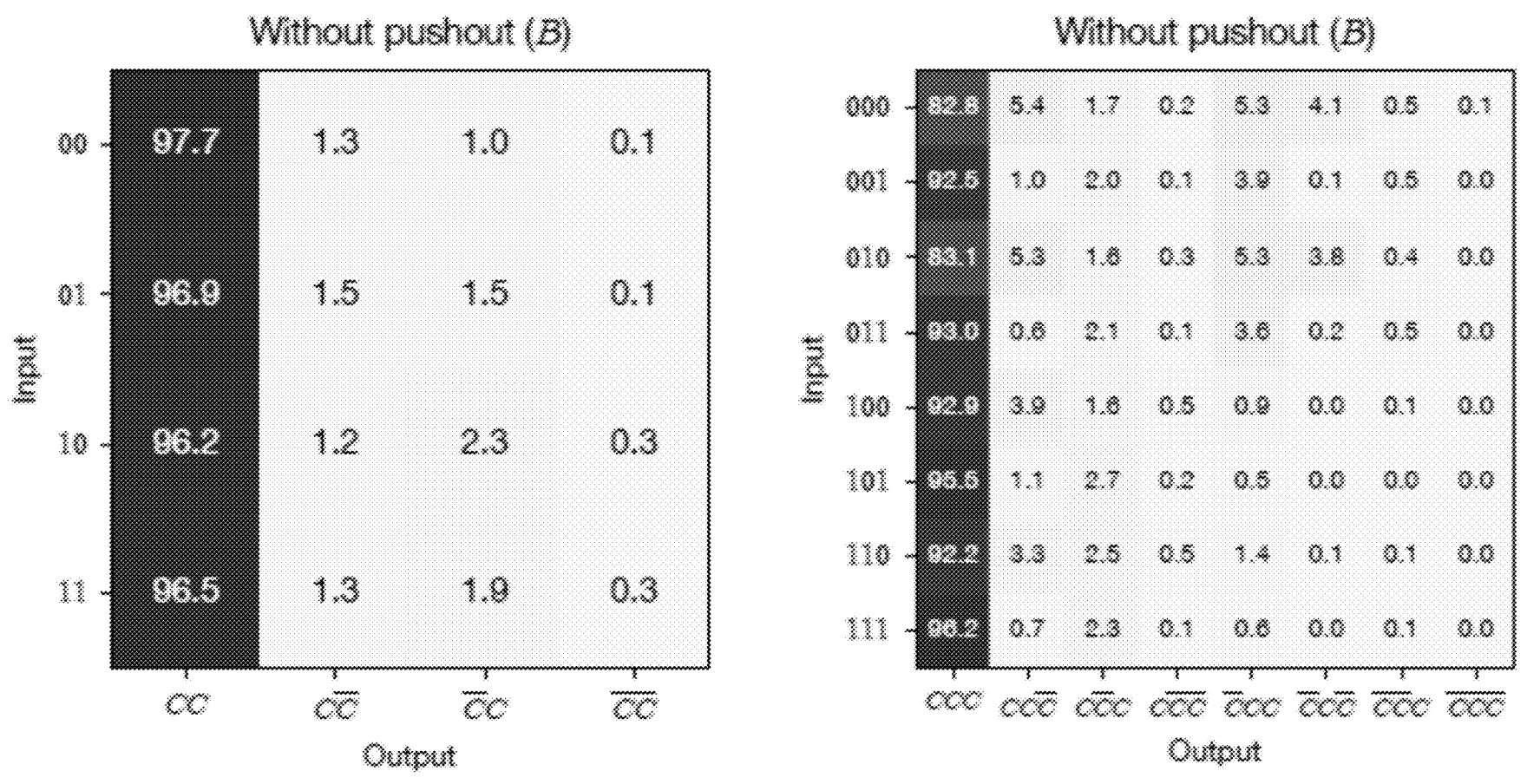

This is the analysis carried out for the Bell state populations, the CNOT truth table, and the Toffoli truth table (extended to three qubits). For the truth tables, the analysis is carried out for each measurement configuration (corresponding to a different input computational basis state) separately, shown as the rows in the matrices in FIGS. 8A-B that shows the probability distribution (shown in percentage points) of different output configurations both with and without the pushout pulse, as described above.

Correcting for State Preparation and Measurement Errors

The problem of correcting a measured fidelity for state preparation and measurement (SPAM) errors is considered below. P is denoted as the probability to correctly initialize and measure all qubits; generally, $P = (1-\epsilon)^N$ for a single-particle error rate of $\epsilon$. The measured fidelity is related to the 'corrected fidelity' according to:

$$\mathcal{F} = P \times \mathcal{F}^c + (1-P) \times \mathcal{F}^{false} \quad (47)$$

Here $\mathcal{F}^{false}$ denotes the false contribution to the measured fidelity signal in cases in which SPAM errors occur. The main subtlety in performing the correction is properly evaluating the potential false contribution $\mathcal{F}^{false}$.

Experimentally, the SPAM error is $\epsilon = 1.2(1)\%$ per qubit, consisting of two effects: first, the optical pumping into $|0\rangle$ has an error probability of 0.7(1)% constituting a state preparation error. Second, there is a small chance that an atom can be lost due to a background collision either before or after the Bell state circuit is performed. Loss before the circuit contributes as a state preparation error: loss after the circuit but prior to the readout fluorescence image contributes as a measurement error. The total background loss contribution is 0.5(1)% error per atom.

Bell State Fidelity

The total probability that no errors occur on either of two qubits is $P = 97.6(2)\%$. Equation (47) holds for both the population measurement and the parity oscillation measurement separately. The population measurement explicitly only counts lower bounds on the population of atoms within the qubit subspace (see Section: "State Readout Through Atom Loss" above). Therefore, in cases where an atom is lost, there is no false contribution to the measured fidelity. However, the measured fidelity does not distinguish between atoms pumped into magnetic sublevels outside of the qubit subspace. It is estimated that in cases where one of the two atoms is prepared in an incorrect magnetic sublevel (1.4(2)% probability), there can be a false contribution $$\mathcal{F}^{false} = 1 - \cos^2\left(\frac{7\pi}{8}\right) \approx 15\%$$

(calculated by evaluating the quantum circuit shown in FIG. 3A with one atom not participating). The lower bound on the measured probabilities $p_{00} + p_{11} \geq 95.8(3)\%$ therefore sets a lower bound on the corrected populations: $p_{00}^c + p_{11}^c \geq 97.9(4)\%$.

On the other hand, the parity oscillation amplitude receives no false contribution from cases where an atom is prepared in the wrong sublevel or is lost, because this error is independent of the accumulated phase and therefore does not oscillate as a function of the phase accumulation time. The false contribution is therefore $\mathcal{F}^{false} = 0$. In this case, the coherence C (given by the amplitude of the parity oscillations) is related to the corrected coherence by $C = P \times C^c$. Since $C = 94.2(4)\%$, a corrected coherence of $C^c = 96.5(4)\%$ is obtained. The total SPAM-corrected Bell state fidelity, then, is $$\mathcal{F}^c = \frac{1}{2}(p_{00}^c + p_{11}^c + C) \geq 97.2(3)\%.$$

CNOT Truth Table

The truth table is measured by performing the CNOT gate on each computational basis state. The basis states are prepared with finite fidelity, as measured and shown in FIG. 3E. For each basis state, one wishes to assess how the finite output fidelity in the target state compares to the finite initialization fidelity to determine how well the gate performs on this input state. A probability $P_{ij}$ of no SPAM error occurring for each measurement setting is established (where ij denotes the setting in which the computational basis state |ij⟩ is initialized). Additionally, a lower bound is measured on the output probability in the target state, $\mathcal{F}_{ij}$.

False contributions to the measured fidelity are now considered. When an error involving atom loss occurs, there is no false contribution to fidelity, since fidelity only measures atom population within the qubit subspace. Alternatively, in cases where the wrong computational basis state is prepared, then $\mathcal{F}^{false}$ is bounded above by the largest unwanted element of the truth table, or <4%. The total false contribution, therefore, is $(1-P) \times \mathcal{F}^{false} < (3\%) \times (4\%) \leq 0.1\%$. This contribution is below the measurement resolution and is not accounted for. The corrected fidelity is therefore given by $$\mathcal{F}^c_{ij} = \frac{\mathcal{F}^{meas}_{ij}}{P_{ij}}.$$

The average corrected truth table fidelity, given by the average of $\mathcal{F}_{ij}^c$, is therefore $\mathcal{F}_{CNOT}^c \geq 96.5\%$, as shown in Table 2 below.

Toffoli Truth Table

The same analysis is performed to evaluate the corrected Toffoli truth table fidelity as for the CNOT truth table. The average corrected truth table fidelity is $\mathcal{F}_{Toff}^c \geq 87.0\%$, as shown in Table 2 below.

TABLE 2

|  | Raw Outcomes | Lower bound | Corrected |
|---|---|---|---|
| Bell state populations | 97.6% | 95.8% | 97.9% |
| Bell state coherences | 94.2% | 94.2% | 96.5% |
| Bell state fidelity | 95.9% | 95.0% | 97.2% |
| CNOT: Input 00 | 97.3% | 95.0% | 96.5% |
| 01 | 96.4% | 94.9% | 97.9% |
| 10 | 93.3% | 93.3% | 96.3% |
| 11 | 94.4% | 93.1% | 95.4% |
| CNOT Truth table | 95.5% | 94.1% | 96.5% |
| Toffoli: Input 000 | 90.3% | 73.1% | 75.1% |
| 001 | 88.9% | 82.6% | 86.2% |
| 010 | 87.4% | 73.0% | 76.0% |
| 011 | 90.3% | 86.7% | 90.0% |
| 100 | 90.4% | 84.3% | 87.4% |
| 101 | 91.6% | 91.6% | 95.7% |
| 110 | 90.3% | 87.0% | 90.5% |
| 111 | 93.3% | 91.0% | 95.0% |
| Toffoli Truth table | 90.3% | 83.7% | 87.0% |

Limited Tomography of Toffoli Gate

Figure 9:
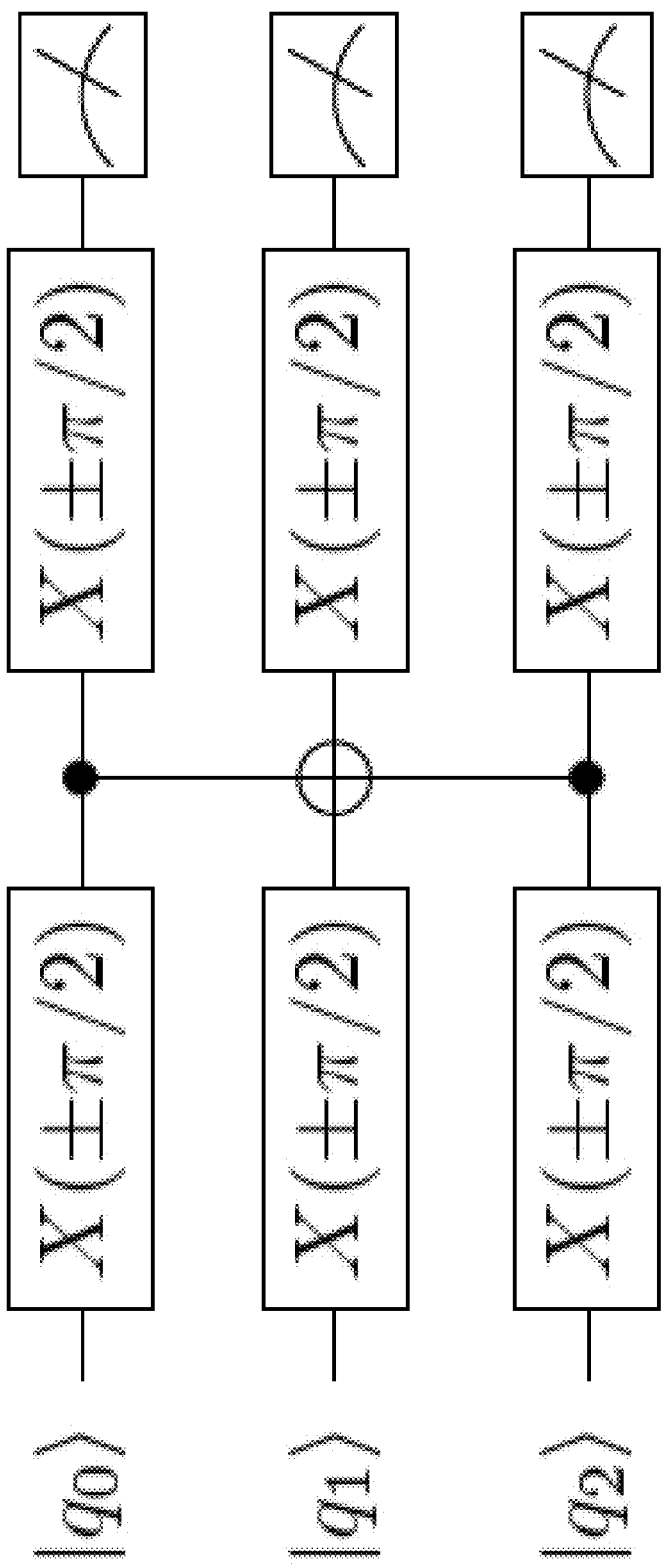
FIG. 9 is a schematic diagram representing a quantum circuit for a Toffoli gate employed in example embodiments of the system described herein.

The truth table of the Toffoli gate provides a representation of the magnitude of the matrix elements of the gate expressed in the logical basis. However, the measured populations carry no information about the relative phases between the different entries. Performing a similar procedure as the truth table, but rotating the Toffoli gate to act on the X-basis instead of the Z-basis makes it possible to recover some information about these phases. A restricted version of such a procedure has been used before as a way to characterize the fidelity of the Toffoli gate, and has been dubbed "Limited Tomography". The procedure consists of initializing all the computational basis states in the Z-basis, and then applying an X(±π/2) rotation to all qubits before and after a Toffoli gate, in the quantum circuit shown in FIG. 9. The sign is chosen to be X(±π/2) when the target qubit is initialized in |0⟩ and X(−π/2) when the target qubit is initialized in |1⟩. Conditioning the sign of the rotation on the state of the target qubit enforces that the target qubit is always in the same state |+⟩_y prior to the action of the Toffoli gate itself.

The Toffoli gate implemented herein, which includes a spin echo pulse that acts as a global X(π) gate (shown in FIG. 4B) is described ideally by the unitary matrix:

$$T_{Ideal} = \begin{pmatrix} 0 & 0 & 0 & 0 & 0 & i & 0 & 0 \\ 0 & 0 & 0 & 0 & 0 & 0 & 1 & 0 \\ 0 & 0 & 0 & 0 & 0 & 0 & 0 & -i \\ 0 & 0 & 0 & 0 & 1 & 0 & 0 & 0 \\ 0 & 0 & 0 & 1 & 0 & 0 & 0 & 0 \\ 0 & 0 & -1 & 0 & 0 & 0 & 0 & 0 \\ 0 & 1 & 0 & 0 & 0 & 0 & 0 & 0 \\ -1 & 0 & 0 & 0 & 0 & 0 & 0 & 0 \end{pmatrix} \quad (48)$$

Performing the limited tomography procedure on this unitary should result in the following output truth table:

$$\text{Lim}[T_{Ideal}] = \begin{bmatrix} 0 & 0 & 1 & 0 & 0 & 0 & 0 & 0 \\ 0 & 0 & 0 & 1 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 1 & 0 & 0 & 0 \\ 0 & 0 & 0 & 0 & 0 & 1 & 0 & 0 \end{bmatrix} \quad (49)$$

where each row shows the target output probabilities for a given input state. However, if the Toffoli gate is allowed to deviate from the ideal unitary by arbitrary phases $\phi_j$ according to $$T_\phi = \begin{pmatrix} 0 & 0 & 0 & 0 & 0 & ie^{i\phi_1} & 0 & 0 \\ 0 & 0 & 0 & 0 & 0 & 0 & ie^{i\phi_2} & 0 \\ 0 & 0 & 0 & 0 & 0 & 0 & 0 & -ie^{i\phi_3} \\ 0 & 0 & 0 & 0 & e^{i\phi_4} & 0 & 0 & 0 \\ 0 & 0 & 0 & ie^{i\phi_5} & 0 & 0 & 0 & 0 \\ 0 & 0 & -e^{i\phi_6} & 0 & 0 & 0 & 0 & 0 \\ 0 & e^{i\phi_7} & 0 & 0 & 0 & 0 & 0 & 0 \\ -e^{i\phi_8} & 0 & 0 & 0 & 0 & 0 & 0 & 0 \end{pmatrix} \quad (50)$$

then the limited tomography truth table reflects this phase deviation In particular, each truth table matrix element in which the limited tomography should produce unity will instead result in a peak probability of $$\left| \frac{1}{8} \sum_j e^{i\phi_j} \right|^2.$$

Figure 10:
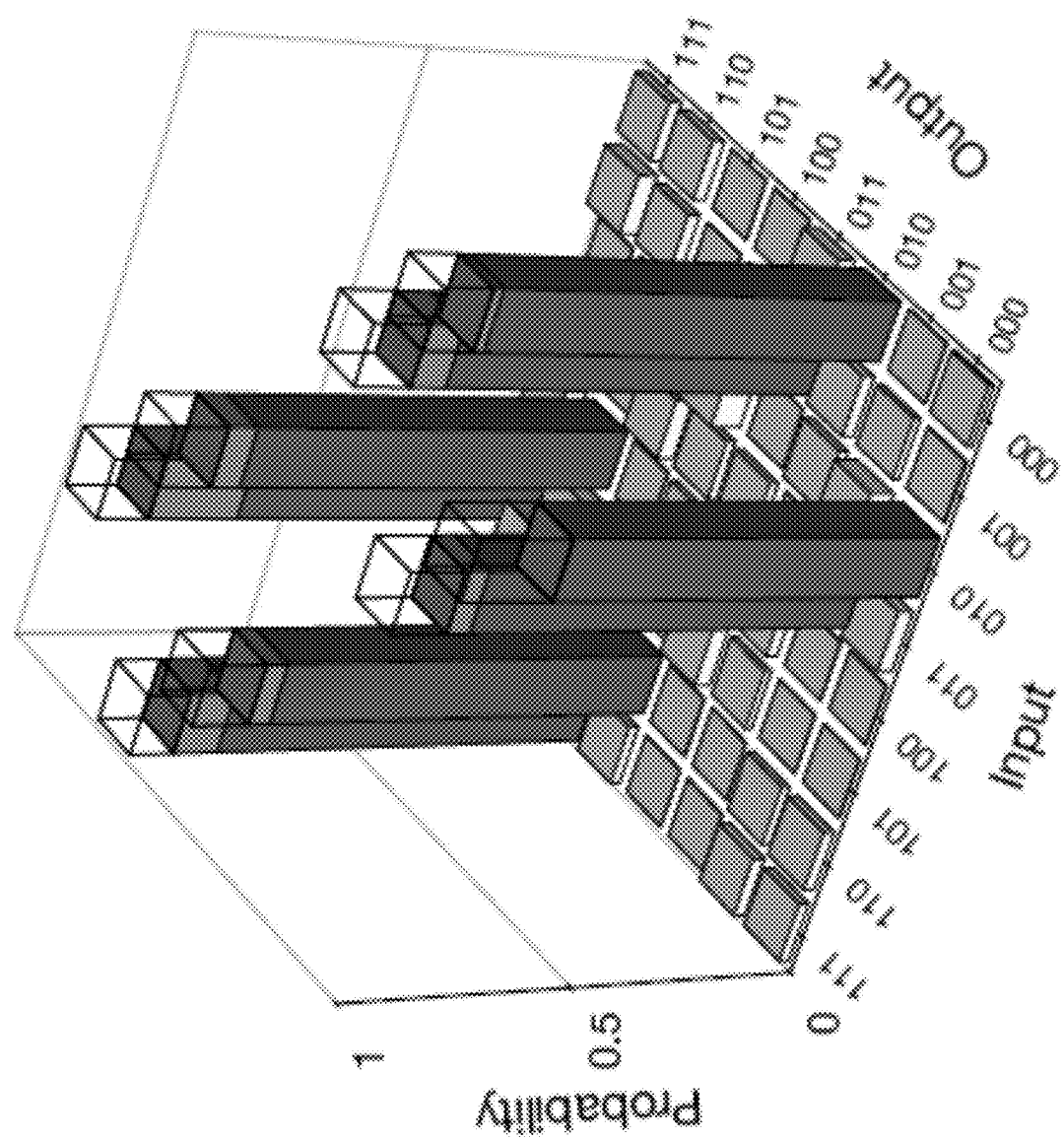
FIG. 10 is a plot of target probabilities for a Toffoli gate employed in example embodiments of the system described herein.

The average fidelity of the limited tomography truth table therefore reflects how close the phases on the Toffoli unitary are to their ideal values, and can only reach unity if each phase is correct. The measured limited tomography truth table is shown in FIG. 10, where the raw target probabilities average to 88.0(3)%. Since four of the measurement configurations are precisely global X(π) gates applied to the other four input states, these output distributions can be compared to properly account for leftover Rydberg populations, similar to the procedure discussed above in the section "State Readout Through Atom Loss." The limited tomography fidelity is therefore established to be $\mathcal{F} \geq 81.5(5)\%$. Corrected for SPAM errors, the fidelity is $\geq 86.2(6)\%$.

It is worth noting that the limited tomography protocol only makes use of four of the eight X-basis input states, as seen from the fact that the target qubit is always initialized in $|+\rangle$. This makes four out of the eight measurements equivalent to the other four up to a global $X(\pi)$ rotation at the end. Comparing these two sets of measurements gives a constraint on the probability of leakage out of the qubit subspace, similarly to the approach described above in the section "State Readout Through Atom Loss."

Parallel Gate Implementation in a Contiguous Array

Figure 11A:
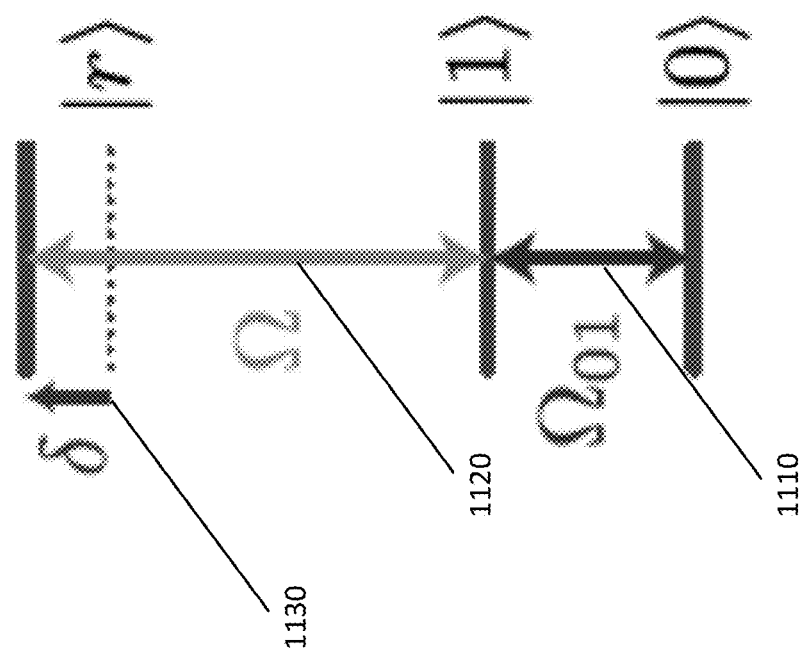
FIG. 11A is a schematic diagram representing another set of relevant atomic levels employed in example embodiments of a system described herein.
Figure 11B:
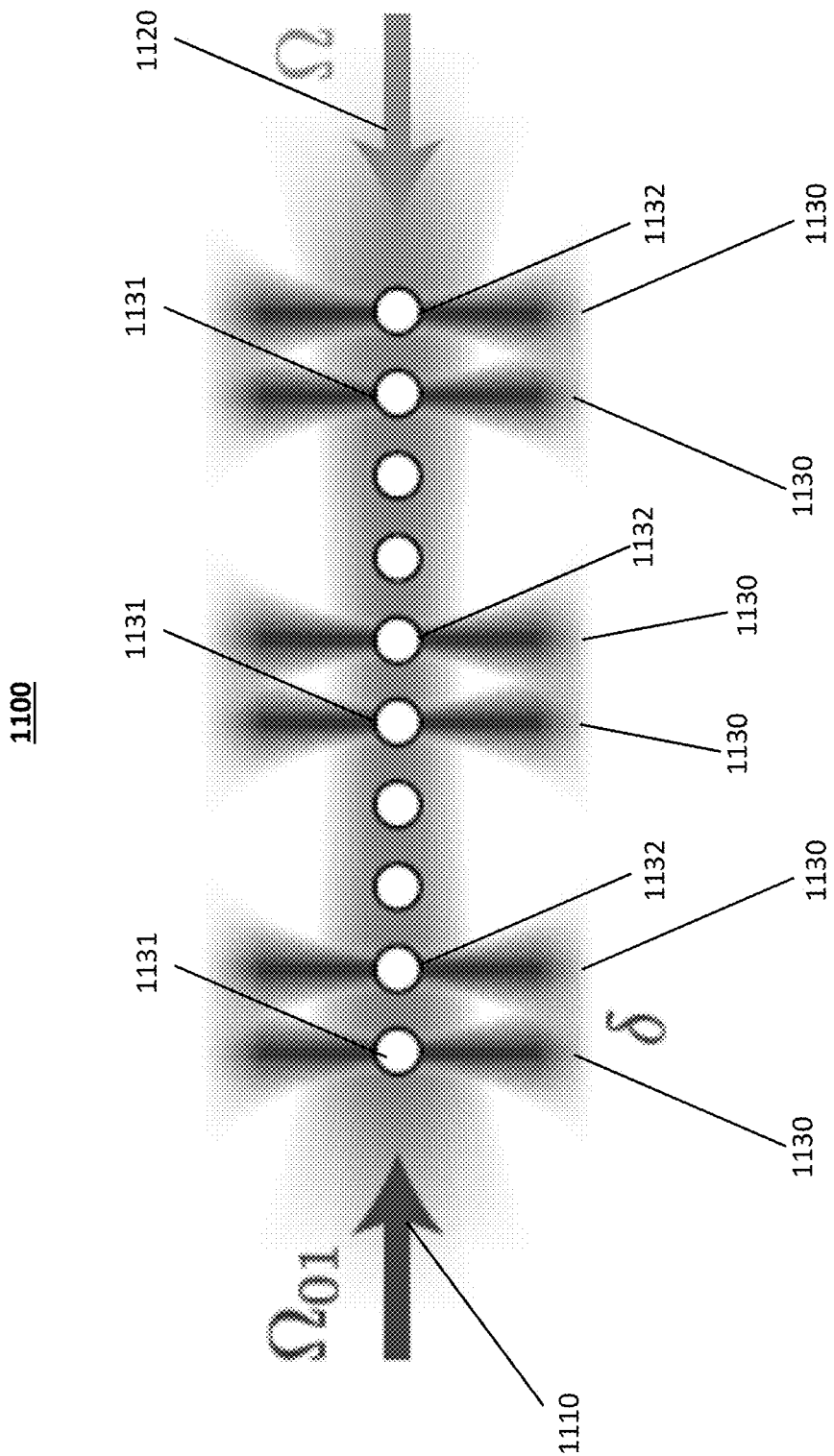
FIG. 11B is a schematic diagram representing atoms arranged in pairs in a contiguous chain of atoms employed in example embodiments of the system described herein.

Embodiments described above involve parallel multi-qubit gate implementation on separated pairs of atoms, where the inter-pair interaction is negligible. However, one can extend this protocol to parallel gate implementation in a contiguous chain of atoms 1100, as illustrated in FIGS. 11A and 11B. Consider an additional local addressing laser system 1130 that can address an arbitrary subset of atoms, using, for example, an acousto-optic deflector. Specifically, one can select a wavelength for this laser such that the imparted light shift affects the $|0\rangle$ and $|1\rangle$ states equally, but differently from the Rydberg state $|r\rangle$. In such a case, the light shift from this additional local addressing laser 1130 does not apply any qubit manipulations, but instead simply shifts the effective Rydberg resonance by $\delta$, as shown in FIG. 11A. Near-infrared wavelengths tuned far from any ground state optical transition ($\lambda \geq 820$ nm) are suitable for Rubidium. As shown in FIG. 11B, the local addressing lasers are focused onto a subset of qubits on which one aims to perform parallel multi-qubit gates. The global Rydberg coupling laser 1120 is tuned to the light-shifted resonance, so that only the locally addressed atoms are coupled to the Rydberg state for gate implementation 1110.

With such a system, one could illuminate all pairs of adjacent atoms 1131 and 1132 on which one intends to perform two-qubit gates, and then, by tuning the Rydberg laser to the light-shifted resonance, one would perform the multi-qubit gate on all pairs in parallel. The only constraint is that there must be sufficient space between addressed pairs 1131 and 1132, such that the interaction (cross-talk) between them is negligible in a particular layer of gate implementation.

Multi-qubit Gates on Fully-Blockaded Ensembles of N Qubits

Consider an ensemble or grouping of N fully-blockaded qubits (N=K), where at most one qubit can be excited into the Rydberg state $|r\rangle$ at a time. The atomic qubits have two non-interacting qubit states $|0\rangle$ and $|1\rangle$, in addition to the interacting Rydberg state $|r\rangle$. Under the action of a laser drive which couples the state $|1\rangle$ to the state $|r\rangle$ with Rabi frequency $\Omega$ and detuning $\Delta$, the atomic ensemble evolves as an effective two level system with an 'enhanced' Rabi frequency that depends on how many of the atoms begin in the qubit state $|1\rangle$ (rather than $|0\rangle$). There are N+1 such possible configurations, with the number of atoms beginning in $|1\rangle$ (denoted by M) ranging from 0 to N. Each such system evolves according to an enhanced Rabi frequency $\sqrt{M}\Omega$.

The most general N-qubit gate that can be implemented by the global laser pulse protocol described herein involves each of these N+1 configurations (labeled $|M\rangle$, for M from 0 to N) returning to their initial state, with a phase accumulation of $\phi_M$. More concretely, if U is a unitary which describes the action of the gate, then each initial configuration $|M\rangle$ evolves according to $U|M\rangle = e^{i\phi_M}|M\rangle$. Two aspects of this expression are emphasized: $|\langle M|U|M\rangle|^2=1$ denotes the fact that the state $|M\rangle$ returns to its initial state (up to a phase factor) by the end of the gate operation. The second aspect is $\text{Arg}[\langle M|U|M\rangle]=\phi_M$, which characterizes this phase factor. The gate can therefore be characterized by the phases $\{\phi_0, \phi_1, \ldots, \phi_N\}$. Two additional notes: firstly, since $|M=0\rangle$ contains no qubits in $|1\rangle$, this state is uncoupled by the laser field, and therefore evolves trivially: $U|M=0\rangle=|M=0\rangle$. Therefore, $\phi_0=0$. Secondly, two different gates are considered to be 'equivalent' if they are related only by the action of single-qubit gates. The particular single-qubit gate considered herein is $Z(\theta)$, which was defined above as the single qubit phase gate applied to all qubits. This gate adds a phase $\theta$ for each qubit in state $|1\rangle$. That is, the state $|M\rangle$ evolves as $Z(\theta)|M\rangle = e^{iM\theta}|M\rangle$. If a gate U is characterized by phases $\{\phi_0, \phi_1, \ldots, \phi_N\}$, then this gate is considered to be equivalent to the gate characterized by $\{\phi_0, \phi_1+\theta, \ldots, \phi_N+N\theta\}$. Since $\phi_0=0$ always, and one can choose $\theta=-\phi_1$, this gate U is equivalent to a gate V with phases $\{0, 0, \phi_2-2\theta, \ldots, \phi_N-N\theta\}$. Thus, any gate is equivalent to another gate in which $\phi_0=\phi_1=0$.

When designing a gate, the specified phases are: $\phi_2, \phi_3, \ldots, \phi_N$. There are N-1 such phases to choose. All configurations are additionally specified to return to their initial state, which imposes N additional constraints. There are, therefore, a total of 2N-1 constraints on the desired gate implementation.

A laser pulse sequence ansatz is defined to implement any target gate which is specified by 2N-1 constraints. The sequence will consist of 4N-6 laser pulses, each at detuning $\Delta$ and of duration $\tau$, with laser phase shifts in between each pulse specified by relative phase shifts $\xi_1, \xi_2, \ldots, \xi_{4N-7}$. Symmetry is imposed on the palindromic phase shifts, such that $\xi_i=\xi_{(4N-6-i)}$, resulting in just 2N-3 independent phase shifts to choose. There are a total 2N-1 degrees of freedom to choose, including all phase shifts, $\Delta$, and $\tau$. Note that this number of degrees of freedom matches the number of constraints to satisfy in the target gate operation.

Optionally, the pulse duration $\tau$ is chosen such that one of the configurations $|M\rangle$ returns back to its initial state after each laser pulse. This is accomplished by setting $T=2\pi/\sqrt{\Delta^2+M\Omega^2}$. In practice, t is chosen such that M=N because it results in the fastest gate operation. This choice reduces one degree of freedom in the laser pulse sequence, but it ensures that configuration $|M\rangle$ returns to its initial state by the end of the pulse sequence, and therefore satisfies one constraint in the target gate. There are now 2N-2 additional degrees of freedom and 2N-2 additional constraints to satisfy. One can numerically solve for the set of laser pulse parameters using numerical constraint solvers such as Mathematica, and thereby select the laser frequency, pulse duration, and phase shifts based on the conditional-phase angle $\theta$ of the controlled phase gate. Solutions have been found for all target gates tested up through N=5.

The gate phases $\phi_1, \phi_2, \ldots, \phi_N$ define the effect of the gate on the qubit system. Some such choices are well known as $C^{N-1}Z(\phi)$, or a multiqubit controlled phase gate. In particular, this corresponds to $\phi_1=\phi_2=\ldots=\phi_{N-1}=0$, and $\phi_N=\phi$. For N=2, this corresponds to a maximally entangling two-qubit gate called the controlled-phase gate (which is equivalent to any other maximally entangling two-qubit gate such as controlled-NOT, or CNOT). This gate is frequently utilized in quantum algorithms. For N≥3, this gate is equivalent to a N-qubit Toffoli gate and is also often used in quantum algorithms. These gates can be decomposed into a large number of individual two-qubit gates, but it may be advantageous to implement the N-qubit gate directly if that can be done natively on the quantum hardware, rather than to decompose it and implement a large number of individual gates separately. For example, 5 two-qubit gates are required to implement one three-qubit controlled-controlled-phase (CCZ) gate. Example solutions for multiqubit controlled phase gates $C^{N-1}Z(\pi)$ are provided below, with all phase shift values $\xi_i$ given in units of radians. Note that all phase shifts $\xi_i+2\pi$ are equivalent to $\xi_i$.

For N=2, as discussed above, $\Delta/\Omega=0.377371$, $\xi_1=3.90242$. For N=3, multiple solutions are found, with 4 sample solutions presented in Table 3. Note that Solution 3 is the same solution discussed above, with $\epsilon_2+2\pi$ and $\epsilon_3+2\pi$.

TABLE 3

| Parameter | Solution 1 | Solution 2 | Solution 3 | Solution 4 |
|---|---|---|---|---|
| $\Delta/\Omega$ | −0.0570895 | −0.267234 | −0.229481 | −0.776102 |
| $\xi_1$ | 0.150574 | −1.5427 | 0.586978 | −1.4483 |
| $\xi_2$ | −0.530291 | 1.37871 | −1.7508 | 0.688775 |
| $\xi_3$ | 2.0049 | 0.989935 | −0.0580888 | 1.45666 |

For N=4, multiple solutions are found, with 4 sample solutions presented in Table 4.

TABLE 4

| Parameter | Solution 1 | Solution 2 | Solution 3 | Solution 4 |
|---|---|---|---|---|
| $\Delta/\Omega$ | 0.133612 | 0.424491 | 0.404323 | 1.07756 |
| $\xi_1$ | −0.550646 | 0.726549 | −0.642575 | 0.0251141 |
| $\xi_2$ | 0.989158 | 1.26989 | −0.725974 | 2.07618 |
| $\xi_3$ | 1.05129 | −0.584564 | −0.966666 | −0.337474 |
| $\xi_4$ | −0.832328 | −0.82851 | −0.291719 | −1.08468 |
| $\xi_5$ | −0.206509 | −1.1908 | 0.893183 | −0.800534 |

For N=5, multiple solutions are found, with 2 sample solutions presented in Table 5.

TABLE 5

| Parameter | Solution 1 | Solution 2 |
|---|---|---|
| $\Delta/\Omega$ | 0.388209 | −0.23195 |
| $\xi_1$ | −0.206364 | −1.0802 |
| $\xi_2$ | −0.893626 | −0.22098 |
| $\xi_3$ | −0.342458 | 0.028781 |
| $\xi_4$ | −0.664964 | 0.358192 |
| $\xi_5$ | −1.32371 | −0.527308 |
| $\xi_6$ | 1.18947 | 1.70135 |
| $\xi_7$ | −0.58071 | 0.986371 |

While gates of the form $C^{N-1}Z(T)$ (characterized by $\phi_1=\phi_2=\ldots=\phi_{N-1}=0$, and $\phi_N=1$) are often of interest in implementing quantum algorithms, another interesting option is considered herein that is enabled by the flexible choice of target phases described above. In particular, consider the implementation of a pairwise $CZ(\pi)$ gate on each pair of atoms in the system. This algorithm produces a special fully entangled state called a fully connected cluster state, which is equivalent (up to local qubit operations) to a Greenberger-Horne-Zeilinger (GHZ) state, a type of highly entangled state that has known uses in quantum error correction and quantum metrology. The GHZ state has the form $$\frac{1}{\sqrt{2}}(|00\ldots0\rangle+|11\ldots1\rangle).$$

Since the CZ(It) gate on a single pair can be understood as adding a $\pi$ phase shift on basis states in which both qubits in the pair begin in $|1\rangle$, the action of $CZ(\pi)$ on all pairs in the system can be understood as adding a $\pi$ phase shift for all pairings of qubits in the basis state which are in $|1\rangle$. For the basis state $|M\rangle$, which is the superposition of all combinations of M qubits beginning in $|1\rangle$, there are exactly $$\binom{M}{2}=\frac{M(M-1)}{2}$$

pairings of qubits which incur a $\pi$ phase shift. Therefore, the total phase shift for the state $|M\rangle$ is exactly $$\pi\times\frac{M(M-1)}{2}(\text{modulo } 2\pi).$$

For N=3, this corresponds to $\phi_1=0$, $\phi_2=1$, $\phi_3=T$. A set of parameters suitable to implement this fully connected cluster state preparation for N=3 is listed in Table 6.

TABLE 6

| Parameter | Solution |
|---|---|
| $\Delta/\Omega$ | 0.462332 |
| $\xi_1$ | 0.0119499 |
| $\xi_2$ | 1.39725 |
| $\xi_3$ | 0.495255 |

Global Pulses with Time-Dependent Intensity and Detuning Profiles

The most general pulse that could be described would be a laser pulse with total duration T, and with a time-dependent intensity profile I(t) and a time-dependent detuning profile $\Delta(t)$, each defined for $0\leq t\leq T$, optionally such that the time-dependent values of the laser intensity, the laser frequency, laser phase, and pulse duration are selected based on the conditional-phase angle $\theta$. These profiles in principle can be any function of time, but practical experimental limitations set upper and lower bounds on the values of the functions. For example, there is a practical limit on the maximum value of I(t) (how much laser power is available), and there is a practical limit on the range of $\Delta(t)$ (how far the laser can be smoothly detuned). Experimental limitations also set bounds on the continuity and smoothness of these functions or equivalently the frequency spectrum of these profiles. High frequency components above some limit (dependent on implementation choice) are not possible to realize experimentally.

Within this restricted (but still expansive) space of possible intensity and detuning profiles, how is one found that implements the target gate? One approach is to numerically simulate the behavior of the atomic system according to a given laser pulse (characterized by I(t) and $\Delta(t)$), and then optimize the laser pulse profile according to the simulated response of the system, and thereby selecting the time-dependent values of the laser intensity, the laser frequency, pulse duration, and laser phase to achieve a desired fidelity of the quantum gate. In particular, starting from a fixed initial state for the atomic system $|\psi_0\rangle$, one can identify what the ideal output state would be for the target gate. For example, the target gate can be represented as a unitary operator $U_{gate}$, in which case the target output state is $|\psi_{target}\rangle = U_{gate}|\psi_0\rangle$. The actual gate implemented by a laser pulse with I(t) and $\Delta(t)$ would result in a numerically simulated output state $|\psi_{sim}\rangle$. A figure of merit can be defined that characterizes how close the simulated output state is to the target output state: the fidelity $\mathcal{F} = |\langle\psi_{target}|\psi_{sim}\rangle|^2$. The fidelity is bounded by $\mathcal{F} \leq 1$, with $\mathcal{F} = 1$ for an ideal gate. The functions I(t) and $\Delta(t)$ can be modified to maximize the simulated fidelity.

Accordingly, in a first example embodiment, the present invention is a method of operating a quantum gate on a grouping of qubits. In the $1^{st}$ aspect of the first example embodiment, the method comprises selecting values for a set of parameters of at least a first and a second laser pulse, the parameters selected from a relative phase shift, a laser frequency, a laser intensity, and a pulse duration; and applying the at least first and second laser pulses to all qubits within a grouping of N qubits, where N is equal to two or more, thereby coupling a non-interacting quantum state $|1\rangle$ to an interacting excited state $|r\rangle$, such that each qubit that begins in quantum state $|1\rangle$ returns to the state $|1\rangle$ upon completion of the at least first and second laser pulses, and such that qubits in the grouping are mutually blockaded, for example dipole blockaded or Rydberg blockaded.

In a $2^{nd}$ aspect of the first example embodiment, each qubit can be an atomic qubit, an ionic qubit, or a molecular qubit.

In a $3^{rd}$ aspect of the first example embodiment, all qubits in the grouping are mutually blockaded. Other features and example features of the method are as described above with respect to the $1^{st}$ through the $2^{nd}$ aspects of the first example embodiment.

In a $4^{th}$ aspect of the first example embodiment, the durations of the at least the first and the second pulses is selected so that if all qubits in the grouping begin in the quantum state $|1\rangle$, then all qubits in the grouping return to the quantum state $|1\rangle$ upon completion of each of the at least the first and the second laser pulses. For example, the laser frequency of each pulse is detuned from the resonance transition between $|1\rangle$ to $|r\rangle$ by a detuning $\Delta$ and the pulse duration $\tau$ is equal to $t = 2\pi/\sqrt{\Delta^2 + N\Omega^2}$, where $\Omega$ is the Rabi frequency of the laser pulses. Other features and example features of the method are as described above with respect to the $1^{st}$ through the $3^{rd}$ aspects of the first example embodiment.

In a $5^{th}$ aspect of the first example embodiment, one or more of the laser intensity, laser frequency, pulse duration, and laser phase is selected to achieve a desired fidelity of the quantum gate. Other features and example features of the method are as described above with respect to the $1^{st}$ through the $4^{th}$ aspects of the first example embodiment.

In a $6^{th}$ aspect of the first example embodiment, at least the first and the second pulses form a palindromic sequence of pulses. Other features and example features of the method are as described above with respect to the $1^{st}$ through the $5^{th}$ aspects of the first example embodiment.

In a $7^{th}$ aspect of the first example embodiment, the gate is a controlled-phase gate $C^{N-1}Z(\theta)$, wherein $\theta$ is a conditional-phase angle. For example, N is 2. In another example, the quantum gate is a controlled phase (CZ) gate, and N=2. In yet other examples, the laser frequency, the pulse duration, and the phase shift are selected based on the conditional-phase angle $\theta$ of the controlled phase gate. In yet further examples, the laser frequency is detuned from the resonance transition between $|1\rangle$ to $|r\rangle$ by a detuning $\Delta$ and the laser intensity is selected such that the Rabi frequency of the laser pulses is $\Omega$. For example, the laser frequency, the laser intensity, the pulse duration, and the phase shift are selected such that the conditional-phase angle $\theta = \pi$. Other features and example features of the method are as described above with respect to the $1^{st}$ through the $6^{th}$ aspects of the first example embodiment.

In an $8^{th}$ aspect of the first example embodiment, N is 3. In the $8^{th}$ aspect, the quantum gate can be a controlled-controlled phase $(C^2Z(\theta))$ gate having a conditional-phase angle $\theta$. For example, the laser frequency, pulse duration, and phase shifts of each of the at least the first and second laser pulses are selected based on the conditional-phase angle $\theta$. Other features and example features of the method are as described above with respect to the $1^{st}$ through the $7^{th}$ aspects of the first example embodiment.

In a $9^{th}$ aspect of the first example embodiment, N is 3, and the method comprises applying a sequence of six pulses. The sequence of six pulses can be palindromic. Other features and example features of the method are as described above with respect to the $1^{st}$ through the $8^{th}$ aspects of the first example embodiment.

In a $10^{th}$ aspect of the first example embodiment, the method comprises applying a sequence of 4N–6 pulses. The sequence of pulses can be, for example, palindromic. Other features and example features of the method are as described above with respect to the $1^{st}$ through the $9^{th}$ aspects of the first example embodiment.

In a second example embodiment, the present invention is a method of operating a quantum gate on a grouping of qubits. In a $1^{st}$ aspect of the second example embodiment, the method comprises: selecting time-dependent values for a set of parameters of a laser pulse, the parameters selected from a laser phase, a laser frequency, a laser intensity, and a pulse duration; and applying the laser pulse to all qubits within a grouping of N qubits, where N is equal to three or more, thereby coupling a non-interacting quantum state $|1\rangle$ to an interacting excited state $|r\rangle$, such that each qubit that begins in quantum state $|1\rangle$ returns to the state $|1\rangle$ upon completion of the laser pulse, and such that qubits in the grouping are mutually blockaded, for example, dipole blockaded or Rydberg blockaded.

In a $2^{nd}$ aspect of the second example embodiment, each qubit can be an atomic qubit, an ionic qubit, or a molecular qubit.

In a $3^{rd}$ aspect of the second example embodiment, all qubits in the grouping are mutually blockaded. Other features and example features of the method are as described above with respect to the $1^{st}$ through the $2^{nd}$ aspects of the second example embodiment.

In a $4^{th}$ aspect of the second example embodiment, the time-dependent values of the laser intensity, laser frequency, pulse duration, and laser phase are selected to achieve a desired fidelity of the quantum gate. Other features and example features of the method are as described above with respect to the 1$^{st}$ through the 3$^{rd}$ aspects of the second example embodiment.

In a 5$^{th}$ aspect of the second example embodiment, the gate is a controlled-phase gate $C^{N-1}Z(\theta)$, wherein $\theta$ is a conditional-phase angle. Other features and example features of the method are as described above with respect to the 1$^{st}$ through the 4$^{th}$ aspects of the second example embodiment.

In a 6$^{th}$ aspect of the second example embodiment, N is 3. Other features and example features of the method are as described above with respect to the 1$^{st}$ through the 5$^{th}$ aspects of the second example embodiment.

In a 7$^{th}$ aspect of the second example embodiment, N is 3 and the quantum gate is a controlled-controlled phase ($C^2Z$($\theta$)) gate having a conditional-phase angle $\theta$. For example, the time-dependent values of the laser intensity, the laser frequency, laser phase, and pulse duration are selected based on the conditional-phase angle $\theta$. In another example, the conditional-phase angle $\theta=\pi$. Other features and example features of the method are as described above with respect to the 1$^{st}$ through the 6$^{th}$ aspects of the second example embodiment.

In a third example embodiment, the present invention is a device. In one aspect of the third example embodiment, the device comprises: a grouping of N qubits, where N is equal to two or more; and a coherent light source configured to, given selected values for a set of parameters of at least a first and a second laser pulse, the parameters selected from a relative phase shift, a laser frequency, a laser intensity, and a pulse duration: apply at least the first and second laser pulses to all qubits within the grouping of N qubits, thereby coupling a non-interacting quantum state $|1\rangle$ to an interacting excited state $|r\rangle$, such that each qubit that begins in quantum state $|1\rangle$ returns to the state $|1\rangle$ upon completion of the at least first and second laser pulses, and such that qubits in the grouping are mutually blockaded.

Other features and example features of the third example embodiment are described above with respect to various aspects of the first example embodiment.

In a fourth example embodiment, the present invention is a device. In one aspect of the fourth example embodiment, the device comprises: a grouping of N qubits, where N is equal to three or more; and a coherent light source configured to, given selected time-dependent values for a set of parameters of a laser pulse, the parameters selected from a laser phase, a laser frequency, a laser intensity, and a pulse duration: apply the laser pulse to all qubits within a grouping of N qubits, thereby coupling a non-interacting quantum state $|1\rangle$ to an interacting excited state $|r\rangle$, such that each qubit that begins in quantum state $|1\rangle$ returns to the state $|1\rangle$ upon completion of the laser pulse, and such that qubits in the grouping are mutually blockaded.

Other features and example features of the fourth example embodiment are described above with respect to various aspects of the second example embodiment.

Having thus described several illustrative embodiments, it is to be appreciated that various alterations, modifications, and improvements will readily occur to those skilled in the art. Such alterations, modifications, and improvements are intended to form a part of this disclosure and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

What is claimed is:

1. A method of operating a quantum gate on a grouping of qubits, the method comprising:
    selecting values for a set of parameters of at least a first and a second laser pulse, wherein the set of parameters incldues a relative phase shift between at least the first and second laser pulses, a laser frequency, a laser intensity, and a pulse duration; and
    sequentially applying the at least first and second laser pulses each to all qubits within a grouping of N qubits, where N is equal to two or more, thereby coupling a non-interacting quantum state $|1\rangle$ to an interacting excited state $|r\rangle$, such that each qubit that begins in quantum state $|1\rangle$ returns to the state $|1\rangle$ upon completion of the at least first and second laser pulses, and wherein all qubits in the grouping are mutually blockaded.

2. The method of claim 1, wherein each qubit is an atomic qubit, an ionic qubit, or a molecular qubit.

3. The method of claim 1, wherein the mutually blockaded qubits in the grouping are mutually dipole blockaded.

4. The method of claim 1, wherein the mutually blockaded qubits in the grouping are mutually Rydberg blockaded.

5. The method of claim 1, wherein the pulse durations of the at least the first and the second pulses are selected so that when all qubits in the grouping begin in the quantum state $|1\rangle$, then all qubits in the grouping return to the quantum state $|1\rangle$ upon completion of each of the at least the first and the second laser pulses.

6. The method of claim 5, wherein the laser frequency of each laser pulse is detuned from a resonance transition between $|1\rangle$ to $|r\rangle$ by a detuning $\Delta$, and the pulse duration t is equal to $t=2\pi/\sqrt{\Delta^2+N\Omega^2}$, where $\Omega$ is a Rabi frequency of each laser pulse.

7. The method of claim 1, wherein one or more of the laser intensity, the laser frequency, the pulse duration, and the relative phase shift is selected to achieve a desired fidelity of the quantum gate.

8. The method of claim 1, wherein the at least the first and the second laer pulses form a palindromic sequence of pulses.

9. The method of claim 1, wherein the quantum gate is a controlled-phase gate $C^{N-1}Z(\theta)$, wherein $\theta$ is a conditional-phase angle.

10. The method of claim 9, wherein the quantum gate is a controlled phase ($CZ(\theta)$) gate, and N=2.

11. The method of claim 10, wherein the laser frequency, the pulse duration, and the relative phase shift are selected based on the conditional-phase angle $\theta$ of the controlled phase gate.

12. The method of claim 11, wherein the laser frequency is detuned from a resonance transition between $|1\rangle$ to $|r\rangle$ by a detuning $\Delta$, and the laser intensity is selected such that a Rabi frequency of the at least the first and the second laser pulses is $\Omega$.

13. The method of claim 12, wherein the laser frequency, the laser intensity, the pulse duration, and the relative phase shift are selected such that the conditional-phase angle $\theta=\pi$.

14. The method of claim 9, wherein the laser frequency, pulse duration, and relative phase shift of each of the at least the first and second laser pulses are selected based on the conditional-phase angle $\theta$.

15. The method of claim 1, wherein N is 3 and the quantum gate is a controlled-controlled phase ($C^2Z(\theta)$) gate having a conditional-phase angle $\theta$.

16. The method of claim 1, wherein N is 3, the method comprises applying a sequence of six pulses, and the sequence of six pulses is palindromic.

17. The method of claim 1, the method comprising applying a sequence of 4N−6 pulses.

18. The method of claim 17, wherein the sequence of pulses is palindromic.

19. A method of operating a quantum gate on a grouping of qubits, the method comprising:
   selecting time-dependent values for a set of parameters of a laser pulse, wherein the set of parameters includes a laser phase, a laser frequency, a laser intensity, and a pulse duration; and
   applying the laser pulse to all qubits within a grouping of N qubits, where N is equal to three or more, thereby coupling a non-interacting quantum state $|1\rangle$ to an interacting excited state $|r\rangle$, such that each qubit that begins in quantum state $|1\rangle$ returns to the quantum state $|1\rangle$ upon completion of the laser pulse, and wherein all qubits in the grouping are mutually blockaded.

20. The method of claim 19, wherein the time-dependent values of the laser intensity, laser frequency, pulse duration, and laser phase are selected to achieve a desired fidelity of the quantum gate.

21. The method of claim 19, wherein the quantum gate is a controlled-phase gate $C^{N-1}Z(\theta)$, wherein $\theta$ is a conditional-phase angle.

22. The method of claim 21, wherein N is 3 and the time-dependent values of the laser intensity, the laser frequency, laser phase, and pulse duration are selected based on the conditional-phase angle $\theta$.

23. The method of claim 21, wherein N is 3 and the conditional-phase angle $\theta=\pi$.

24. The method of claim 19, wherein N is 3 and the quantum gate is a controlled-controlled phase ($C^2Z(\theta)$) gate having a conditional-phase angle $\theta$.

25. A device comprising:
   a grouping of N qubits, where N is equal to two or more; and
   a coherent light source configured to, given selected values for a set of parameters of at least a first and a second laser pulse, wherein the set of parameters includes a relative phase shift between the first and second laser pulses, a laser frequency, a laser intensity, and a pulse duration:
      sequentially apply at least the first and second laser pulses to all qubits within the grouping of N qubits, thereby coupling a non-interacting quantum state $|1\rangle$ to an interacting excited state $|r\rangle$, such that each qubit that begins in quantum state $|1\rangle$ returns to the state $|1\rangle$ upon completion of the at least first and second laser pulses, and wherein all qubits in the grouping are mutually blockaded.

26. A device comprising:
   a grouping of N qubits, where N is equal to three or more; and
   a coherent light source configured to, given selected time-dependent values for a set of parameters of a laser pulse, wherein the set of parameters includes a laser phase, a laser frequency, a laser intensity, and a pulse duration:
      apply the laser pulse to all qubits within a grouping of N qubits, thereby coupling a non-interacting quantum state $|1\rangle$ to an interacting excited state $|r\rangle$, such that each qubit that begins in quantum state $|1\rangle$ returns to the quantum state $|1\rangle$ upon completion of the laser pulse, and wherein all qubits in the grouping are mutually blockaded.

* * * * *